(12) United States Patent
Takizawa et al.

(10) Patent No.: US 7,308,695 B2
(45) Date of Patent: Dec. 11, 2007

(54) DISK HOLDING MEMBER, DISK TRAY, RECORDING AND/OR REPRODUCING DEVICE, AND DISK CHANGER

(75) Inventors: Kazuyuki Takizawa, Chiba (JP); Toru Hama, Kanagawa (JP); Hisao Takahashi, Saitama (JP); Hiroshi Kishida, Saitama (JP)

(73) Assignees: Sony Corporation, Tokyo (JP); Fukoku, Co., Ltd., Ageo-shi (JP)

( * ) Notice: Subject to any disclaimer, the term of this patent is extended or adjusted under 35 U.S.C. 154(b) by 619 days.

(21) Appl. No.: 10/311,206

(22) PCT Filed: Apr. 1, 2002

(86) PCT No.: PCT/JP02/03271

§ 371 (c)(1),
(2), (4) Date: May 1, 2003

(87) PCT Pub. No.: WO02/086883

PCT Pub. Date: Oct. 31, 2002

(65) Prior Publication Data
US 2003/0185112 A1   Oct. 2, 2003

(30) Foreign Application Priority Data
Apr. 16, 2001  (JP) .......................... P2001-117526

(51) Int. Cl.
  *G11B 17/26* (2006.01)
(52) U.S. Cl. .................................... 720/719
(58) Field of Classification Search ............. 369/30.77; 720/719
See application file for complete search history.

(56) References Cited

U.S. PATENT DOCUMENTS

| | | | |
|---|---|---|---|
| 5,088,076 A * | 2/1992 | Serita et al. | 369/30.55 |
| 6,009,060 A * | 12/1999 | Kim | 720/603 |
| 2004/0199928 A1* | 10/2004 | Takahashi et al. | 720/603 |

FOREIGN PATENT DOCUMENTS

| | | |
|---|---|---|
| JP | 5-342734 | 12/1993 |
| JP | 2000-339921 | 12/2000 |
| JP | 2001-76407 | 3/2001 |
| WO | 98/40887 | 9/1998 |

* cited by examiner

*Primary Examiner*—A. J. Heinz
*Assistant Examiner*—Mark Blouin
(74) *Attorney, Agent, or Firm*—Oblon, Spivak, McClelland, Maier & Neustadt, P.C.

(57) ABSTRACT

In a disc changer in which any one is selected from a set of disc-shaped recording media (2) stored in a disc compartment (3) and signals are written and/or read to and/or from the selected disc-shaped recording medium (2), resin layers (192), (194) and (195), softer than the disc-shaped recording medium (2) in a recording and/or playback apparatus (6) are formed on a pair of disc holding members (89) holding the selected disc-shaped recording medium (2) rotatably while chucking the latter and a disc tray (193) on which each of the disc-shaped recording media stored in the disc compartment (3) is placed. The resin layers assure to prevent the disc-shaped recording medium (2) from being damaged due to contact with the disc holding members (89) and disc tray (193).

48 Claims, 44 Drawing Sheets

DIRECTION IN WHICH DISC IS INSERTED

DIRECTION IN WHICH DISC IS INSERTED

DIRECTION IN WHICH DISC IS INSERTED

DIRECTION IN WHICH DISC IS INSERTED

DISK HOLDING MEMBER, DISK TRAY, RECORDING AND/OR REPRODUCING DEVICE, AND DISK CHANGER

TECHNICAL FIELD

The present invention relates to a disc changer in which any one is selected from a set of discs and signals are recorded and/or reproduced to and/or from the disc, a recording and/or playback apparatus forming a part of such a disc changer, a disc tray, and a disc holding member forming a part of such a recording and/or playback apparatus.

BACKGROUND ART

There has so far been available, as an in-vehicle audio device, a so-called disc changer in which a desired one is selected from a set of discs for playback.

The disc changer is designed to store a set of discs such as CD (compact disc) together in a magazine case which is entirely installed in the apparatus body. Generally, the body of the disc changer, relatively voluminous, is installed in any other space than the car interior, such as a trunk, while only a part of the disc changer, necessary for controlling the disc changer itself, is installed in the car interior. In this case, the disc cannot be replaced in the car interior, and for the disc replacement, the magazine case has to be removed out of the apparatus body, which is very troublesome.

To avoid such an inconvenience, there has been proposed a disc changer having a body designed to have a predetermined standard size called "1DIN size" and in which a set of six discs is stored together, for example.

The disc changer uses no aforementioned magazine case, and thus the apparatus body, designed to have the predetermined standard size, can be installed in a standardized storage space provided in the in-vehicle center panel. Therefore, the disc replacement can be done in the car interior and thus the disc changer can be used more conveniently.

Referring to FIG. 1, the conventional disc changer will be described below in further detail. The disc changer is generally indicated with a reference 200. As shown, the apparatus body 200 has provided therein a disc compartment 202 in which discs 201 are to be stored. The disc compartment 202 has a stack of trays 203, for example, a set of six trays 203. The apparatus body 200 has a disc insertion/ejection slot 204 provided at the front thereof. A disc 201 inserted through the disc insertion/ejection slot 204 will be placed on the tray 203.

The disc changer 200 includes also a pickup assembly 205 to play a selected one of the discs 201. The pickup assembly 205 includes a pair of chuck levers 206a and 206b to hold the selected disc 201 rotatably while chucking it, and a pickup unit 207 provided on the side, opposite to the disc 201, of the lower one (206a) of the pair of chuck levers.

In the disc changer, a sufficient space to receive the pair of chuck levers 206a and 206b is created above and below the disc 201 selected from those placed on the stacked trays 203. When the disc 201 is chucked by the pair of chuck levers 206a and 206b, it is rotated and the pickup unit 207 reads signals the disc 201 being rotated.

The above disc changer 200 is not advantageous in that when the pickup unit 207 reads signals from the disc 201 chucked between the pair of chuck levers 206a and 206b, the disc 201 will be caused to touch the chuck levers 206a and 206b due to an oscillation or vibration of the vehicle, and thus damaged.

In the conventional disc changer, to protect the disc 201 from being damaged, it has been proposed to attach a cushion member to a portion of each of the chuck levers 206a and 206b, which is likely to be in contact with the disc 201.

However, such a cushion member has to accurately be attached with an adhesive to a portion of each of the chuck levers 206a and 206b, which is likely be in contact with the disc 201, namely, to a limited portion. Since such a portion is limited, highly accurate attachment is very difficult, with the result of the cushion member being out of place.

It is extremely difficult to attain a high accuracy in attaching a cushion member of less than about 0.3 mm, for example, with an adhesive, and such attachment will increase the thickness of the pair of chuck levers 206a and 206b.

Further, some of the adhesives used for this attachment of the cushion member have not any sufficiently high thermal resistance. Such an adhesive cannot keep the cushion member securely attached on the chuck levers 206a and 206b or the adhesive itself will possibly melt away, when the ambient temperature or temperature of the apparatus is higher.

Also in the aforementioned disc changer, to prevent the disc 201 from being damaged due to contact with the tray 203 during insertion or ejection, it has been proposed to mold the tray 203 itself from a resin, form resin layers over the metallic substrate as the tray 203, or form resin layers on the metallic substrate, which will be in contact with the disc 201, by out-sert molding or bonding.

Since the resin-molded tray is interior in mechanical strength to a tray formed from a metallic substrate, however, it has to be formed thick for a sufficient strength. As a result, the height of the disc changer will be increased.

Also, in case of the tray having resin layers formed over a metallic substrate, a foreign matter is likely to get mixed in the resin going to be applied over the metallic substrate. The foreign matter will scratch the disc 201. Since the resin layer thus formed by coating is extremely thin, additional processing is required to prevent the disc from being damaged by the end face of the metallic substrate.

Also, in case of the tray having a resin layer out-sert molded on a part of the metallic substrate, it is difficult to form a resin layer as thin as 0.1 to 0.2 mm, for example, because of the characteristic of the out-sert molding. To prevent the resin layer from falling off from the tray, any processing has to be made of the substrate side, which will lead to increased costs of manufacturing.

Further, in case of the tray having a resin layer formed on a par of the metallic substrate, it is difficult to attach the thin layer with an adhesive. The attachment is likely to be out of place, and so will be difficult. Also, some of the adhesives used for this attachment of the cushion member have not any sufficiently high thermal resistance. Such an adhesive cannot keep the cushion member securely attached on the chuck levers 206a and 206b or the adhesive itself will possibly melt away, when the ambient temperature or temperature of the apparatus is higher.

DISCLOSURE OF THE INVENTION

Accordingly, the present invention has an object to overcome the above-mentioned drawbacks of the related art by providing a disc holding member which holds a disc-shaped recording medium with no contact-caused damage to the medium and can be designed smaller, a disc tray which holds a disc-shaped recording medium and can be designed thinner, a recording and/or playback apparatus provided with such a disc holding member and which can be designed smaller, and a disc changer provided with such a disc tray and recording and/or playback apparatus and which can be designed smaller.

The above object can be attained by providing a pair of disc holding members used, in a recording and/or playback apparatus in which any one is selected from a set of disc-shaped recording media stored in a disc compartment of a disc changer and signals are written and/or read to and/or from the selected disc-shaped recording medium, to hold the selected disc-shaped recording medium rotatably while chucking it, each of the disc holding members having provided thereon a resin layer, softer than the disc-shaped recording medium, formed by printing in a position where it will be in contact with the disc-shaped recording medium.

In the above disc holding member according to the present invention, the resin layer, softer than the disc-shaped recording medium, formed by printing in the position where it will be in contact with the disc-shaped recording medium, will assure to protect the disc-shaped recording medium against damage due to contact with the disc holding member. Also, the resin layer can be formed very thin with a high accuracy by printing, and cannot fall off from the disc holding member.

Also, the above object can be attained by providing a disc tray on which each of a set of disc-shaped recording media stored in a disc compartment of a disc changer is placed, the disc tray including a substrate and having a first resin layer and a second resin layer, softer than the disc-shaped recording medium, formed by printing on the main surface of at least the substrate on which the disc-shaped recording medium is placed, the second resin layer being formed on the first resin layer and to be in contact with the outer circumference of the disc-shaped recording medium.

In the above disc tray according to the present invention, the first and second resin layers, softer than the disc-shaped recording medium, are formed one on the other by printing on the main surface of at least the substrate on which the disc-shaped recording medium is placed, will assure to protect the disc-shaped recording medium against damage due to contact with the disc tray. Also, the second resin layer assures a space between the first resin layer and disc-shaped recording medium. Thus, if the disc tray is vibrated or oscillated, it is possible to prevent contact between the signal recording layer of the disc-shaped recording medium and the edge of the substrate, so it is possible to prevent the signal recording layer of the disc-shaped recording medium from being scratched or otherwise damaged. Further, the first and second resin layers can be formed very thin by printing with a high accuracy and thus they will not fall off from the disc tray. Therefore, the present invention can provide a disc tray whose thickness can be limited while having a sufficient mechanical strength.

Also, the above object can be attained by providing a recording and/or playback apparatus in which any one is selected from a set of disc-shaped recording media stored in a disc compartment of a disc changer and signals are written and/or read to and/or from the selected disc-shaped recording medium, the apparatus including a pair of disc holding members to hold the selected disc-shaped recording medium while chucking it, each of the disc holding members having provided thereon a resin layer, softer than the disc-shaped recording medium, formed by printing in a position where it will be in contact with the disc-shaped recording medium.

In the above recording and/or playback apparatus according to the present invention, the resin layer, softer than the disc-shaped recording medium, formed by printing in the position on the disc holding member where the latter will be in contact with the disc-shaped recording medium, will prevent the discs-shaped recording medium from being damaged due to contact with the disc holding member. Also, the resin layer can be formed very thin by printing with a high accuracy and thus they will not fall off from the disc tray. Therefore, since the space between the pair of disc holding members and disc-shaped recording medium can be reduced as above, the present invention can provide a recording and/or playback apparatus whose height can be limited as above and which is thus more compact.

Also, the above object can be attained by providing a disc changer including, according to the present invention:

a disc compartment in which a set of disc-shaped recording medium is stored; and a recording and/or playback apparatus in which any one is selected from a set of disc-shaped recording media stored in a disc compartment of a disc changer and signals are written and or read to and/or from the selected disc-shaped recording medium, the apparatus including a pair of disc holding members to hold the selected disc-shaped recording medium while chucking it, each of the disc holding members having provided thereon a resin layer, softer than the disc-shaped recording medium, formed by printing in a position where it will be in contact with the disc-shaped recording medium.

In the above disc changer according to the present invention, the resin layer, softer than the disc-shaped recording medium, formed by printing in the position on the disc holding member where the latter will be in contact with the disc-shaped recording medium, will prevent the discs-shaped recording medium from being damaged due to contact with the disc holding member. Also, the resin layer can be formed very thin by printing with a high accuracy and thus they will not fall off from the disc tray. Since the space between the pair of disc holding members and disc-shaped recording medium can be reduced as above, the recording and/or playback apparatus according to the present invention can have the height thereof limited and can thus be more compact. Therefore, such a compact recording and/or playback apparatus in the disc changer will assure a larger mounting space inside the apparatus and thus there can be provided a more compact disc changer.

Also, the above object can be attained by providing a disc changer including, according to the present invention:

a disc compartment in which a set of disc-shaped recording medium is stored;

a disc tray on which there is placed each of the set of disc-shaped recording medium stored in the disc compartment; and a recording and/or playback apparatus in which any one is selected from a set of disc-shaped recording media stored in a disc compartment of a disc changer and signals are written and or read to and/or from the selected disc-shaped recording medium;

the disc tray including a substrate and having a first resin layer and a second resin layer, softer than the disc-shaped recording medium, formed by printing on the main surface of at least the substrate on which the disc-shaped recording medium is placed, the second resin layer being formed on the first resin layer and to be in contact with the outer circumference of the disc-shaped recording medium.

In the disc changer according to the present invention, the first and second resin layers, softer than the disc-shaped recording medium, are formed one on the other by printing on the main surface of at least the substrate on which the disc-shaped recording medium is placed, will assure to protect the disc-shaped recording medium against damage due to contact with the disc tray. Also, the second resin layer assures a space between the first resin layer and disc-shaped recording medium. Thus, if the disc tray is vibrated or oscillated, it is possible to prevent contact between the signal recording layer of the disc-shaped recording medium and the edge of the substrate, so it is possible to prevent the signal recording layer of the disc-shaped recording medium from being scratched or otherwise damaged. Further, the first and second resin layers can be formed very thin by printing with a high accuracy and thus they will not fall off from the disc tray. Thus, the disc tray can have the thickness thereof limited while having a sufficient mechanical strength. Therefore, the thin disc trays in the disc changer assure to provide a disc changer whose height can be limited and which is thus more compact.

These objects and other objects, features and advantages of the present invention will become more apparent from the following detailed description of the best mode for carrying out the present invention when taken in conjunction with the accompanying drawings.

BRIEF DESCRIPTION OF THE DRAWINGS

FIG. 14 provides side elevations of the pickup assembly, showing the structure thereof, in which

FIG. 16 provides perspective side elevations of the transmission changeover mechanism, showing the structure thereof, in which

FIG. 20 provides plan views of the substantial part of the pivoting mechanism, in which

FIG. 21 provides side elevations of the chucking changeover mechanism, showing the operation thereof, in which

FIG. 23 provides a plan views of the sliders, in which

FIG. 27 shows a disc being inserted from the disc insertion/ejection slot, in which

FIG. 30 provide s side elevations of the actuator, showing the positions thereof in the playback mode, in which

BEST MODE FOR CARRYING OUT THE INVENTION

The disc holding member, recording and/or playback apparatus and disc changer according to the present invention will be described as the embodiments of the present invention with reference to the accompanying drawings.

Figure 1:
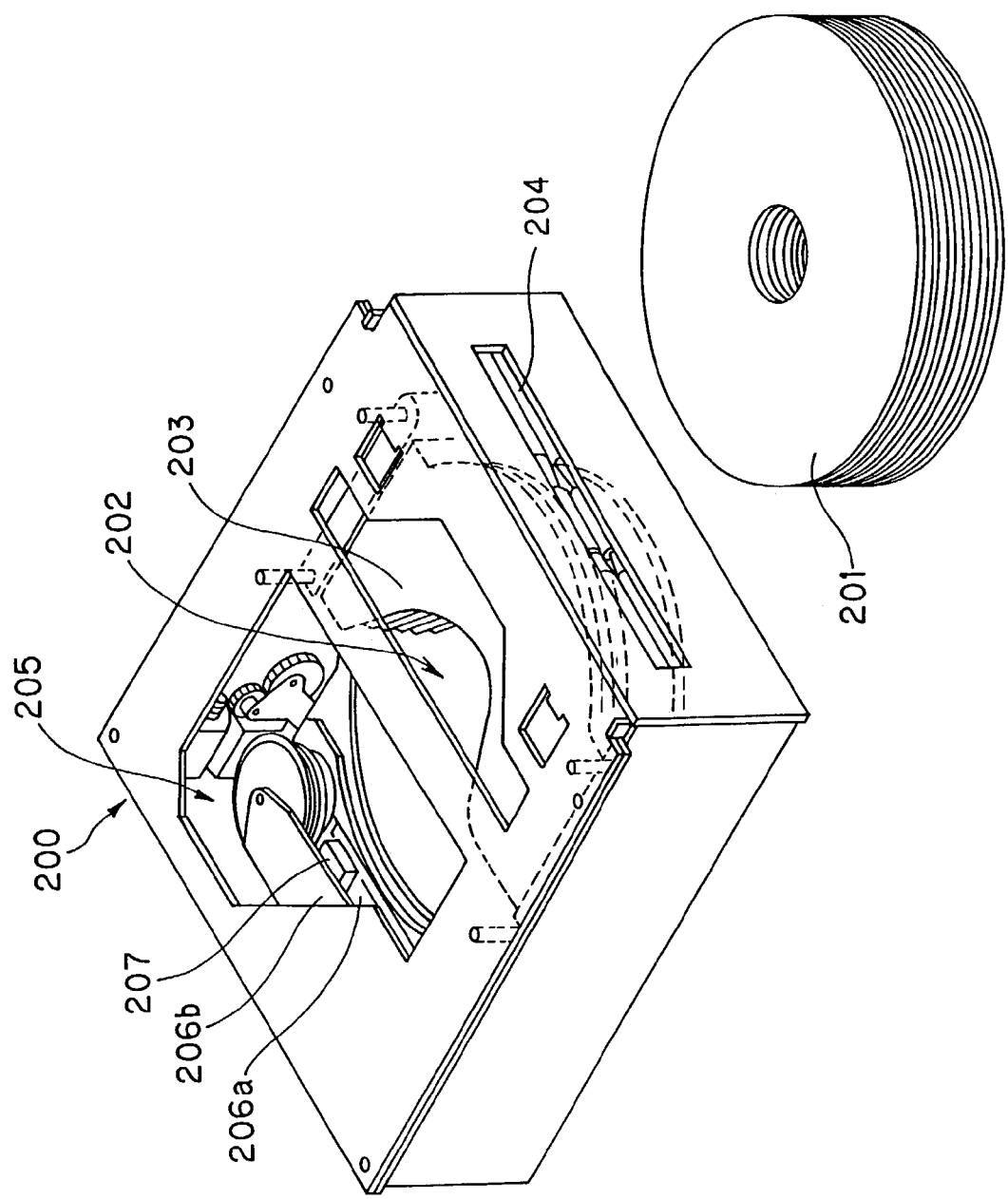
FIG. 1 is a perspective view of a conventional disc changer, showing the appearance thereof.
Figure 2:
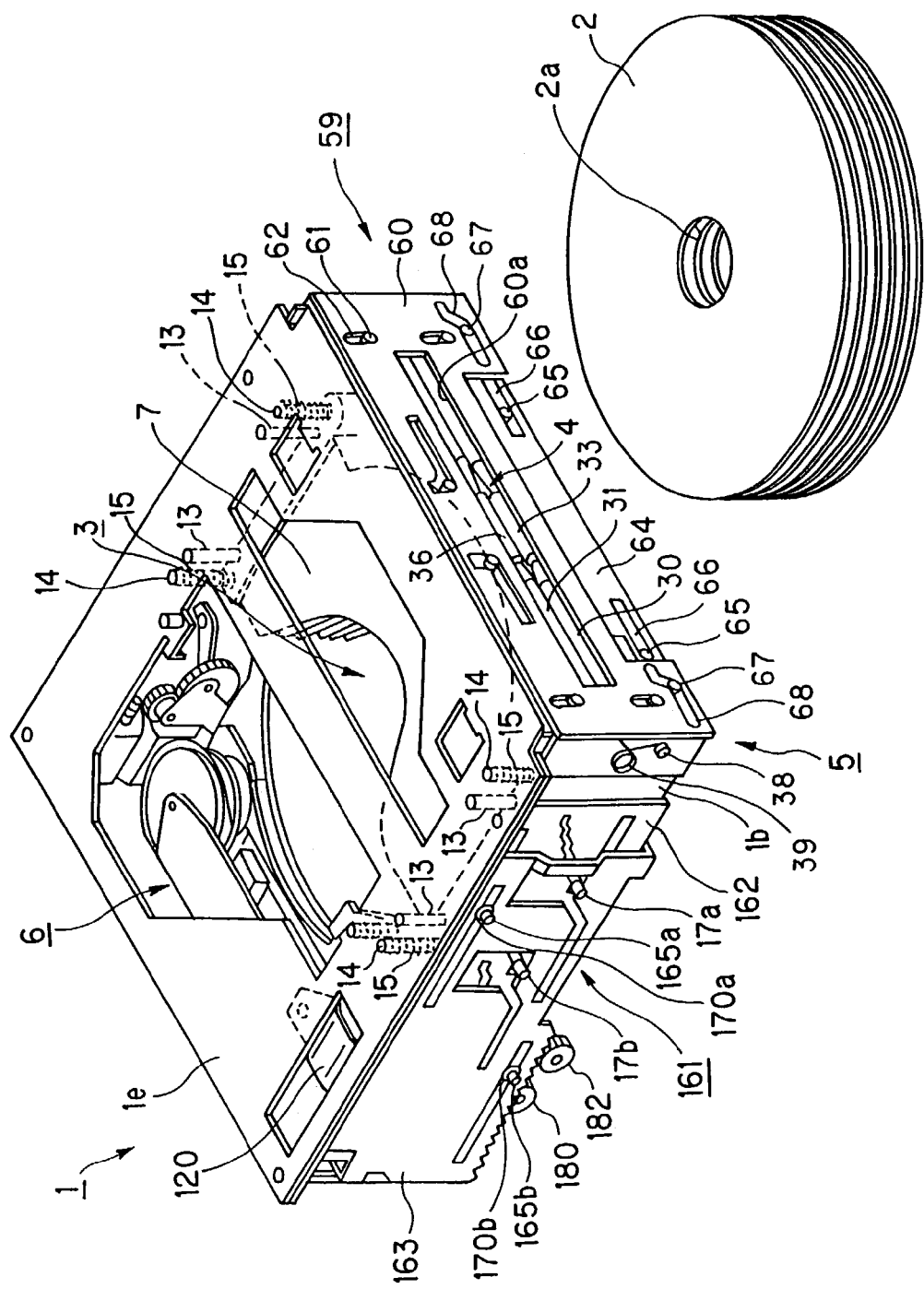
FIG. 2 is a perspective view of the disc changer according to the present invention, showing the appearance of the apparatus body.

FIG. 2 is a perspective view of the disc changer according to the present invention. The disc changer is a compact type having a body 1 designed to have a predetermined standard size called "1DIN size" and in which a set of six compact discs (CD) 2 is stored together, for example. The disc changer can select and play a desired one from the set of six discs 2.

The body 1 having the predetermined standard size, the disc changer can be installed in a standardized storage space provided in the in-vehicle center panel. Therefore, the disc 2 can be replaced in the car interior and thus the disc changer can thus be used more conveniently.

The structure of the disc changer will be described in detail below.

Note that FIG. 2 is a perspective view of the disc changer, showing the appearance of the body 1. The disc changer body 1 actually has provided on the front of the housing a control panel on which controls and indicators are provided and the housing itself is covered with an exterior case. However, the control panel and exterior case will not be illustrated herein.

Figure 3:
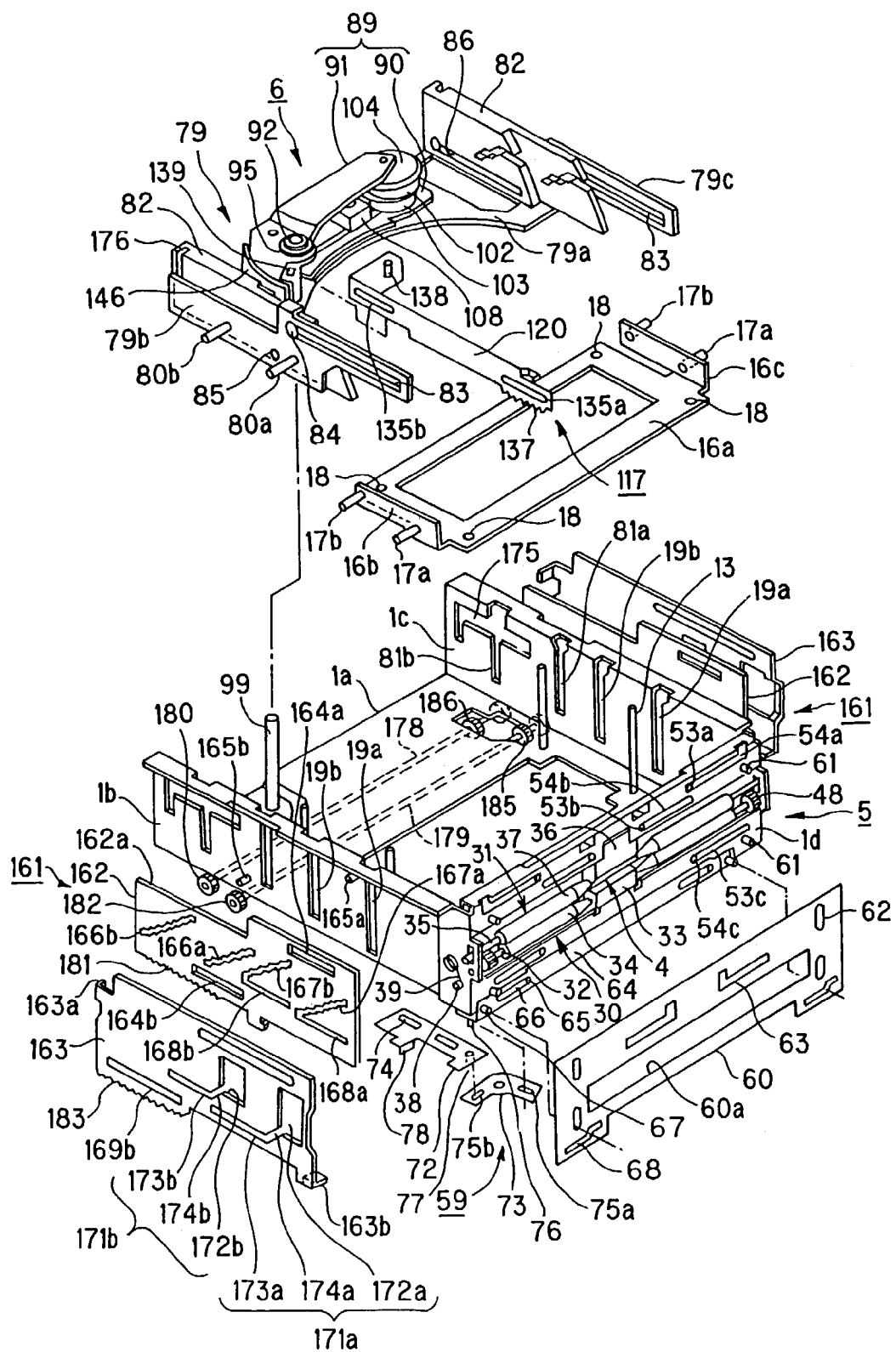
FIG. 3 is an exploded perspective view of the disc changer in FIG. 2, showing the internal structure of the apparatus body.

In the disc changer, the body 1 is a generally box-like housing open at the back thereof as shown in FIGS. 2 and 3. The body 1 is composed of a generally rectangular bottom plate 1a, a pair of side plates 1b and 1c rising upward from opposite lateral edges of the bottom plate 1a and formed integrally with the latter, a front plate 1d fixed to the front edges of the bottom plate 1a and side plates 1b and 1c, and a top plate 1e opposite to the bottom plate 1a and fixed along the upper edges of the side plates 1b and 1c and front plate 1d. It should be noted that FIG. 3 is an exploded perspective view of the disc changer, showing the internal structure of the apparatus body 1.

The apparatus body 1 has provided inside the aforementioned housing a disc compartment 3 to store the discs 2 therein, a disc insertion/ejection unit 5 to insert a disc 2 into the disc compartment 3, and eject a disc 2 from the disc compartment 3, through a disc insertion/ejection slot 4 formed in the front plate 1d, and a pickup assembly 6, which is a recording and/or playback apparatus, to select any one of the discs 2 stored in the disc compartment 3 and reads signals from the selected disc 2.

Figure 4A:
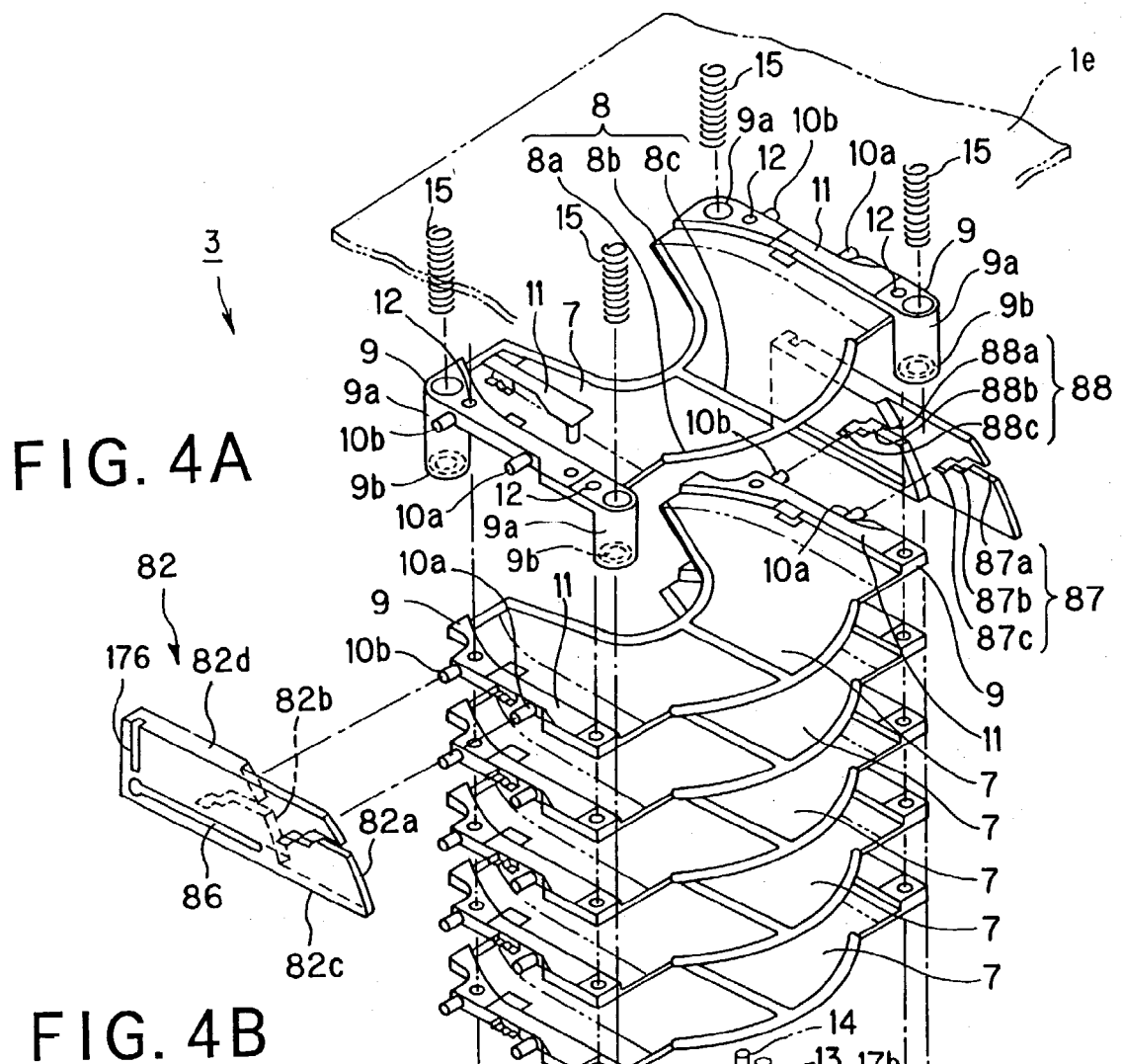
FIG. 4A is an exploded perspective view of the disc compartment, showing the structure thereof

As shown in FIGS. 2 and 4A, the disc compartment 3 has provided in the front portion of the housing near the disc insertion/ejection slot 4 a set of six disc trays (will be referred to simply as "tray" hereunder) 7 on which the discs 2 are placed respectively. It should be noted that FIG. 4A is an exploded perspective view of the disc compartment 3, showing the structure thereof.

Figure 4B:
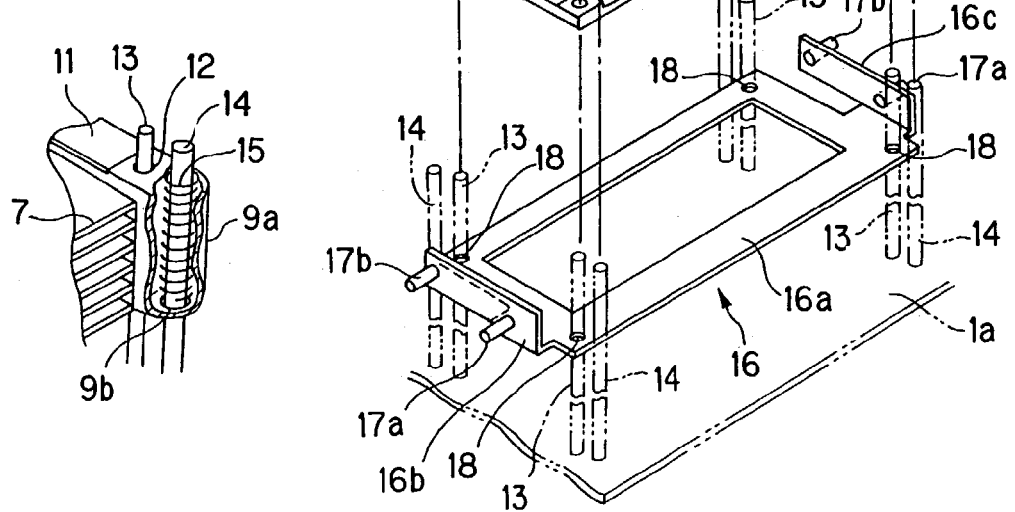
FIG. 4B is a fragmentary perspective view of the substantial part of the disc compartment, providing a partially fragmentary view of the upper trays.
Figure 5:
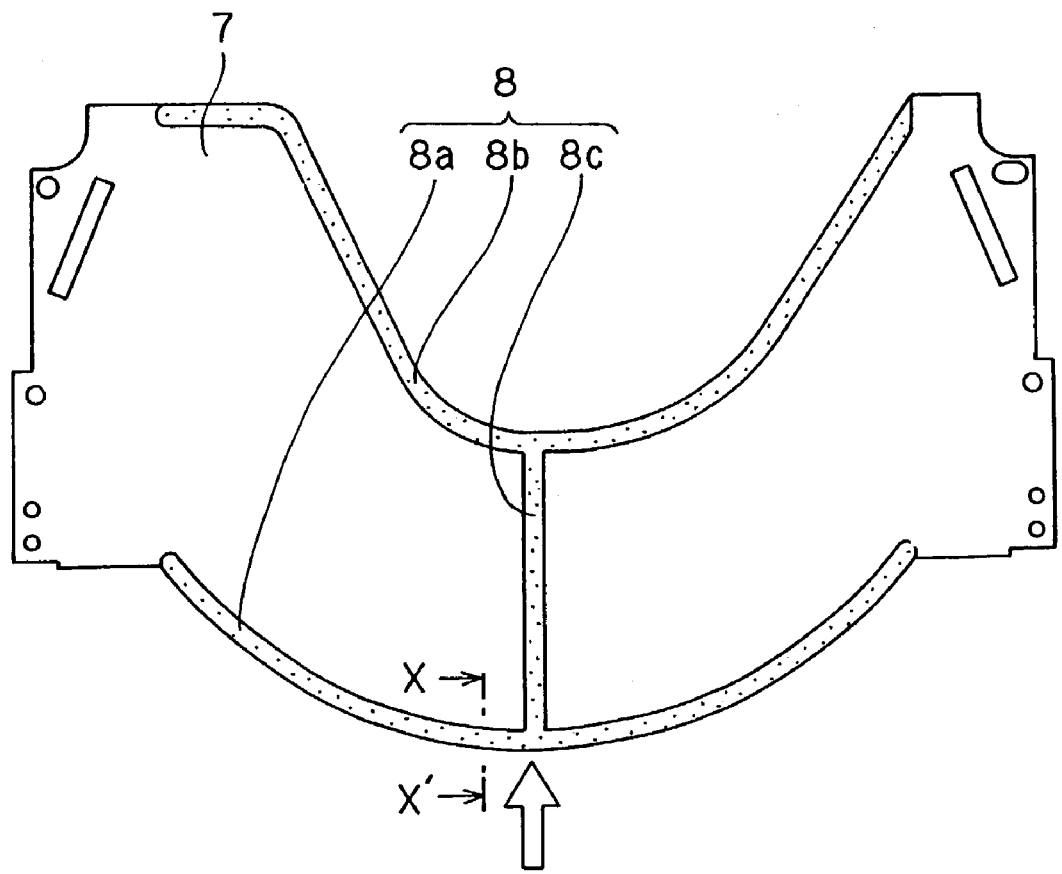
FIG. 5 is a plan view of the tray.
Figure 6:
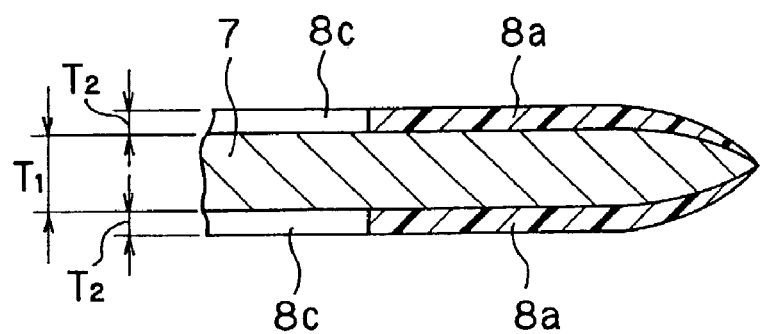
FIG. 6 is a sectional view taken along the line $X_1$-$X_1'$ in FIG. 5.

As shown in FIGS. 4, 5 and 6, the tray 7 is formed generally flat as a whole to have a thickness $T_1$ of about 0.3 mm for example. The material of the disc 7 is a resin in which a metallic material such as aluminum or stainless steel or a powder of aluminum or stainless steel is mixed. Also, the tray 7 is cut at the rear portion thereof to create a space where a central hole 2a of the disc 2 is exposed. The tray 7 is decreased in thickness at the front edge portion thereof as it goes toward the disc insertion/ejection slot 4.

Further, the tray 7 has formed by printing on either side thereof a resin layer 8 having a thickness $T_2$ of about 0.1 to 0.2 mm and intended to prevent the disc 2 from being scratched or otherwise damaged due to contact with the tray 7. The resin layer 8 consists of a first resin layer 8a formed on either front edge portion of the tray 7, a second resin layer 8b formed on either rear edge portion of the tray 7, and a third resin layer 8c formed along the center line on either side of the tray 7 to provide a connection between the first and second resin layers 8a and 8b. It should be noted that the material and method of forming the resin layer 8 will be described in detail later.

Figure 7:
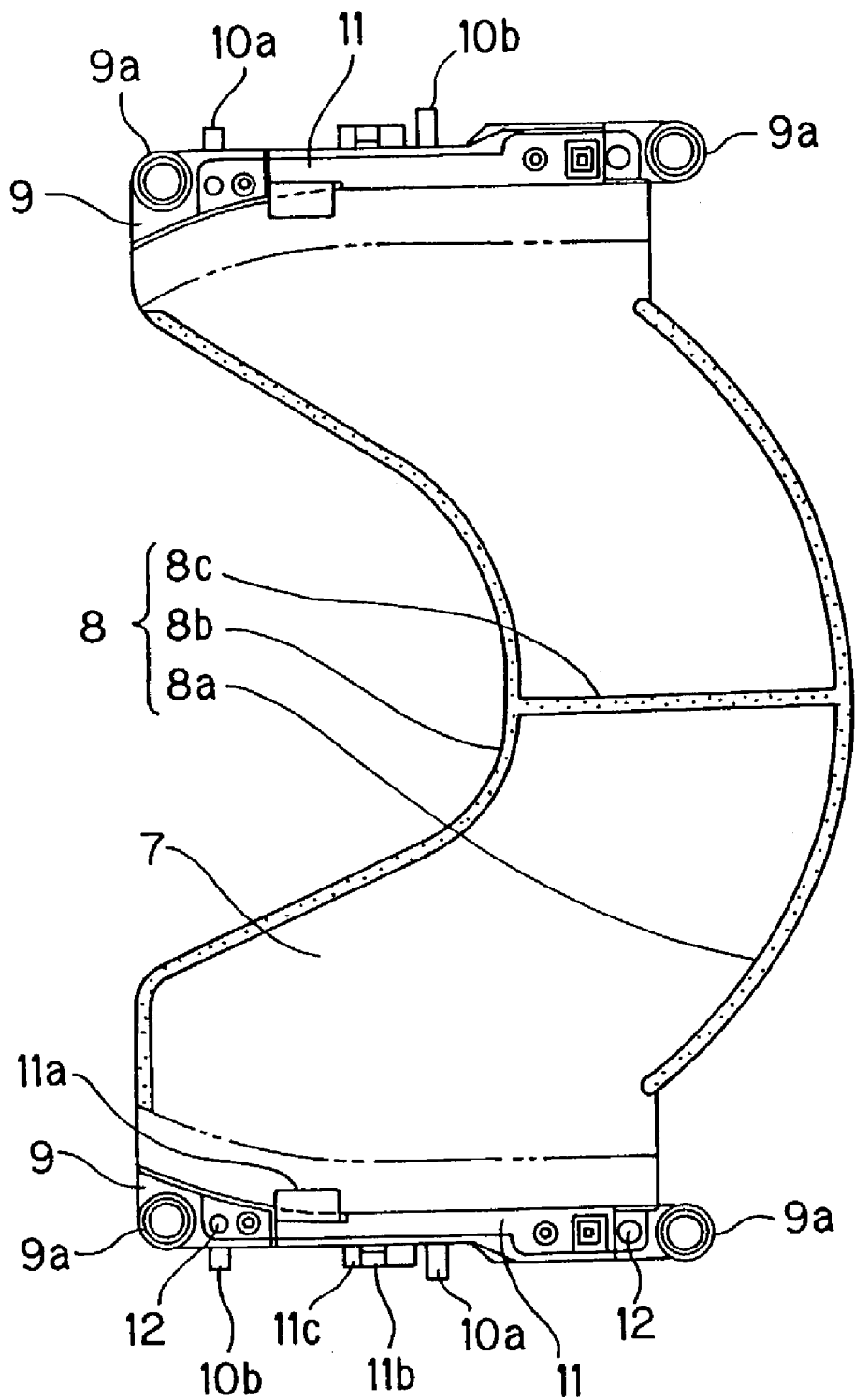
FIG. 7 is a plan view of the tray, showing a pair of resin members installed to the tray.

Also, a pair of resin members 9 is fixed each on either end of the tray 7 and along the profile of the disc 2 placed on the tray 7 as shown in FIGS. 4A and 7. Each of the resin members 9 in pair is generally as thick as the disc 2 placed on the tray 7, and has formed on the end face thereof opposite to the side plate 1b (1c) a pair of pins 10a and 10b projecting generally parallel with the main surface of the tray 7 and toward the side plate 1b (1c). Also, the front one (10a) of the pins 10a and 10b is longer than the rear one (10b).

Each of the resin members 9 has a leaf spring 11 cantilevered thereon and extending over the main surface of the resin member 9. The leaf spring 11 is fixed at the longitudinal front end thereof to the resin member 9 and has formed at the free end thereof a retainer 11a projecting toward the disc 2 placed on the tray 7. When the disc 2 is placed on the tray 7, the leaf spring 11 will retain the disc 2 between the retainer 11a and tray 7. The leaf spring 11 has portions 11b and 11c bent toward the side plate 1b (1c).

Each of the resin members 9 has formed in the longitudinal front and rear portions thereof a pair of through-holes 12 formed through the tray 7. The disc compartment 3 has fixed thereto four guide columns 13 passed through the through-holes 12, respectively, to couple the bottom and top plates 1a and 1e to each other. Thus, the six trays 7 are stacked over one another with the four guide columns 13 passed through the through-holes 12, respectively, and thus supported movably along these guide columns 13.

Each of the pair of resin members 9 fixed to the uppermost tray 7 has a pair of spring bearings 9a provided at longitudinal opposite ends thereof, namely, in front and rear positions next to the through-holes 12, respectively, formed in the resin member 9. The spring bearing 9a has the general form of a cylinder projecting downward. As shown in FIGS. 2, 4A and 4B, the spring bearing 9a has formed in the bottom thereof only an insertion hole 9b in which a coil spring 15 is fitted from the upper opening and also the guide column 14 is inserted to hold the coil spring 15 in the spring bearing 9a. In the disc compartment 3, the four guide columns 14 inserted through the spring bearings 9a, respectively, are fixed to couple the bottom and top plates 1a and 1e to each other.

In the uppermost tray 7, the coil spring 15 is fitted in each spring bearing 9a. The coil spring 15 is not yet fully put in the spring bearing 9a before each of four guide columns 14 is introduced into the spring bearing 9a and thus the coil spring 15 and fixed to the top plate 1e. As the guide column 14 is fixed to the top plate 1e, the coil spring 15 will be compressed along the guide column 14 and thus force the spring bearing 9a downward.

In the disc compartment 3 thus constructed, the coil spring 15 may be relatively long. A larger compressed length of the coil spring 15 permits the coil spring 15 to be compressed with a smaller force.

Also, in the disc compartment 3, a disc elevator 16 is provided under the lowermost tray 7 as shown in FIG. 4A. The disc elevator 16 includes a generally rectangular horizontal plate 16a, and vertical plates 16b and 16c bent upward from either edge of the horizontal plate 16a. Each of the vertical plates 16b and 16c has formed on the surface thereof opposite to the side plate 1a (1b) a pair of pins 17a and 17b projecting generally parallel with the main surface of the tray 7 and toward the side plate 1b (1c). Also, the disc elevator 16 has a through-hole 18 formed in each corner of the horizontal plate 16a. With four guide columns 13 passed through these through-holes 18, the disc elevator 16 is supported together with the aforementioned six trays 7 to be movable along the guide columns 13 also passed through the through-holes formed in the four corners of each tray 7 as mentioned above.

Each of the side plates 1b and 1c has formed there a pair of vertical slits 19a ad 19b corresponding to the pair of pins 17a and 17b of the disc elevator 16 moving along the guide columns 13. The pair of pins 17a and 17b of the disc elevator 16 are inserted in the vertical slits 19a and 19b in the side plate 1b (1c) until they are projected out of the housing. Therefore, as the disc elevator 16 is moved vertically, its pair of pins 17a and 17b will slide in the vertical slits 19a and 19b.

In the disc compartment 3, the six trays 7 are placed stacked on the disc elevator 16, and the coil springs 15 fitted on the four guide columns 14, respectively, and fitted in the spring bearings 9a, respectively, in the uppermost tray 7 force down the disc elevator 16 and six trays 7 toward the bottom plate 1a.

Figure 8:
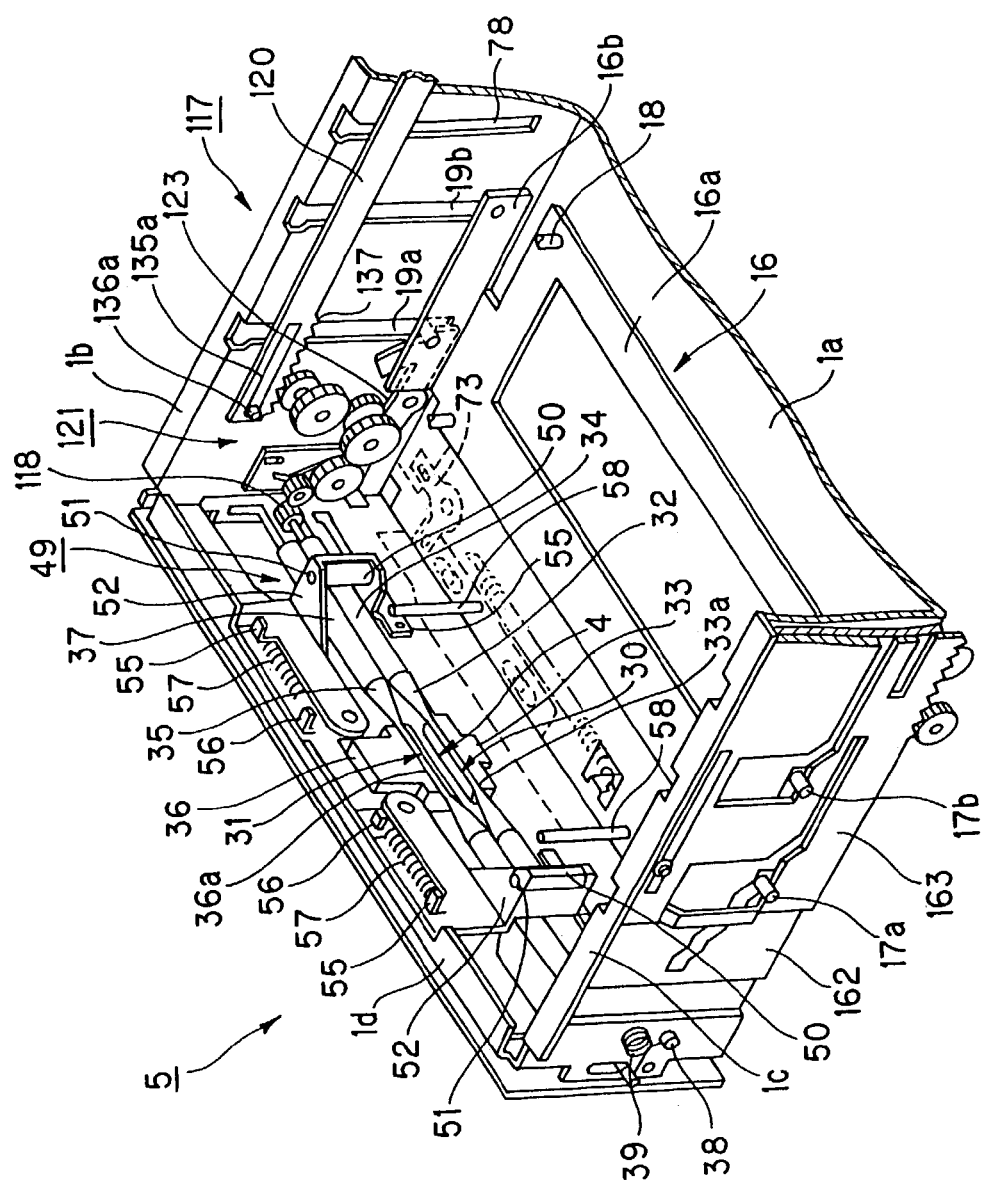
FIG. 8 is a perspective view of the substantial part of the disc changer, providing a view of the disc insertion/ejection unit from inside the housing.

As shown in FIGS. 2, 3 and 8, the disc insertion/ejection unit 5 is provided on the front plate 1d in which the disc insertion/ejection slot 4 is formed. It should be noted that FIG. 8 is a perspective view of the substantial part of the disc changer, providing a view of the disc insertion/ejection unit 5 from inside the housing.

The disc insertion/ejection unit 5 includes a pair of drive roller 30 and driven roller 31, disposed opposite to each other and along the disc insertion/ejection slot 4.

The drive roller 30 has a spindle 32 and is supported pivotably at either end of the spindle 32. The spindle 32 is supported at the center thereof by a drive bearing 33, and is covered with a rubber layer 34 (rubber roller portion) on the surface thereof between the pivoted ends. More specifically, in the drive roller 30, the diameter of the spindle 32 is reduced continuously towards the drive bearing 33 between the portion pivoted by the drive bearing 33 and rubber roller portion 34. Also, the drive bearing 33 is formed from a resin and has a recess 33a formed in the rear portion thereof along the spindle 32. The spindle 32 is fitted at the center thereof rotatably in the recess 33a. The rubber roller portion 34 is restrained by a snap ring (not shown) from sliding axially.

On the other hand, the driven roller 31 has a spindle 35 and is supported pivotably at either end of the spindle 35. The spindle 35 is supported at the center thereof by a driven bearing 36, and is covered with a resin layer 37 (resin roller portion) between the portion pivoted by the driven bearing 36 and the resin roller portion 37. More specifically, in the driven roller 31, the diameter of the spindle 35 is reduced continuously towards the drive bearing 36 between the portion pivoted by the drive bearing 36 and resin roller portion 37. Also, the drive bearing 36 is formed from a resin and has a recess 36a formed in the rear portion thereof along the spindle 35. The spindle 35 is fitted at the center thereof rotatably in the recess 36a. The resin roller portion 37 is restrained by a snap ring (not shown) from sliding axially.

The driven roller 31 is inserted at either end of the spindle 35 thereof in an elongated hole formed in the lateral side of the side plate 1d, so that the driven roller 36 is slidable vertically due to engagement of a pair of guide projections (not shown) in a pair of guide recesses (not shown). Thus, the driven roller 31 is movable toward and away from the drive roller 30.

Furthermore, the driven roller 31 has a circumferential recess (not shown) formed in either end of the spindle 35, and a spring hooking pin 38 is formed at the lateral end of the front plate 1d. With a helical torsion spring 39 engaged at opposite ends thereof in the circumferential recess and on the spring hooking pin 38, respectively, the driven roller 31 is forced toward the drive roller 30.

Figure 9:
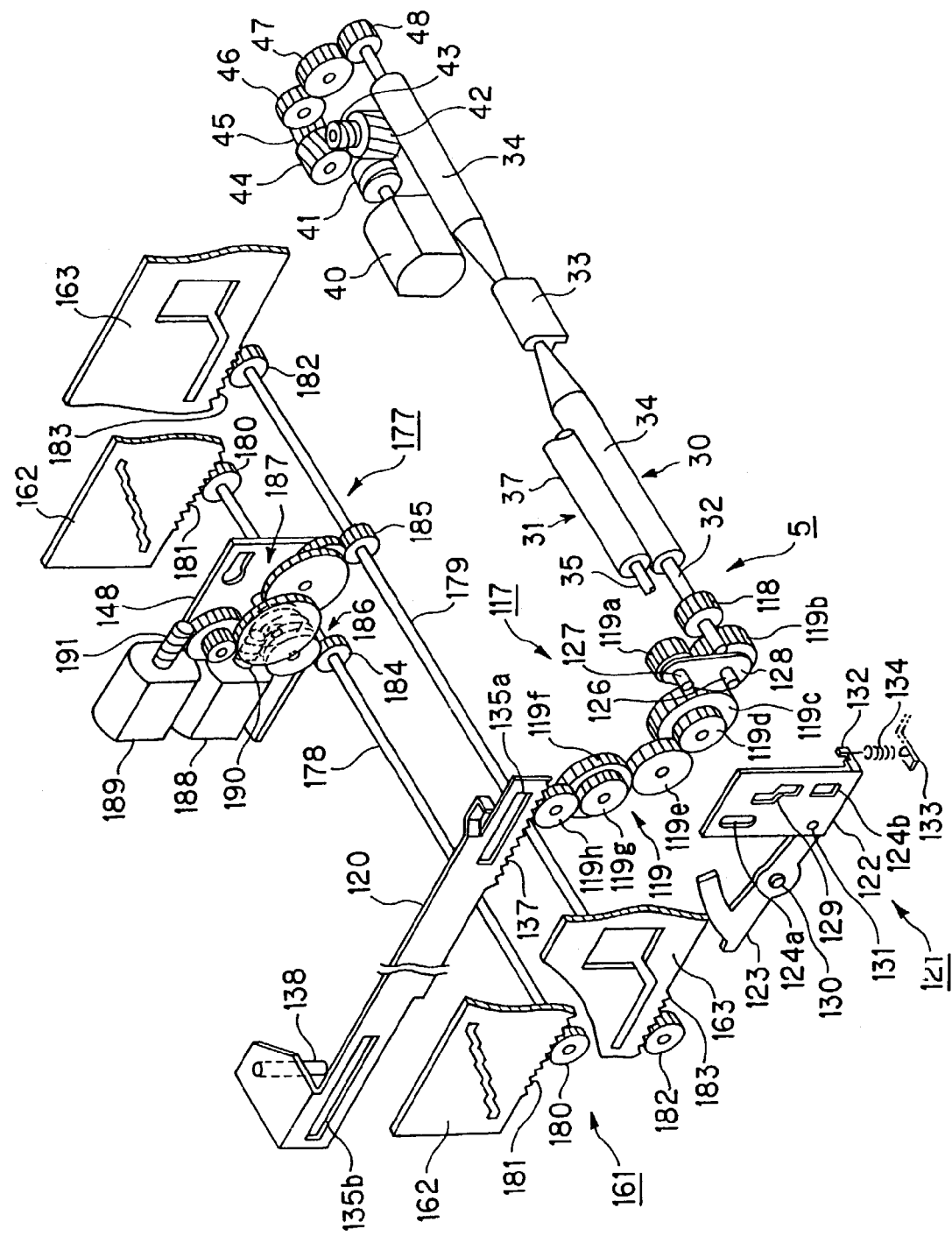
FIG. 9 is a perspective view of the drive unit in the apparatus body.

As shown in FIGS. 8 and 9, the drive roller 30 is driven to rotate by a drive motor 40. More particularly, there are provided a worm gear 41 coupled to a drive shaft of the drive motor 40, a gear 42 in mesh with the worm gear 41, a worm gear 43 pivoted along with the gear 42, a gear 44 in mesh with the worm gear 43, a gear 45 pivoted along with the gear 42, and gears 46 and 47 in mesh with each other and with the gear 45. Once the gear 47 is put into mesh with a gear 48 installed on one end of the spindle 32 of the drive roller 30, the drive roller 30 will be rotated by the drive motor 40.

In the disc insertion/ejection unit 5 constructed as above, the disc 2 being chucked by the pair of drive roller 30 and driven roller 31 is inserted or ejected through the disc insertion/ejection slot 4 as the drive roller 30 is rotated.

As shown in FIGS. 3 and 8, the disc insertion/rejection unit 5 further includes a disc push-in mechanism 49 to automatically push the thus inserted disc 2 a predetermined distance (about a few millimeters) into the housing.

The above disc push-in mechanism 49 includes a pair of vertical rollers 50 provided at the back of, and perpendicularly to, the pair of drive roller 30 and driven roller 31.

Each of the vertical rollers 50 is formed from a resin to be generally cylindrical, and has a spindle 51 provided at either end thereof. The spindles 51 are supported on a support member 52 to be pivotable. Also, the support member 52 is installed to the front plate 1d to be horizontally movable. More specifically, guide pins 53a, 53b and 53c are formed on the surface of the support member 52 opposite to the front plate 1d, and guide holes 54a, 54b and 54c are formed in the front plate 1d correspondingly to the horizontally moving guide pins 53a, 53b and 53c, respectively. With the guide pints 53a, 53b and 53c being inserted unremovably in the guide holes 54a, 54b and 54c, respectively, in the front plate 1d, the support member 52 is installed to the front plate 1d to be horizontally movable.

Also, the support member 52 has a spring hook 55 formed thereon. To force the pair of vertical rollers 50 toward each other, there is provided a coil spring 57 extending between the spring hook 55 and a spring hook 56 provided on the front plate 1d.

In the disc push-in mechanism 49, there is also provided a pair of positioning rods 58 provided rising upward from the bottom plate 1a. The pair of vertical rollers 50 chuck and position a disc 2, while the pair of positioning rods 58 position another disc 2 below the pair of vertical rollers 50. The disc push-in mechanism 49 further has a pair of positioning rods (not shown) provided projecting downward from the top plate 1e and on an extension line from the pair of positioning rods 58. A disc 2 above the pair of vertical rollers 50 is positioned by this pair of positioning rods.

Figure 10:
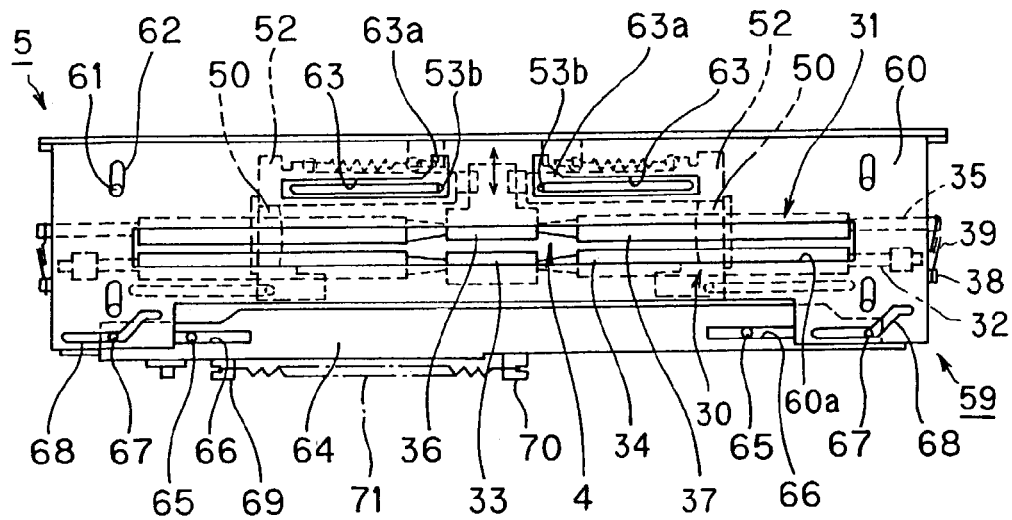
FIG. 10 is a front view of the disc insertion/ejection unit from the front of the housing.

Also, the disc insertion/ejection unit 5 includes a shutter mechanism 59 to open and close the disc insertion/ejection slot 4 in the front plate 1d as shown in FIGS. 2, 3 and 10.

The shutter mechanism 59 has a generally rectangular shutter 60 in which there is formed an opening 60a corresponding to the disc insertion/rejection slot 4. The shutter 60 is fixed to the front plate 1d to be vertically movable. In the shutter mechanism 59, the shutter 60 is moved up to align the opening 60a in the shutter 60 with the disc insertion/ejection slot 4, while the shutter 60 is moved down with the disc insertion/ejection slot 4 being opened, thereby closing the disc insertion/ejection slot 4.

More particularly, the front plate 1d has a guide pin 61 provided at each corner thereof on the surface opposite to the shutter 60 a guide pin 61, and the shutter 60 has formed therein a guide hole 62 corresponding to each of the guide pin 61 and extending vertically. The guide pins 61 on the front plate 1d are inserted into the guide holes 62, respectively, in the shutter 60, and each guide pin 61 has a snap ring (not shown) fitted on the free end thereof.

Also, the shutter 60 has formed therein a guide hole 63 in which the guide pin 53b provided on the aforementioned support member 52 is inserted. It should be noted that the guide pint 53b is longer than the other guide pins 53a and 53c so that it can be inserted into the guide hole 63 in the shutter 60.

The guide hole 63 is formed generally like "L" letter to permit the shutter 60 to move vertically and the guide pin 53b inserted therein to move horizontally. Thus, the support member 52 can be moved horizontally only when the shutter 60 has been moved up until the disc insertion/ejection slot 4 is opened. The guide hole 63 has a cut 63a which allows the shutter 60 to move upward when the disc 2 has to be forcibly ejected, for some reason, with the pair of vertical rollers 50 being moved away from each other to a sufficient space between them for passage of the disc 2.

Also, the shutter mechanism 59 includes a sliding plate 64 of which the section is shaped generally like "L" letter and which is movable along the front panel 1d (in right-leftward direction; concerning this direction, a term "lateral" or "laterally" will be used hereunder). The lateral-sliding plate 64 is fixed along the edges of the bottom plate 1a and front plate 1d.

More specifically, the bottom plate 1a and front plate 1d have a pair of guide pins 65 provided on the sides thereof opposite to the lateral-sliding plate 64, and the lateral-sliding plate 64 has horizontally formed therein a pair of guide holes 66 corresponding to the pair of guide pins 65. The guide pins 65 on the bottom plate 1a and front plate 1d are inserted in the guide holes 66 in the lateral-sliding plate 64, and each of the guide pints 65 has a snap ring (not shown) fitted on the free end thereof.

The lateral-sliding plate 64 has a pair of sliding pins 67 provided on the surface thereof opposite to the shutter 60, and the shutter 60 has a pair of cam holes 68 formed therein correspondingly to the pair of the sliding pins 67 and to have a predetermined shape. The sliding pins 67 on the lateral-sliding plate 64 are inserted in the pair of cam holes 68, and each of the sliding pins 67 has a snap ring (not shown) fitted on the free end thereof.

The lateral-sliding plate 64 has provided at one end (left end) on the lower surface thereof a spring hook 69 extending downward, and the bottom plate 1a has provided nearly at the center on the lower surface thereof a spring hook 70 extending downward. A coil spring 71 is extended between the spring hook 69 on the lateral-sliding plate 64 and the spring hook 70 on the bottom plate 1a to force the lateral-sliding plate 64 toward the other end (right end) and position the pair of sliding pins 67 at the right end of the cam hole 68. Each of the pair of cam holes 68 formed in the shutter 60 is bent so that the right end thereof is at a higher level than the left end. Thus, the shutter 60 is forced downward to close the disc insertion/ejection slot 4.

As shown in FIGS. 3 and 8, the shutter mechanism 59 has further provided at one end (left end) of the bottom plate 1a a sliding plate 72 movable along the side plates 1b and 1c (in front-rearward direction; concerning this direction, a term "longitudinal" or "longitudinally" will be used hereunder) and a coupling lever 73 shaped generally like "L" letter and which couples the longitudinal-sliding plate 72 and lateral-sliding plate 64 with each other.

More specifically, the longitudinal-sliding plate 72 has a pair of guide holes 74 formed longitudinally and the bottom plate 1a has secured thereto a pair of headed guide pins (not shown) which are to be inserted into the pair of guide holes 74.

The coupling lever 73 is installed at the center thereof with a fixing shaft 74 rotatably to the lower surface of the bottom plate 1a. The coupling lever 73 has elongated holes 75a and 75b formed in both end portions thereof. The lateral-sliding plate 64 has provided at the end thereof opposite to the coupling lever 73 on the lower surface a pin 76 which is to be loose-fitted in the elongated hole 75a in the coupling lever 73, while the longitudinal-sliding plate 72 has provided at the end thereof opposite to the coupling lever 73 a pin 77 which is to be loose-fitted in the elongated hole 75b. Further, the longitudinal-sliding plate 72 has a portion 78 bent downward.

Figure 11:
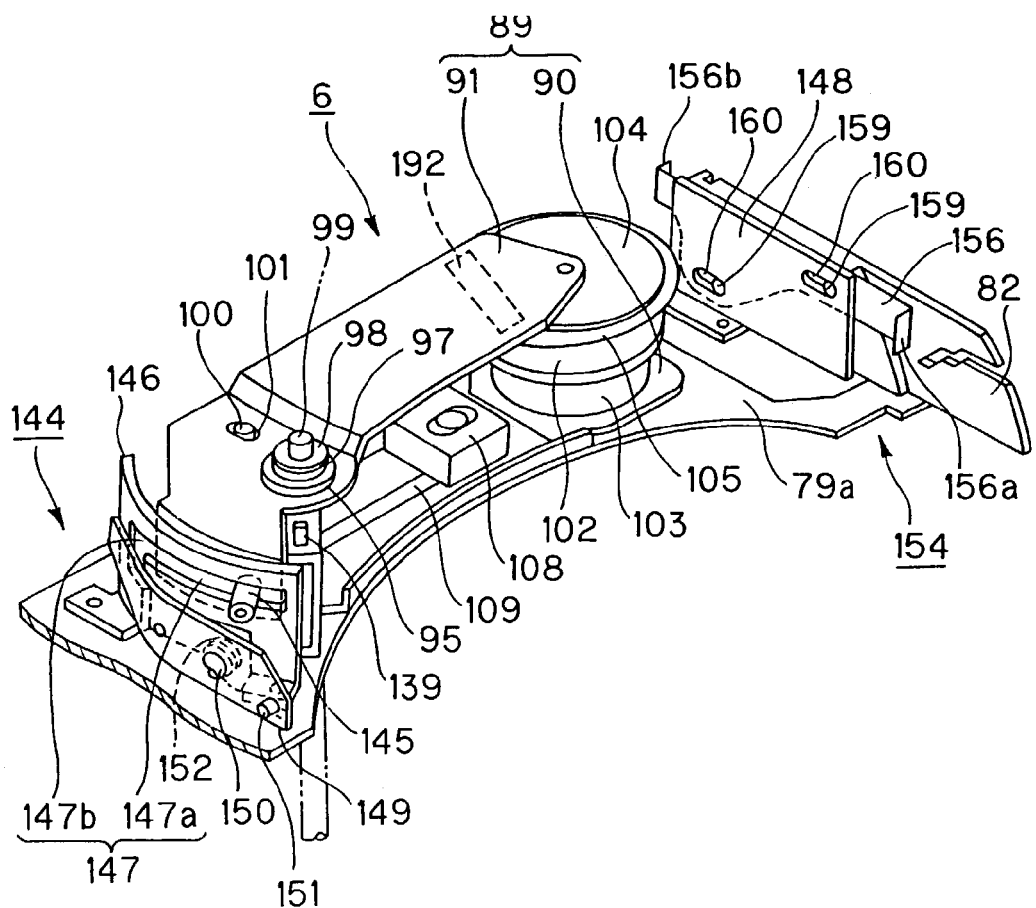
FIG. 11 is a perspective view of the pickup assembly, showing the appearance thereof.

As shown in FIGS. 3 and 11, the pickup assembly 6 is installed on a pickup elevator 79 disposed at the back of the disc compartment 3. It should be noted that FIG. 11 is a perspective view of the pickup assembly 5, showing the appearance of thereof.

The pickup elevator 79 is provided to move the pickup assembly 6 vertically. It is integrally formed from a generally flat horizontal plate 79a cut at the front end thereof where the plate 79a is opposite to the disc compartment 3, and vertical plates 79b and 79c extending upward from opposite ends of the horizontal plate 79a.

Each of the vertical plates 79b and 79c has provided on the surface thereof opposite to the side plate 1b (1c) a pair of pins 80a and 80b generally parallel to the main surface of the tray 7 and extending toward the side plate 1b (1c). The side plate 1b (1c) has formed therein a pair of vertical slits 81a and 81b corresponding to the pair of pins 80a and 80b on the pickup elevator 79. In the pickup elevator 79, the pair of pins 80a and 80b is inserted in the vertical slits 81a and 81b, respectively, in the side plate 1b (1c) and projected out of the housing. Therefore, as the pickup elevator 79 moves vertically, the pair of pins 80a and 80b will slide vertically in the vertical slits 81a and 81b.

Also, each of the vertical plates 79b and 79c has a pair of resin-made separation cams 82 provided on the surface thereof opposite to the surface opposite to the side plates 1b and 1c.

As shown in FIGS. 3 and 4A, the pair of separation cams 82 slides longitudinally to create a space above and below one, having a selected disc 2 placed thereon, of the six trays 7 stacked inside the aforementioned disc compartment 3 (will be referred to as "selected tray" hereunder) while holding the selected tray 7.

More particularly, each of the vertical plates 79b and 79c of the pickup elevator 79 has a guide hole 83 formed longitudinally, and a headed guide pin 84 to be inserted in the guide hole 83 is secured to each of the pair of separation cams 82. The headed guide pin 84 on each of the pair of separation cams 82 will slide in the guide hole 83 in each of the vertical plates 79b and 79c.

Further, a guide pin 85 extending toward the pair of separation cams 82 is provided on the surface of each of the vertical plates 79b and 79c opposite to the pair of separation cams 82, and a guide recess 86 corresponding to the guide pin 85 is formed longitudinally in each of the pair of separation cams 82. The guide pin 85 on each of the vertical plates 79a and 79b will slide in the guide recess 86 in each of the pair of separation cams 82.

Figure 12A:
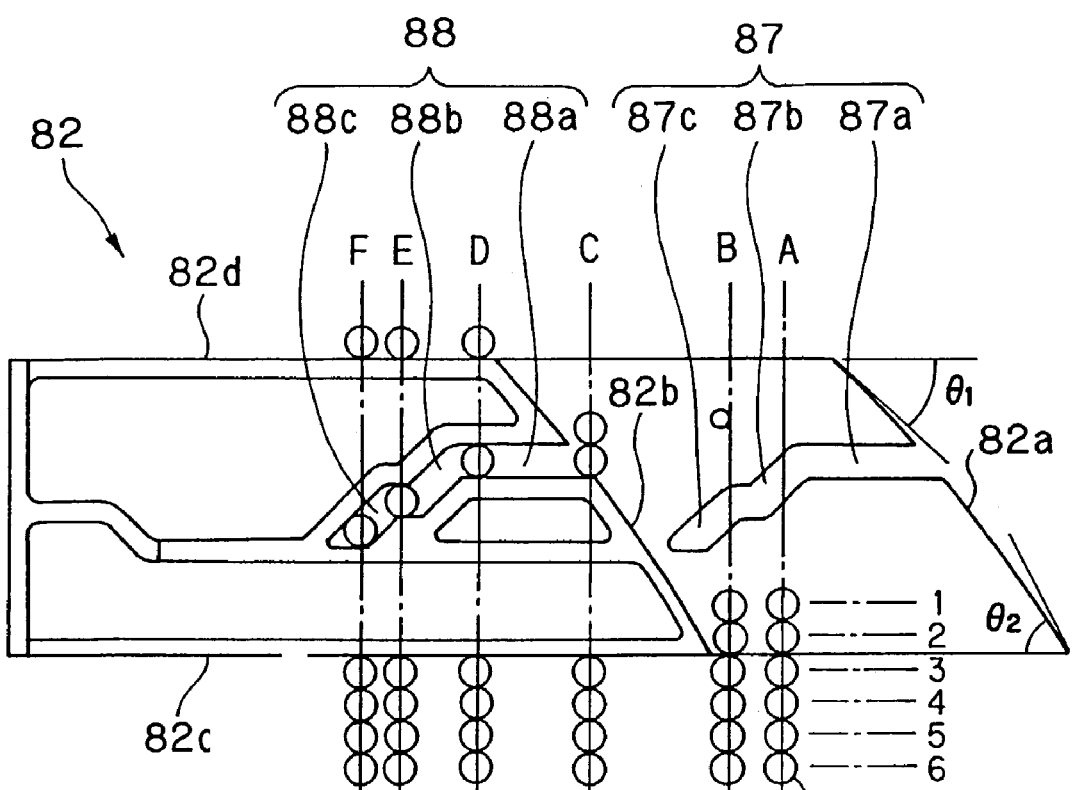
FIG. 12 provides side elevations of the separation cam, showing the structure thereof, in which FIG. 12A explains the operation of creating a space above and below the tray and FIG. 12B explains the operation of the chucking changeover mechanism.

As shown in FIGS. 4A and 12A, each of the pair of separation cams 82 is formed from a generally rectangular flat member, and each separation cam 82 has a surface 82a opposite to the front one (10a) of the pair of pins 10a and 10b provided on the opposite sides of the aforementioned tray 7 is projected more frontward a distance between the pair of pins 10a and 10b than a surface 82b opposite to the rear pin 10b.

In the surfaces 82a and 82b of the separation cam 82 opposite to the pair of pins 10a and 10b, there are formed slits 87 and 88 in which the pins 10a and 10b in pair are to be inserted respectively. Each of the slits 87 and 88 is continuously formed to extend from the middle portion of the surface 82a (82b) opposite to the pin 10a (10b) to the longitudinal middle portion and define a first section 87a (88a), a second section 87b (88b) at a lower level than the first section 87a (88a), and a third section 87c (88c) at a lower level than the second section 87b (88b).

The surfaces 82a and 82b opposite to the pair of pins 10a and 10b, respectively, are a slope with the lower end positioned before the upper end. It should be noted that the surfaces 82a and 82b opposite to the pair of pins 10a and 10b, respectively, will be referred to as "slopes 82a and 82b" hereunder.

As shown in FIG. 12, the slopes 82a and 82b are formed to meet the requirement of θ1=θ2=45 deg., for example, where θ1 is an angle of inclination of the slope part above the slits 87 and 88 and θ2 is an angle of inclination of the slope part below the slits 87 and 88.

However, since the tray 7 is moved up along the slope while the coil spring 15 fitted in the spring bearing 9a of the uppermost tray 7 is being compressed, the more the tray 7 is pushed up along the slope, the larger force is required to compress the compression spring 15. In other words, in the initial phase of pushing up the tray 7 along the slope, the coil spring 15 can be compressed with a small force.

To attain the above in this embodiment, the angle of inclination θ1 is set 45 deg. and angle of inclination θ2 is set 60 deg., for example, so that the slopes above and below the slits 87 and 88 are formed as a gentle arc. Thus, the pair of pins 10a and 10b on either end of the tray 7 can be pushed up smoothly along the slopes 82a and 82b.

As shown in FIG. 11, the pickup assembly 6 includes a pair of chuck levers 89 to hold the selected disc 2 rotatably while chucking it.

The chuck levers 89 in pair are a lower arm 90 and upper arm 91, and they are installed at the base ends thereof rotatably to the pickup elevator 79.

Figure 13:
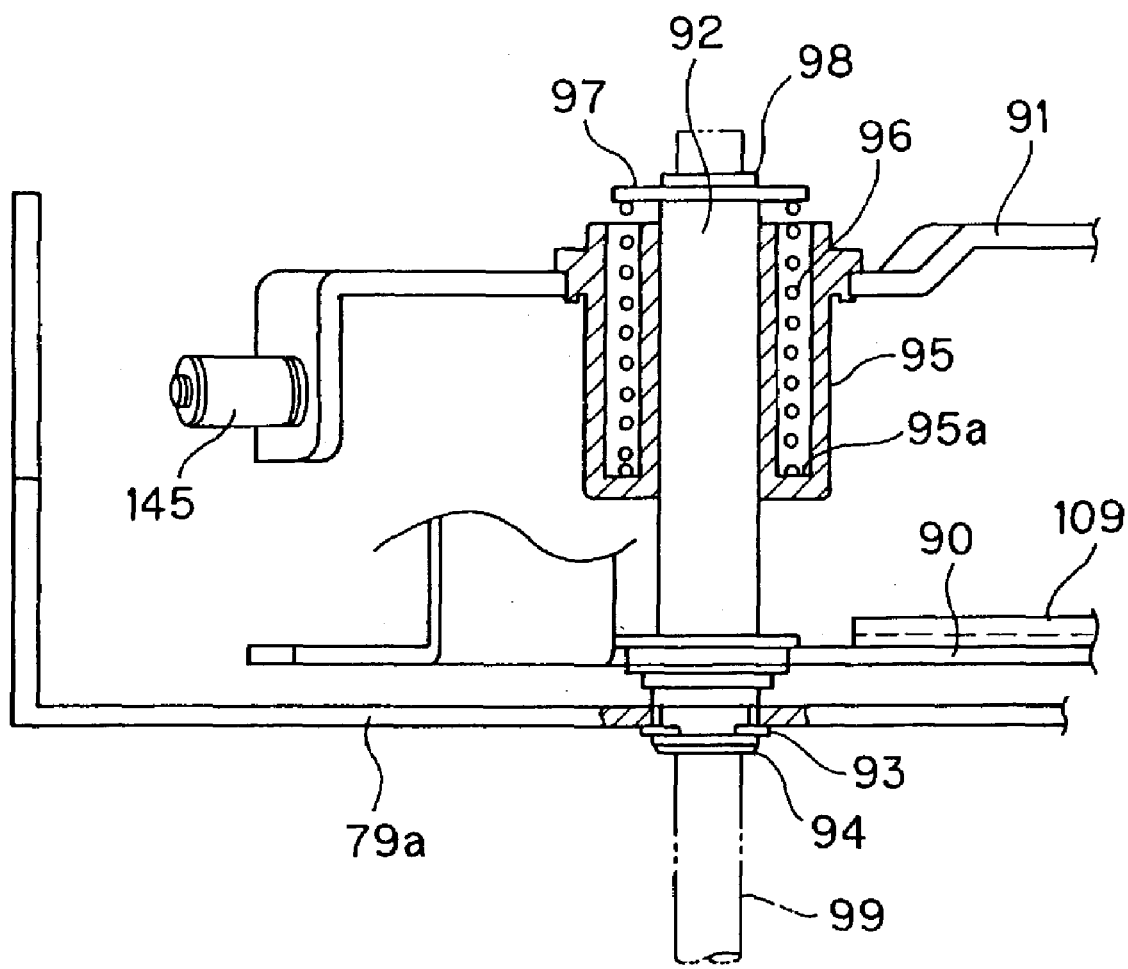
FIG. 13 is a sectional view of the pair of chuck levers, showing the base end portion thereof.

More specifically, each of the pair of chuck levers 89 has installed rotatably to the base end thereof a hollow shaft 92 penetrating through the lower and upper arms 90 and 91 and also through the horizontal plate 79a of the pickup elevator 79, as shown in FIG. 13. The hollow shaft 92 has a plain washer 93 and snap ring 94 fitted on the lower end portion thereof, and thus it is restrained from sliding axially.

The lower arm 90 is secured to the hollow shaft 92 while the upper arm 91 is secured to a sleeve 95 inserted in the hollow shaft 92. The sleeve 95 is formed from a copper alloy, for example, and has a circumferential recess 95a formed along the outer surface of the hollow shaft 92. A coil spring 96 is fitted in the circumferential recess 95a. The sleeve 95 is sealed at the upper opening thereof by a plain washer 97 and snap ring 98 fitted on the upper end portion of the hollow shaft 92.

Also, the hollow shaft 92 has inserted therein a column 99 erected from the bottom plate 1a, which contributes to an improved accuracy of positioning the pair of chuck levers 89.

Since the lower and upper arms 90 and 91 are turned about the hollow shaft 92 generally in parallel with each other while being opposite to each other, a sliding pin 100 rising from the lower arm 90 toward the upper arm 91 is slidably inserted in a sliding hole 101 formed in the upper arm 91.

Figure 14A:
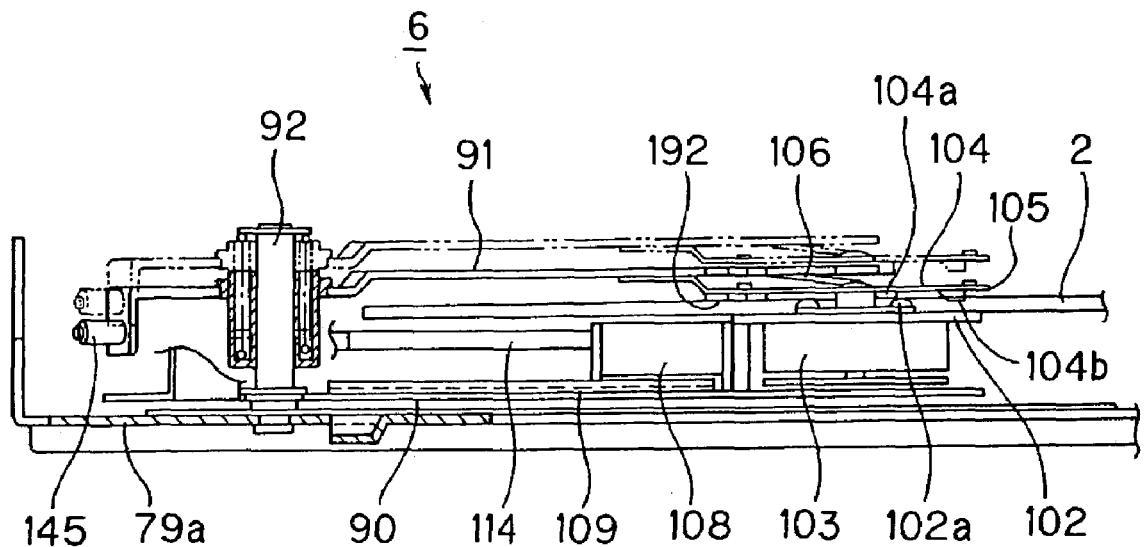
FIG. 14A shows the pair of chuck levers viewed longitudinally and FIG. 14B shows the pair of chuck levers viewed from the base end thereof.
Figure 14B:
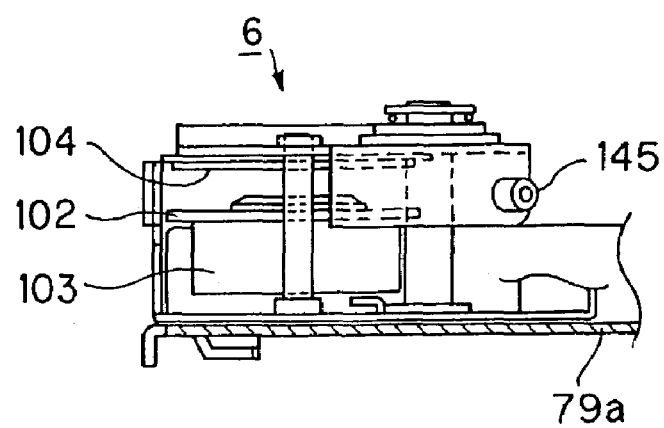

As shown in FIGS. 11, 14A and 14B, the pair of chuck levers 89 has provided at the free end thereof a generally disc-shaped turntable 102 provided on the end of the lower arm 90 to receive a disc 2 and hold it rotatably, and a spindle motor 103 to rotate the turn table 102. The turntable 102 is fixed at the center thereof to the spindle of the spindle motor 103. As shown, the turntable 102 is provided along with the spindle motor 103 on the surface of the lower arm 90 opposite to the upper arm 91.

On the other hand, the upper arm 91 has provided on the free end thereof a resin-made, generally disc-shaped chuck plate 104 to work with the turntable 102 in chucking a disc 2, a support plate 105 to rotatably support the chuck plate 104 at the outer circumference, and a leaf spring 106 disposed between the support plate 105 and upper arm 91 to force the chuck plate 104 toward the support plate 105.

More specifically, the support plate 105 is stepped in a range from the base end thereof cantilevered by the upper arm 91 to the free end thereof in which there is formed a hole in which the chuck plate 104 is fitted. It has the free end thereof directed opposite to the upper arm 91 with a predetermined space between them and is secured at the base end thereof to the disc-opposite surface of the upper arm 91. With the chuck plate 104 fitted in the hole in the support plate 105, the support plate 105 rotatably supports the chuck plate 104 at the outer circumference. Further, the leaf spring 106 provided between the support plate 105 and upper arm 91 forces the chuck plate 104 toward the support plate 105.

In the pair of chuck levers 89, the turntable 102 on the lower arm 90 and chuck plate 104 on the upper arm 91 have engagement projections 102a and 104a, respectively, disposed opposite to each other. The engagement projections 102a and 104a form a pair, are to be fitted in the central hole 2a of the disc 2 and also engage on each other. Further, the chuck plate 104 has provided along the outer circumference of the engagement projection 104a a generally toroidal projection 104b to press the disc 2 against the force of the leaf spring 106.

In the pickup assembly 6 constructed as above, the selected disc 2 will be rotated by the spindle motor 103 while being chucked and rotatably held by the pair of chuck levers 89.

As shown in FIGS. 11, 14A, 14B and 15, the pickup assembly 6 has a pickup unit 108 provided on the surface of the lower arm 90 opposite to the upper arm 91. The pickup unit 108 radiates laser light condensed by an objective lens 107 to the signal recording layer of the disc 2 and detects return light from the signal recording layer, to thereby read signal from the disc 2.

The pickup unit 108 is movable radially of the disc 2 by a guide rail 109 formed integrally with the lower arm 90.

More particularly, the pickup unit 108 includes a drive motor 110 provided in a position opposite to the turntable 102 on the lower arm 90, a worm gear 111 fixed to the spindle of the drive motor 110, a worm wheel 112 in mesh with the worm gear 111, a gear 113 pivoted integrally with the worm wheel 112, a screw shaft 114, and a gear 115a fixed to one end of the screw shaft 114 and engaged with the gear 113. These components are connected as will be seen from FIG. 15. The screw shaft 114 is positioned generally parallel to the guide rail 109, and born at the other end thereof by a bearing member 115b. The screw shaft 114 has screwed thereon an internally threaded portion 116 of the pickup unit 108. As the drive motor 110 is driven, the pickup unit 108 will reciprocally be moved radially of the disc 2 along the guide rail 109.

As shown in FIGS. 3, 8 and 9, the pickup assembly 6 further includes a pivoting mechanism 117 which is driven by the aforementioned drive motor 40 to pivot the pair of chuck levers 89.

More particularly, the pivoting mechanism 117 is constructed from a gear 118 fixed to the other and of the spindle 32 of the aforementioned drive roller 30, a gear train 119 including gears 119a to 119h in mesh with the gear 118, and a sliding bar 120 in mesh with the gear train 119. These components are provided along the inner surface of the side plate 1b.

There is also provided between the gear 118 and gear 119a of the gear train 119 a transmission changeover mechanism 121 to change over the power transmission from the drive motor 40.

More specifically, the transmission changeover mechanism 121 includes a generally rectangular sliding plate 122 movable vertically and a coupling lever 123 coupled to the sliding plate 122 as shown in FIGS. 8, 9, 16A and 16B.

The sliding plate 122 has a pair of guide holes 124a and 124b formed therein to extend vertically, while the side plate 1b has provided thereon a guide pin 125 which is inserted in the guide hole 124a in the sliding plate 122. The guide pin 125 has a snap ring (not shown) fitted on the free end thereof Also, the side plate 1b has secured thereto a spindle 126 of the gear 119b which is inserted in the guide hole 124b in the sliding plate 122.

The spindle 126 of the gear 119b and a spindle 127 of the gear 119a are coupled to each other by a coupling member 128. The sliding plate 122 has provided therein a cam hole 129 formed in a predetermined shape and in which the spindle 127 of the gear 119a is inserted. That is, the cam hole 129 in the sliding plate 122 extends vertically and includes two staggered portions of which the upper one is in a deeper position than the lower one.

The coupling lever 123 is installed at the center thereof rotatably to the side plate 1b by means of a fixing shaft 130, and at one end thereof rotatably to the lower end of the sliding plate 112 by means of a pin 131. On the other hand, the coupling lever 123 is extended at the other end thereof to a position where it abuts the pin 17a, provided at the front of the disc elevator 16, sliding in the vertical slits 19a and 19b in the side plate 1b.

The sliding plate 122 has a projecting spring hook 132 provided thereon in a position opposite to the above pin 131, and the bottom plate 1a has provided thereon a projecting spring hook 133 corresponding to the spring hook 132, A coil spring 134 is provided between the spring hooks 132 on the sliding plate 122 and spring hook 133 on the bottom plate 1a to force the sliding plate 122 downward.

In the transmission changeover mechanism 121, when the disc elevator 16 is lowered to the maximum, one end of the coupling lever 123 is pushed down by the pin 17a of the disc elevator 16 while the other end is pushed upward, so the sliding plate 122 is slid upward. Thus, the gear 119a in mesh with the gear 119b will be moved in the direction of arrow in FIG. 9 and put into mesh with the above gear 118.

In the pivoting mechanism 117, the sliding bar 120 is formed from a long flat member and has formed at opposite ends thereof a pair of guide holes 135a and 135b, respectively, extending longitudinally, as shown in FIGS. 9, 16A, 16B and 17. On the other hand, the side plate 1b has provided thereon a pair of guide pins 136a and 13b inserted in the guide holes 135a and 135b, respectively, in the sliding bar 120. Each of the pair of guide pins 136a and 136b has a snap ring (not shown) fitted on the free end thereof. Also, there is formed on one end of the sliding bar 120 a rack gear 137 which is in mesh with the gear 119h. Therefore, as the gear 119h is rotated, the sliding bar 120 will be slid in the direction of arrow in FIG. 17, namely, longitudinally.

Figure 15:
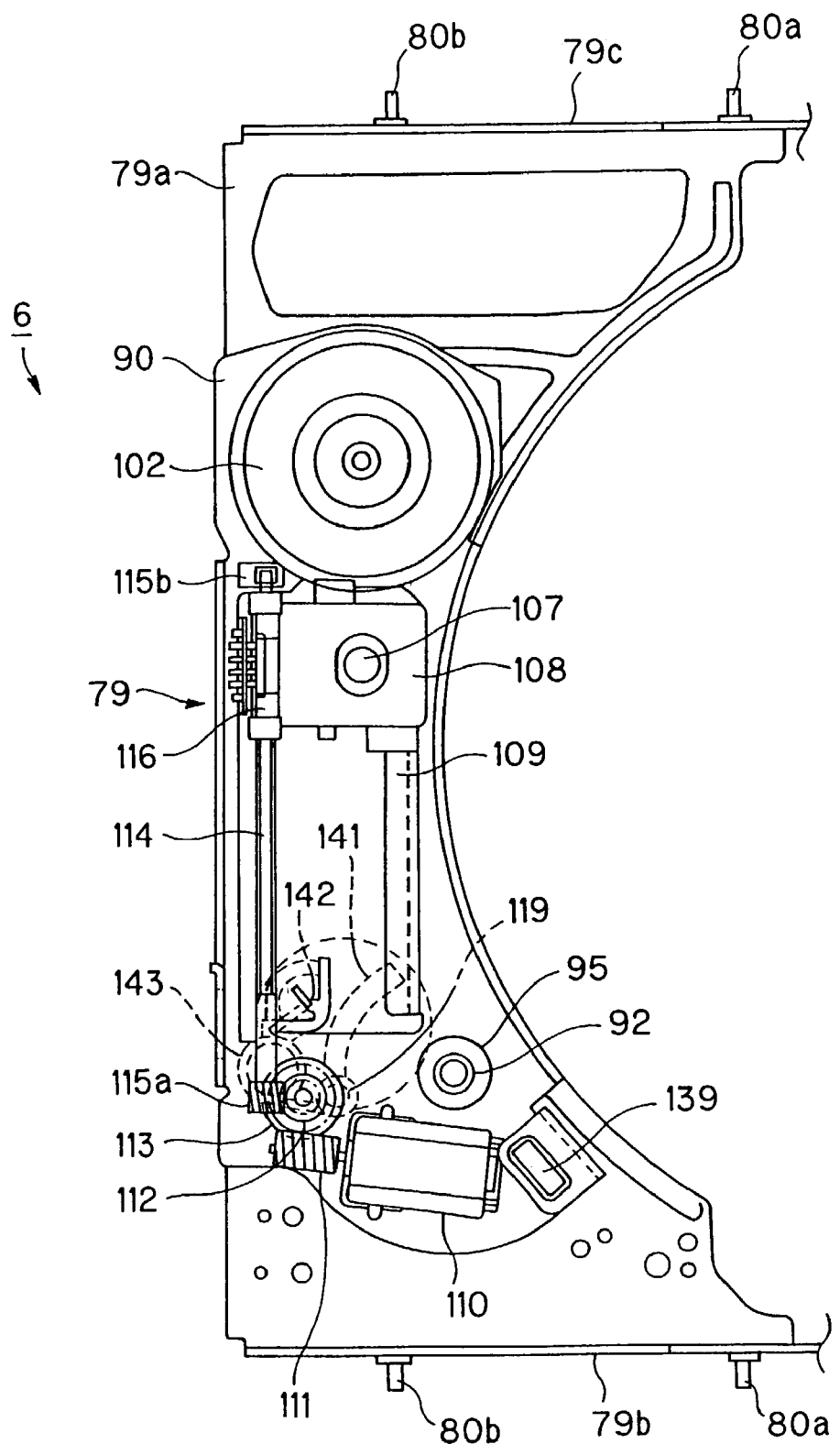
FIG. 15 is a plan view of the pickup assembly, showing the structure of the essential portion thereof.
Figures 16A, 16B:
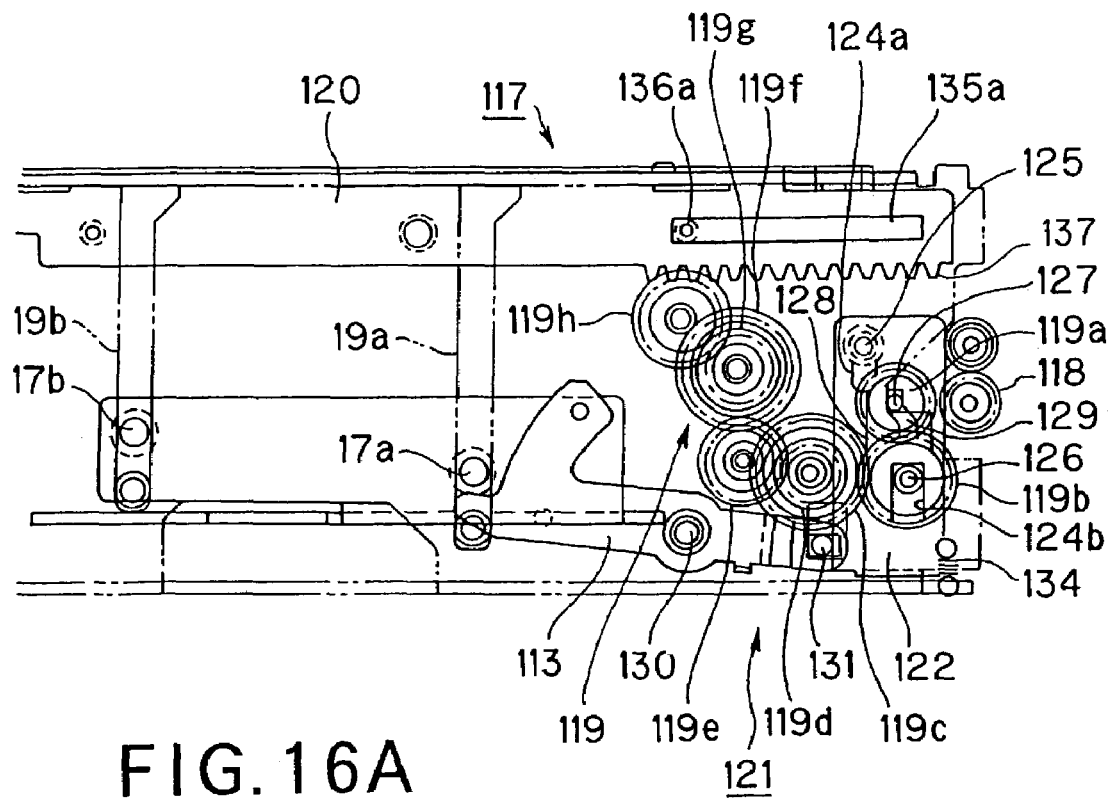
FIG. 16A shows the pre-changeover state and FIG. 16B shows the post-changeover state.
Figure 17:
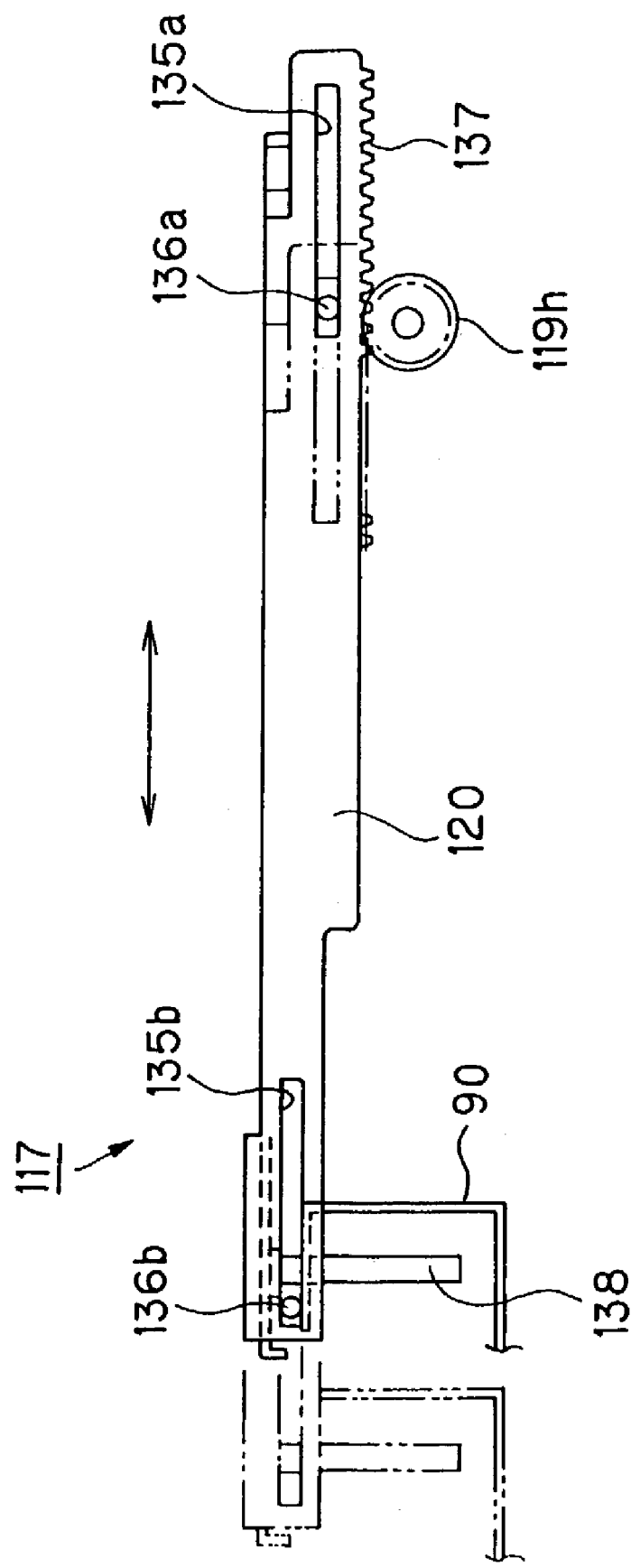
FIG. 17 is a side elevation of the sliding bar, showing the structure thereof.

As shown in FIGS. 3, 9 and 17, the sliding bar 120 is bent inwardly at the other end thereof and has a pin 138 formed to project downward from the bent portion. The lower arm 90 has formed at the base end thereof a horizontal portion extending up to a height where it is generally integral with the upper arm 91 as shown in FIGS. 11 and 15. An elongated hole 139 is formed in the horizontal portion toward the aforementioned hollow shaft 92. The pin 138 of the sliding bar 120 is loose-fitted in the elongated hole 139 in the lower arm 90.

Figure 18:
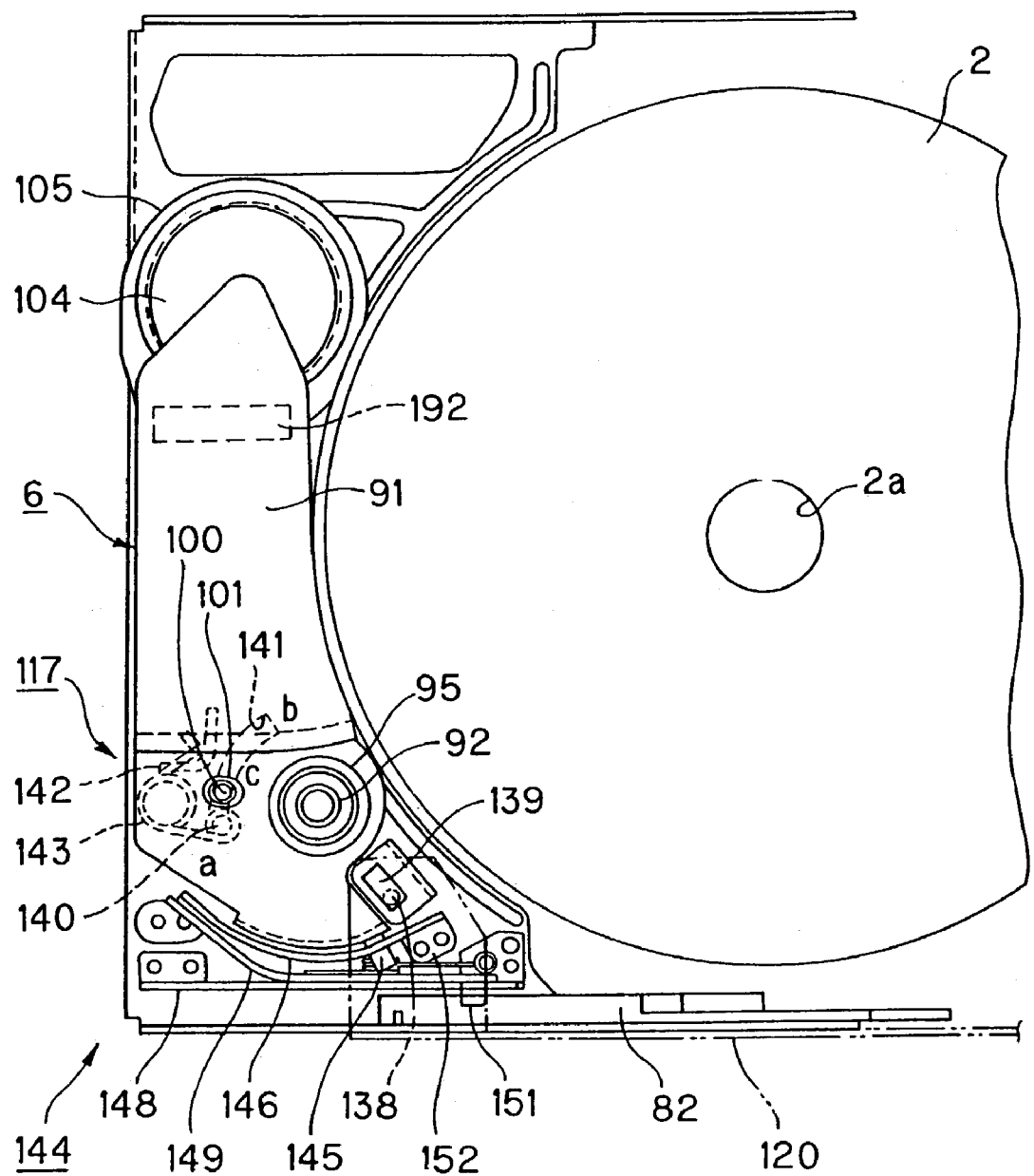
FIG. 18 is a plan view of the pair of chuck levers, showing the positions they take when in the disc insertion/ejection mode.
Figure 19:
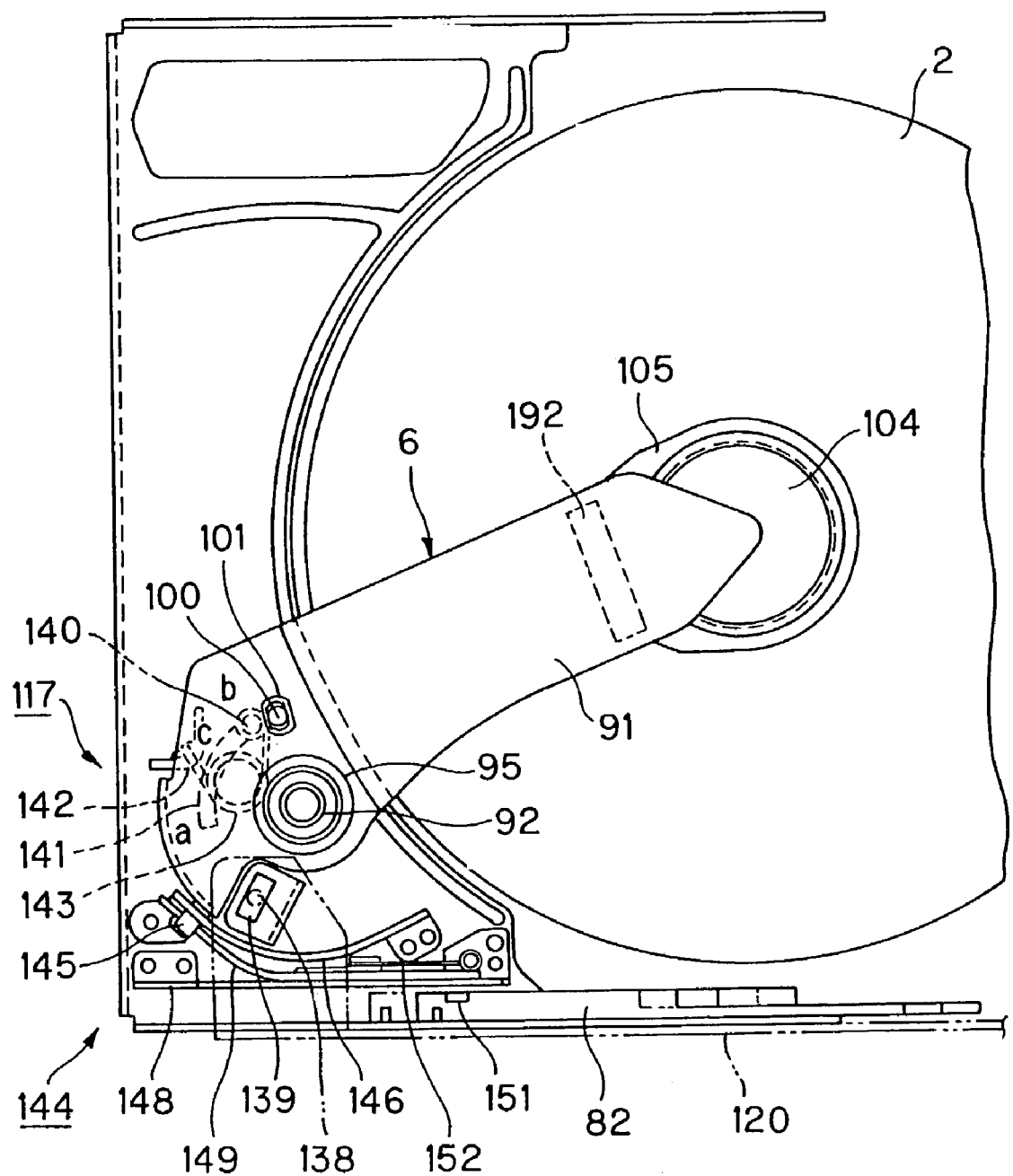
FIG. 19 is a plan view of the pair of chuck levers, showing the positions they take when in the playback mode.
Figure 20A:
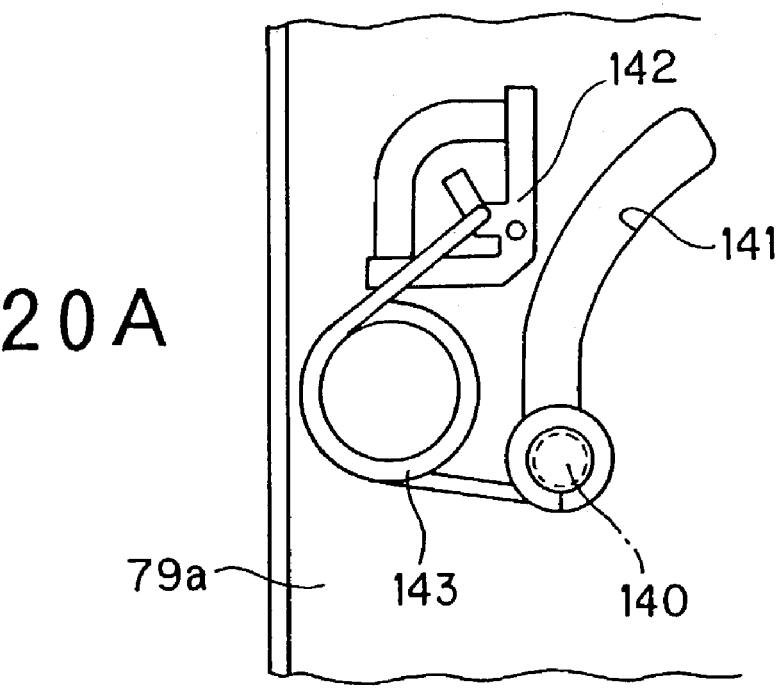
FIG. 20A shows the position the positioning pin of the lower arm takes when in the disc insertion/ejection mode and FIG. 20B shows the position of the positioning pin takes when in the playback mode.
Figure 20B:
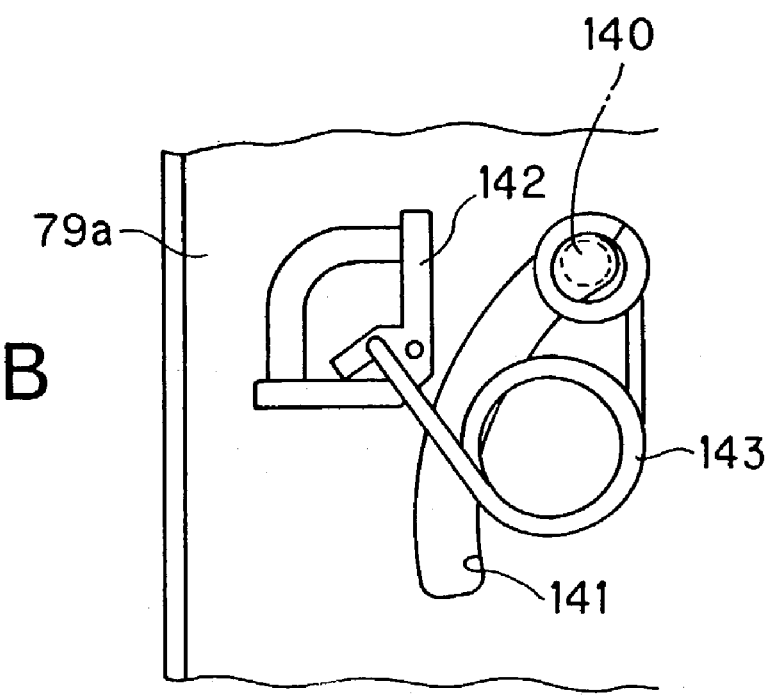

In the pivoting mechanism 117, as the sliding bar 120 slides longitudinally, the pair of chuck levers 89 will be turned radially of the disc 2 as shown in FIGS. 18 and 19.

Note that FIG. 18 shows the positions the pair of chuck levers 89 takes when in the so-called disc insertion/ejection mode to insert or eject the disc 2 with respect to the aforementioned disc compartment 3, and FIG. 19 shows the positions the pair of chuck levers 89 takes when in the so-called playback mode to write signals to the selected disc 2.

As shown in FIGS. 18, 19, 20A and 21B, in the pivoting mechanism 117, a positioning pin 140 is provided near the hollow shaft 92 through the lower arm 90 to extend downward, and there is formed in the horizontal plate 79a of the pickup elevator 79 a generally circular guide hole 141 in which the positioning pin 140 is inserted. The pickup elevator 79 has a spring hook 142 provided near the middle of the guide hole 141. A torsion coil spring 143 is provided between the springhook 142 and positioning pin 140.

In the pivoting mechanism 117, as the pair of chuck levers 89 is turned, the positioning pin 140 on the lower arm 90 will be slid in the guide hole 141. More specifically, when the pair of chuck levers 89 is positioned for the disc insertion/ejection mode, the positioning pin 140 is positioned at one end a of the guide hole 141, and when the pair of chuck levers 89 is positioned in a position for the playback mode, the positioning pin 140 is positioned at the other end b of the guide hole 141, which will be seen from FIGS. 18 and 19A. When the positioning pin 140 passes by a middle position c of the guide hole 141, the torsion coil spring 143 is changed in state from compression to decompression, and the positioning pin 140 will swiftly slide in the guide hole 141 from the middle position to the end of the guide hole 141 under the action of the torsion coil spring 143.

The pivoting mechanism 117 constructed as above can position the central hole 2a of the selected disc 2 and turntable 102 on the lower arm 90 with a high accuracy.

As shown in FIGS. 11, 18 and 19, the pickup assembly 6 further includes a chucking changeover mechanism 144 to switch the chucking by the pair of chuck levers 89 from one selected disc 2 to another. That is, the chucking changeover mechanism 144 sets a time when the upper arm 91 is to move vertically in relation to the lower arm 90 when the pair of chuck levers 89 is turned.

More specifically, the upper arm 91 has provided at the base end thereof a guide pin 145 extending toward the separation cam 82, and the pickup elevator 79 has provided on the horizontal plate 79a thereof and between the pair of chuck levers 89 and separation cam 82 a generally cylindrical plate 146 delineating an arc taking the hollow shaft 92 as the center. The cylindrical plate 146 has formed therein a guide hole 147 in which the guide pin 145 of the upper arm 91 is inserted.

The guide hole 147 is formed generally like "L" letter, consisting of a horizontal section 147a which will guide the guide pin 145 inserted therein, namely, the upper arm 91, to move horizontally and a vertical section 147b which will guide the upper arm 91 to move vertically. The guide pin 145 is projected out from the guide hole 147 in the cylindrical plate 146 toward the separation cam 82. With the guide pin 145 of the upper arm 91 inserted in the guide hole 147, the upper arm 91 is forced downward under the action of the coil spring 96 fitted in the aforementioned circumferential recess 95a in the sleeve 95.

Also, the pickup elevator 79 has provided on the horizontal plate 79a thereof and between the cylindrical plate 146 and separation cam 82 a bearing plate 148 extending generally parallel to the separation cam 82. A restraint lever 149 is installed pivotably on the surface of the bearing plate 148 opposite to the cylindrical plate 146.

The restraint lever 149 is formed from an elongated flat member bent from the separation cam 82 toward the cylindrical plate 146 and which is opposite at an end thereof at the side of the cylindrical plate 146 to a vertical section 147b of the guide hole 147. The restraint lever 149 is born at the middle thereof by a fixing shaft 150, and has a pin 151 provided at the end thereof at the side of the separation cam 82 to extend toward the separation cam 82. The fixing shaft 150 has fixed thereto a torsion coil spring 152 which forces downward the end of the restraint lever 149 at the side of the separation cam 82.

Figure 12B:
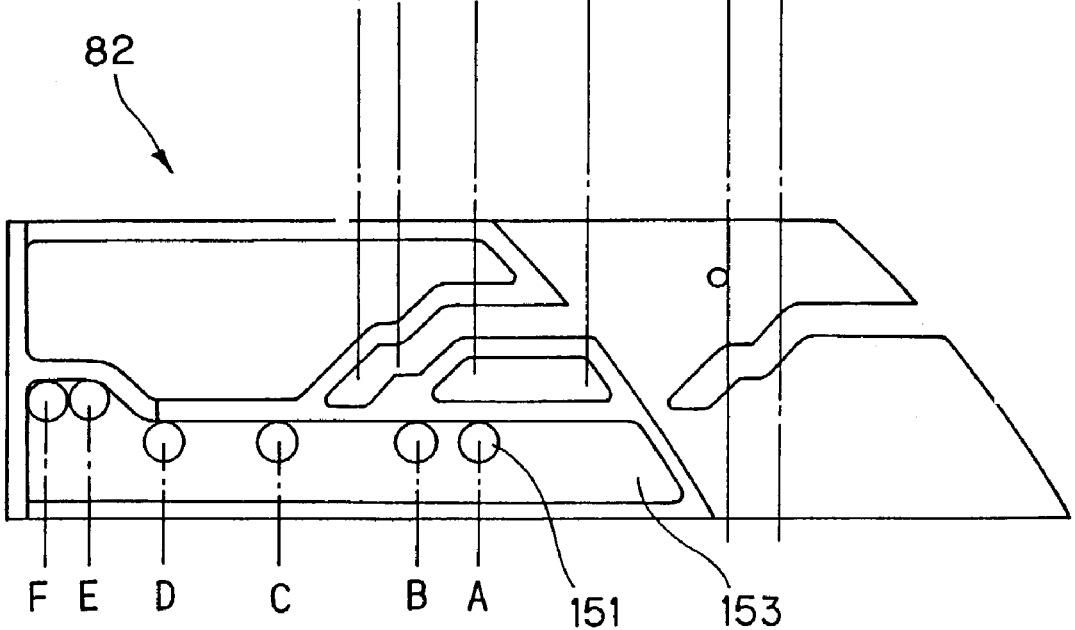

On the other hand, there is formed on the side of the separation cam 82 opposite to the guide pin 151 a cam groove 153 having a predetermined shape and in which the guide pin 151 is loose-fitted as shown in FIG. 12B. The cam groove 153 extends longitudinally and is shaped so that the rear end of the inner upper end face with which the guide pin 151 is in sliding contact is spread upward.

The operation of the separation cam 82 in creating a space above and below the selected tray 7 while holding the latter, and the operation of the chucking changeover mechanism 144 in chucking the selected disc 2 placed on the selected tray 7 by the pair of chucking levers 89, will be described below with reference to FIGS. 12 and 21.

Note that the six trays 7 stacked inside the disc compartment 3 will be numbered first to sixth from top to bottom and the second highest tray 7 be taken as the selected tray. Also, since the pair of pins 10a and 10b is pushed up together along the slopes 82a and 82b of the separation cam 82 in the same manner, only the operation for pushing up the rear pin 10b along the rear slope 82b of the separation cam 82 will be described below.

First in a position A as in FIG. 12A, the height of the separation cam 82 is so preset that the lower end of the slope 82b is positioned between the second selected tray 7 and third tray 7 of the six trays 7 stacked inside the disc compartment 3. The separation cam 82 slides frontward to a position B as in FIG. 12A. It should be noted that the height of the separation cam 82 is set through the vertical movement of the pickup elevator 79 as will be described in detail later.

Next, when the separation cam 82 has moved to a position C as in FIG. 12A, the pin 10b of the second selected tray 7 is pushed up along the slope 82b to the slit 88 in the separation cam 82. Also, the pin 10b of the third tray 7 slides along the lower surface of the separation cam 82. Thus, the first and second selected trays 7 are moved up and a space is created between the second selected tray 7 and third tray 7.

Then, when the separation cam 82 has moved to a position D as in FIG. 12A, the pin 10b of the second selected tray 7 slides in the first section 88a of the slit 88 while the pin 10b of the first tray 7 is pushed up along the slope 82b above the slit 88 to an upper surface 82d of the separation cam 82. Thus, a space is created between the first tray 7 and second selected tray 7 and an ample space for reception of the pair of chuck levers 89 is created above and below the selected tray 7.

Next, when the separation cam 82 has moved to a position E as in FIG. 12A, the pin 10b of the first tray 7 slides along the upper surface 82d of the separation cam 82 while the pint 10*b* of the second selected tray 7 slides in the second section 88*b* of the slit 88. Thus, the second selected tray 7 held on the pair of separation cams 82 is lowered until the selected disc 2 is placed on the turntable 102 on the lower arm 90.

Then, when the separation cam 82 has moved to a position F as in FIG. 12A, the pin 10*b* of the second tray 7 slides in the third section 88*c* of the slit 88. Thus, the second selected tray 7 held on the pair of separation cams 82 is further lowered and the selected tray 7 and the selected disc 2 placed on the turntable 102 are separated from each other.

Note that when the separation cam 82 slides rearward, the aforementioned operations are done reversely.

Figure 21A:
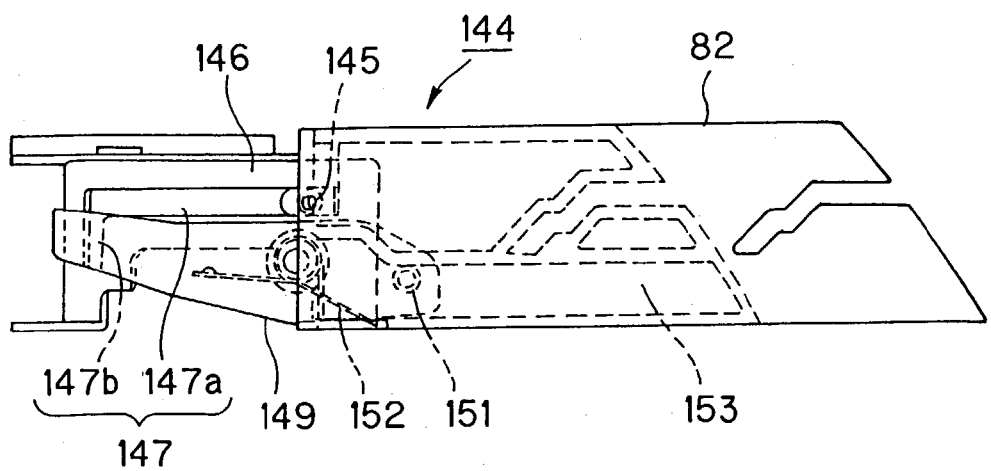
FIG. 21A shows the pre-changeover state.
Figure 21B:
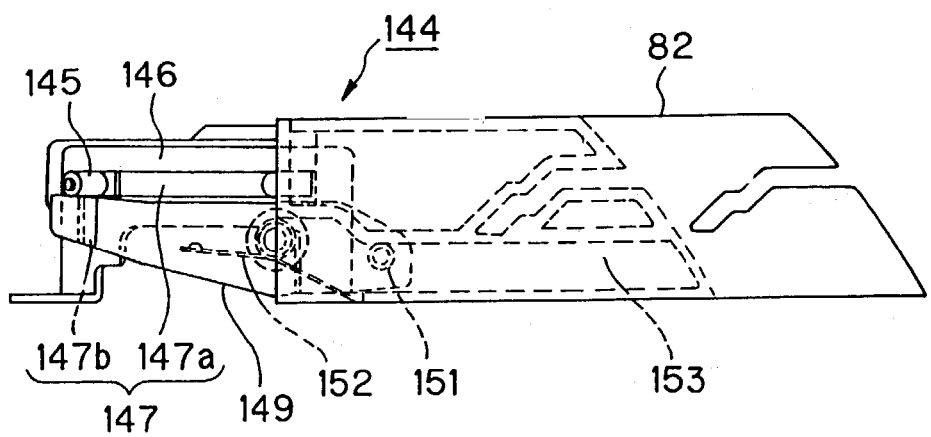
FIG. 21B shows the state just before the chucking changeover is made and FIG. 21C shows the post-changeover state.

On the other hand, in the chucking changeover mechanism 144, as the separation cam 82 moves longitudinally, the guide pin 151 on the restraint lever 149 slides in the cam groove 153 in the separation cam 82 between the positions A and D as in FIG. 12B, and the guide pin 145 on the upper arm 91 slides in the horizontal section 147*a* of the guide hole 147 formed in the cylindrical plate 146, as shown in FIGS. 21A and 21 B. At this time, there is created between the turntable 102 on the lower arm 90 and the chuck plate 104 on the upper arm 91 an ample space for allowing the selected tray 7 to pass through.

Figure 21C:
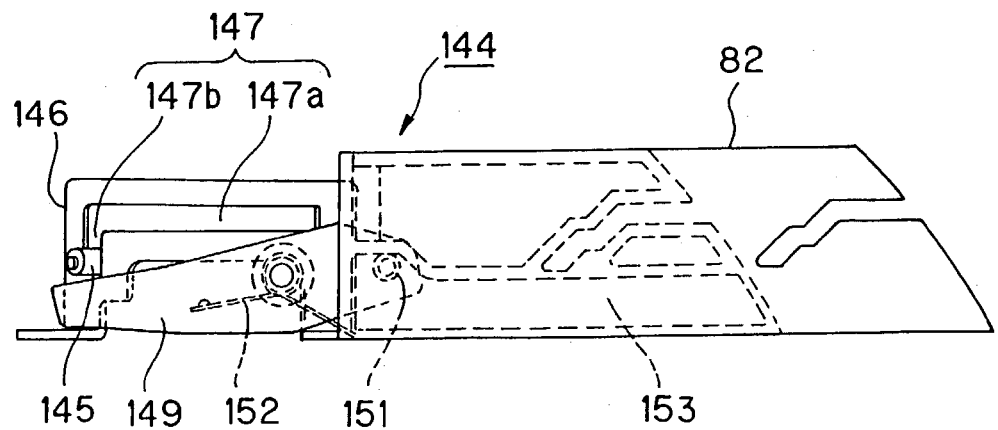

In the chuck changeover mechanism 144, when the guide pin 151 on the restraint lever 149 slides in the cam groove 153 in the separation cam 82 between the positions D and F as in FIG. 12B, the guide pin 145 on the upper arm 91 slides in the vertical section 147*b* of the guide hole 147 formed in the cylindrical plate 146 as shown in FIG. 21C. At the same time, under the action of the coil spring 96 fitted in the circumferential recess 95*a* in the sleeve 95, the guide pin 145 on the upper arm 91 forces down the end of the restraint lever 149 at the side of the cylindrical plate 146 against the force of the torsion coil spring 152. Thus, the upper arm 91 is lowered in relation to the lower arm 90, so that the selected disc 2 is chucked about the central hole 2*a* thereof between the turntable 102 on the lower arm 90 and the chuck plate 104 of the upper arm 91.

Figure 22A:
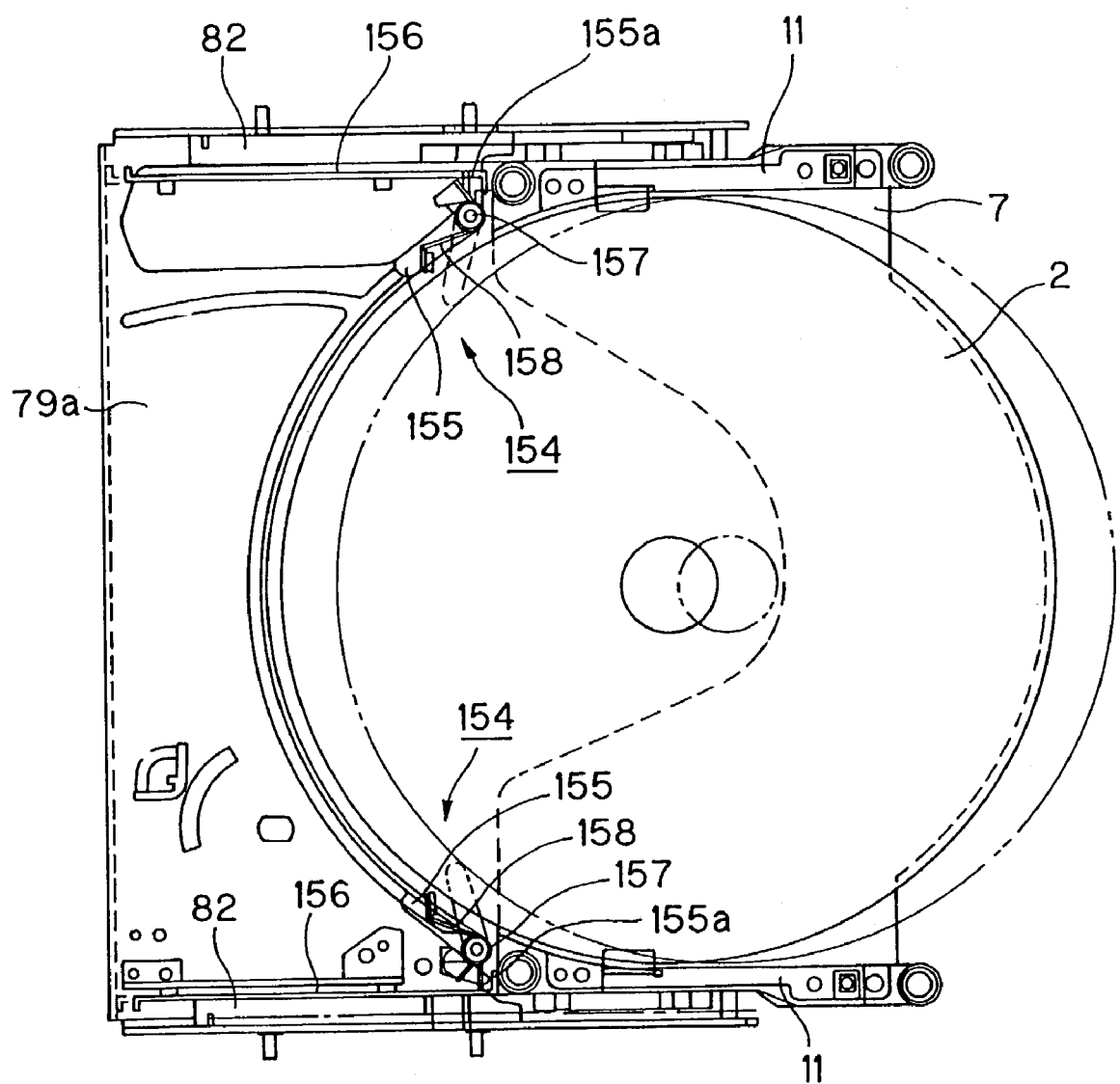
FIG. 22A is a plan view of the disc push-out mechanism, showing the structure thereof.
Figure 22B:
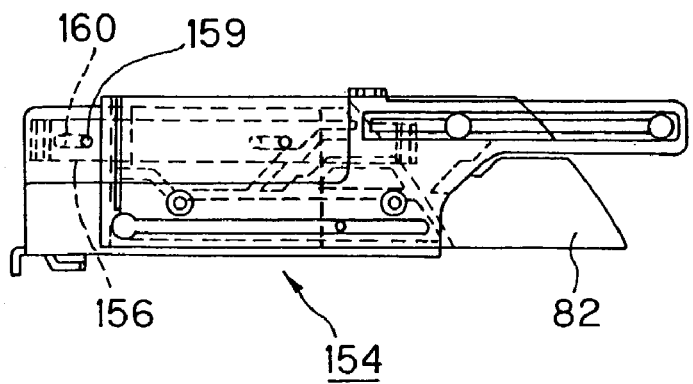
FIG. 22B is a side elevation of the disc push-out mechanism.

To eject the disc 2 stored in the disc compartment 3 through the disc insertion/ejection slot 4, the disc insertion/ejection unit 5 includes a disc push-out mechanism 154 to push out the disc 2 a predetermined distance toward the disc insertion/ejection slot 4 as shown in FIGS. 11, 22A and 22B.

More particularly, the disc push-out mechanism 154 includes a pair of push-out levers 155 provided near opposite rear ends of the disc 2 placed on the tray 7 to be pivotable in the in-plane direction of the disc 2, and a pair of push-out plates 156 provided on the surface of the bearing plate 148 opposite to the separation cam 82 to turn the pair of push-out levers 155 frontward when the separation cam 82 has moved rearward.

The pair of push-out levers 155 is born on a fixing shaft 157 extending vertically downward from the top plate 1*e* so as to be generally level with the disc insertion/ejection slot 4. Also, the fixing shaft 157 has provided thereon a torsion coil spring 158 which forces the free end of the pair of push-out levers 155 toward the rear end of the disc 2. Further, each of the pair of push-out levers 155 has formed in the base end thereof an engagement piece 155*a* which is engaged on the push-out plate 156.

On the other hand, each of the pair of push-out plates 156 is formed from an elongated flat member bent inwardly at the front end thereof (first bent portion 156*a*) and outwardly at the rear end thereof (second bent portion 156*b*) as best shown in FIG. 11. The push-out plate 156 is longitudinally movable, and has a pair of guide pins 159 provided on the surface thereof opposite to the bearing plate 148 having a pair of guide holes 160 formed longitudinally therein. The pair of guide pins 159 is inserted in the pair of guide holes 160, respectively.

In the disc push-out mechanism 154, the engagement piece 155*a* of the push-out lever 155 is engaged on the first bent portion 156*a* of the push-out plate 156. As the separation cam 82 is moved rearward, the separation cam 82 will force the second bent portion 156*b* of the push-out plate 156, and thus cause the push-out plate 156 to slide rearward. Then the first bent portion 156*a* of the push-out plate 156 forces the engagement piece 155*a* of the push-out lever 155 and pivots the free end of the push-out lever 155 frontward against the force of the torsion coil spring 158. Thus, the pair of push-out levers 155 will force the disc 2 out a predetermined distance toward the disc insertion/ejection slot 4.

As shown in FIGS. 2, 3, 23A and 23B, the apparatus body I further includes an actuator 161 to move the disc elevator 79 vertically while moving the pair of separation cams 82 longitudinally.

More particularly, the actuator 161 has provided outside the pair of side plates 1*b* and 1*c* a pair of inner sliders 162 and a pair of outer sliders 163, movable longitudinally.

Figure 23A:
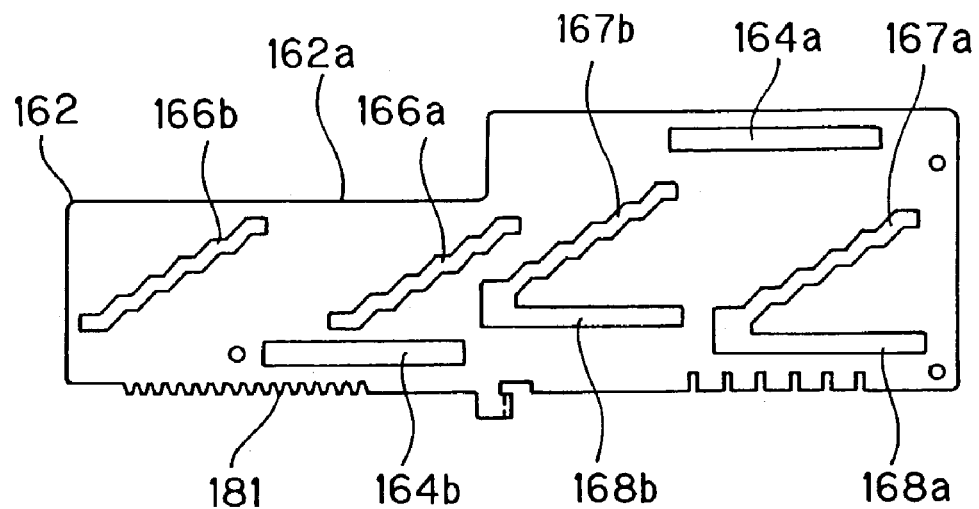
FIG. 23A shows the structure of the inner slider and FIG. 23B shows the structure of the outer slider.

As shown in FIGS. 2, 3 and 23A, each inner slider 162 is formed from a generally rectangular flat member corresponding to the side plates 1*b* and 1*c*, and disposed between the side plates 1*b* and 1*c* and the outer slide 163.

The inner slide 162 has formed at the front upper end and rear lower end thereof a pair of guide holes 164*a* and 164*b*, respectively, extending longitudinally. Each of the side plates 1*b* and 1*c* has formed therein guide pins 165*a* and 165*b* which are inserted in the guide holes 164*a* and 164*b*, respectively, in the outer slider 163.

Also, the inner slider 162 has formed therein a pair of first slits 166*a* and 166*b* in which there is inserted the pair of pins 80*a* and 80*b* provided at either side of the aforementioned pickup elevator 79. Each of the first slits 166*a* and 166*b* is stepped with the front end thereof being above the rear end to move the pickup elevator 79 vertically in six steps.

Further, the inner slider 162 has formed therein a pair of second slits 167*a* and 167*b* in which there is inserted the pair of pins 17*a* and 17*b* provided at either side of the aforementioned disc elevator 16. Each of the second slits 167*a* and 167*b* is stepped with the front end thereof being above the rear end to move the disc elevator 16 vertically in six steps.

Furthermore, the inner slider 162 has third slits 168*a* and 168*b* formed in series frontward from the rear ends, respectively, of the second slits 167*a* and 167*b* to move solely the pickup elevator 16 vertically when in the playback mode.

Figure 23B:
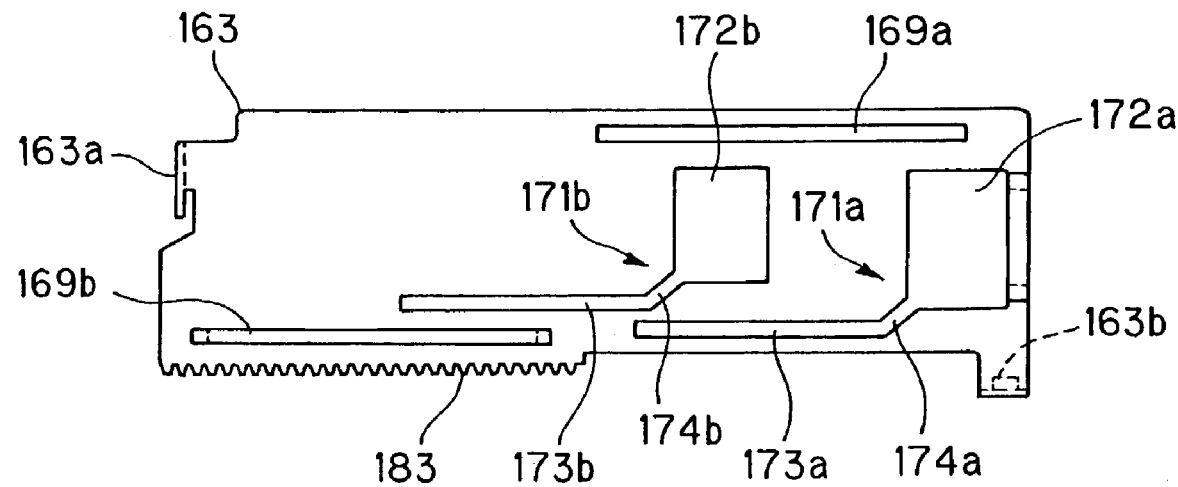

On the other hand, the outer slider 163 is formed from a generally rectangular flat member corresponding to the inner slider 162, and disposed outside the inner slider 162, as shown in FIGS. 2, 3 and 23B.

The outer slider 163 has provided at the front upper end and rear lower end thereof a pair of guide holes 169*a* and 169*b* extending longitudinally and in which the guide pins 165*a* and 16*b* on the side plates 1*b* and 1*c* are inserted. Therefore, the pair of guide pins 165*a* and 165*b* are inserted in the pair of guide holes 164*a* and 164*b* in the inner slider 162 and pair of guide holes 169*a* and 169*b* in the outer slider 163, and the guide pins 165*a* and 165*b* have snap rings 170*a* and 170*b* fitted on the free ends thereof.

The outer slider 163 has formed therein a pair of slits 171*a* and 171*b* in which there are inserted the pair of pins 17*a* and 17*b* provided on opposite sides of the disc elevator 16. The slit 171*a* is a succession of a first slit section 172*a* for sliding the pin 17*a* in the second slits 167*a* in the inner slider 162 when in the disc insertion/ejection mode, a second slit section 173a for sliding the pin 17a in the third slits 168a in the inner slider 162 when in the playback mode, and a third slit section 174a located between the first slit section 172a and second slit section 173a to switch the mode of operation between the disc insertion/ejection and playback. Similarly, the slit 171b in pair with the slit 171a is a succession of a first slit section 172b for sliding the pin 17b in the second slit 167b in the inner slider 162 when in the disc insertion/ejection mode, a second slit section 173b for sliding the pin 17b in the third slits 168b in the inner slider 162 when in the playback mode, and a third slit section 174b located between the first slit section 172b and second slit section 173b to switch the mode of operation between the disc insertion/ejection and playback.

The first slit sections 172a and 172b are formed generally rectangular, the second slit sections 173a and 173b are formed extending longitudinally, and the third slit section 174a is laid between the rear lower end of the first slit section 172a and front end of the second slit section 173a and inclined at an angle of about 45 deg. while the third slit section 174b is laid between the rear lower end of the first slit section 172b and front end of the second slit section 173b and also inclined at an angle of about 45 deg.

The outer slider 163 is bent inwardly at the rear end thereof (first bent portion 163a). Correspondingly, the inner slider 162 has a cut 162a formed longitudinally therein as shown in FIGS. 3 and 23A, and each of the side plates 1b and 1c has a clearance hole 175 formed longitudinally therein as shown in FIG. 3. The first bent portion 163a of the outer slider 163 is fitted in a recess 176 formed vertically in each of the pair of separation cams 82 as shown in FIG. 3. Thus, as the outer slider 163 moves longitudinally, the separation cam 82 can be moved longitudinally and vertically.

The outer slider 163 is bent inwardly at the front lower end thereof (second bent portion 163b) as shown in FIGS. 3 and 23B. The second bent portion 163b of the outer slider 163 is engaged on the bent portion 78 of the aforementioned longitudinal-sliding plate 72. As the outer slider 163 slides rearward, the second bent portion 163b of the outer slider 163 forces the longitudinal-sliding plate 72 at the bent portion 78 rearward and pushes up the shutter 60 by means of the coupling lever 73. Thus, the shutter mechanism 59 will open the disc insertion/ejection slot 4.

As shown in FIGS. 3, 9, 23A and 23B, the actuator 161 further includes a slider drive mechanism 177 to slide the inner and outer sliders 162 and 163 longitudinally.

More specifically, the slider drive mechanism 177 has a first coupling shaft 178 provided below the bottom plate 1a to couple the pair of inner sliders 162 to each other, and a second coupling shaft 179 provided before the first coupling shaft 178 to couple the pair of outer sliders 163 to each other.

The first coupling shaft 178 is born rotatably in a bearing (not shown) and has a pair of pinion gears 180 fixed to opposite ends thereof The inner slider 162 has formed over the rear lower end portion thereof a rack gear 181 which is in mesh with the pinion gear 180 as shown in FIGS. 3 and 23A.

Similarly, the second coupling shaft 179 is born rotatably in a bearing (not shown) and has a pair of pinion gears 182 fixed to opposite ends thereof. The outer slider 163 has formed over the rear lower end portion thereof a rack gear 183 which is in mesh with the pinion gear 182 as shown in FIGS. 3 and 23B.

Also, the first and second coupling shafts 178 and 179 have gears 184 and 185, respectively, fixed in predetermined longitudinal positions. These gears 184 and 185 are in mesh with worm gears 190 and 19 1, respectively, fixed to the spindles of drive motors 188 and 189 by means of the gear trains 186 and 187 born on the bearing plate 148.

The slider drive mechanism 177 constructed as above can drive to rotate the drive motors 188 and 189 to slide the inner and outer sliders 162 and 163 longitudinally independently of each other.

The disc changer constructed as having been described in the foregoing functions as will be described below:

The disc changer according to the present invention operates in two modes. One of the modes of operation is a disc insertion/ejection mode in which the disc 2 is inserted or ejected into or from the disc compartment 3, and a playback mode in which any one (selected disc) of the discs 2 stored in the disc compartment 3 is selected and signals are read from the selected disc 2.

Figure 24:
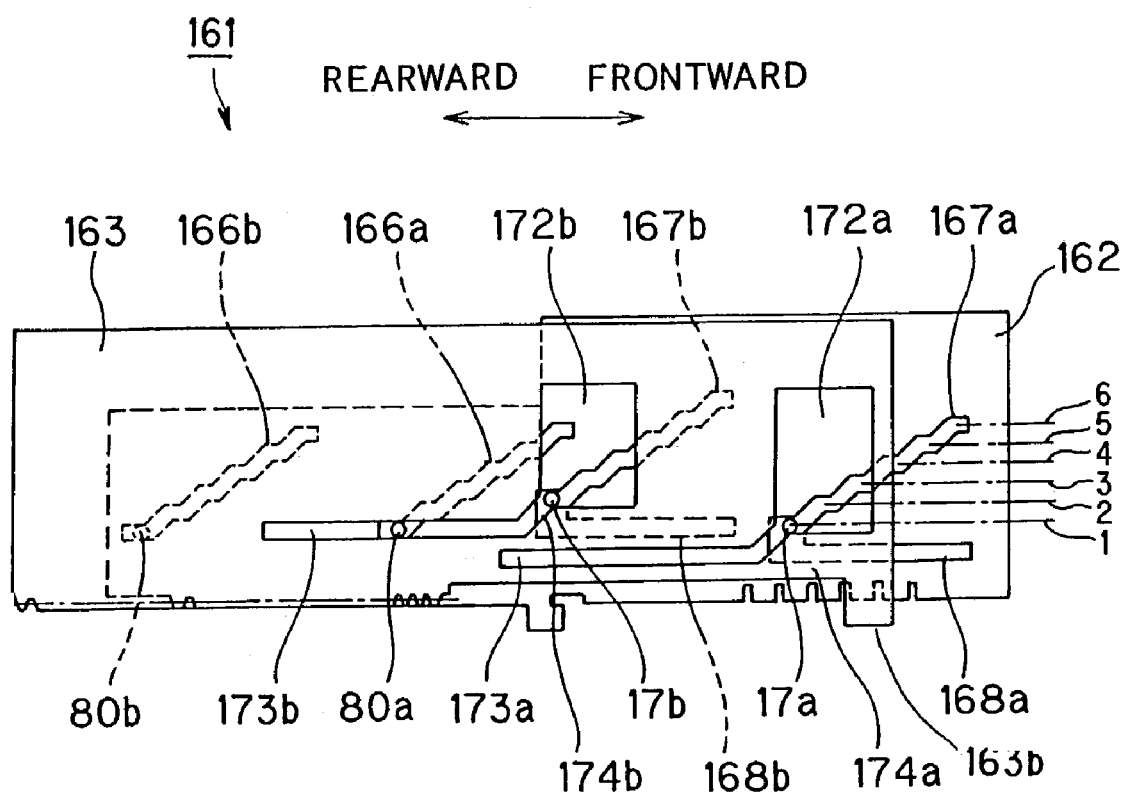
FIG. 24 is a side elevation of the actuator, showing the mode changeover position when in the disc insertion/ejection mode.

In case the disc changer operates in the disc insertion/ejection mode, as the aforementioned actuator 161 slides the inner and outer sliders 162 and 163 longitudinally, the pair of pins 17a and 17b of the disc elevator 16 will slide in the second slits 167a and 167b in the inner slider 162 and first slit sections 172a and 172 in the outer slider 163 as will be known from FIG. 24 for example. Note that FIG. 24 shows the mode changeover position of the pair of pins 17a and 17b when in the disc insertion/ejection mode.

For insertion of the disc 2 into the disc compartment 3 when in the disc insertion/ejection mode (for placing the disc 2 onto the second tray 7, for example), the user selects and pushes a "2" button for example and then an "Insert" button, these buttons being provided on the control panel (not shown) provided on the front surface of the housing.

Figure 25:
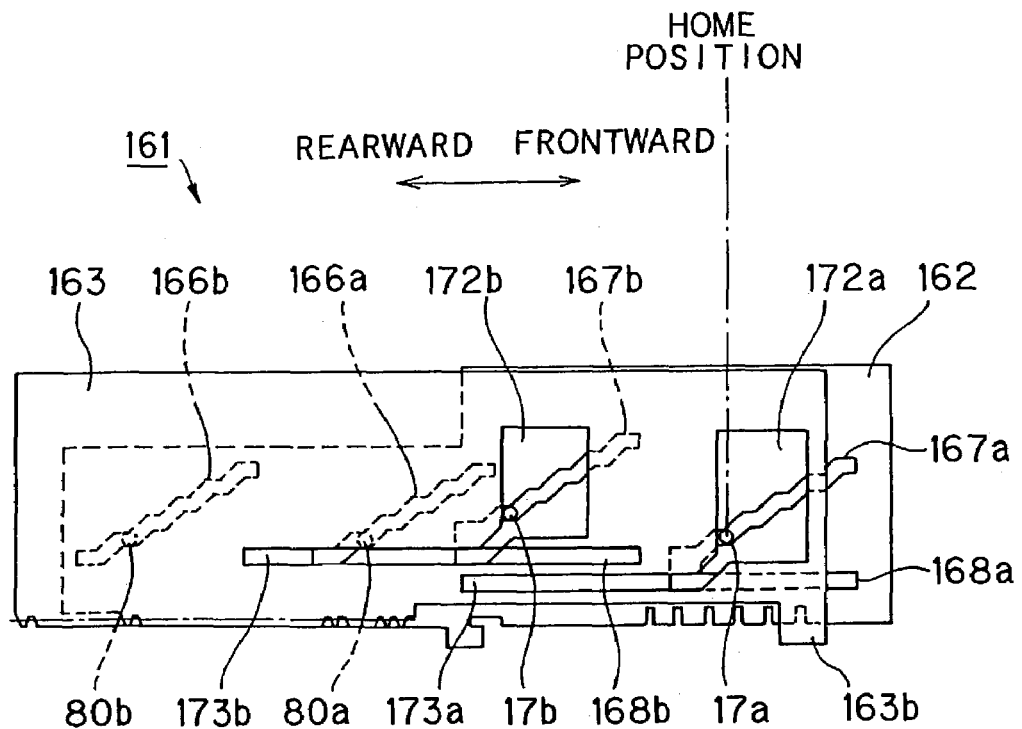
FIG. 25 is a side elevation of the actuator, showing the home position thereof for insertion or ejection of a second disc.

In this case, the inner slider 162 will retreat to push up the pair of pins 17a and 17b to the second lowest step of the second slits 167a and 167b as shown in FIG. 25. Thus, the disc elevator 16 moves up until the second tray 7 will be set generally level with the disc insertion/ejection slot 4.

As above, the disc insertion/ejection mode is such that a desired one of the six trays 7 stacked on the disc elevator 16 can be set generally level with the disc insertion/ejection slot 4 by sliding only the inner slider 162 longitudinally with the pair of pins 17a and 17b of the disc elevator 16 being inserted in the second slits 167a and 167b of the inner slider 162 and first slit sections 172a and 172b of the outer slider 163.

Note that in this case, the disc elevator 16 is moved vertically along with the pickup elevator 79, which will not adversely affect the disc insertion/ejection mode of operation.

Figure 26:
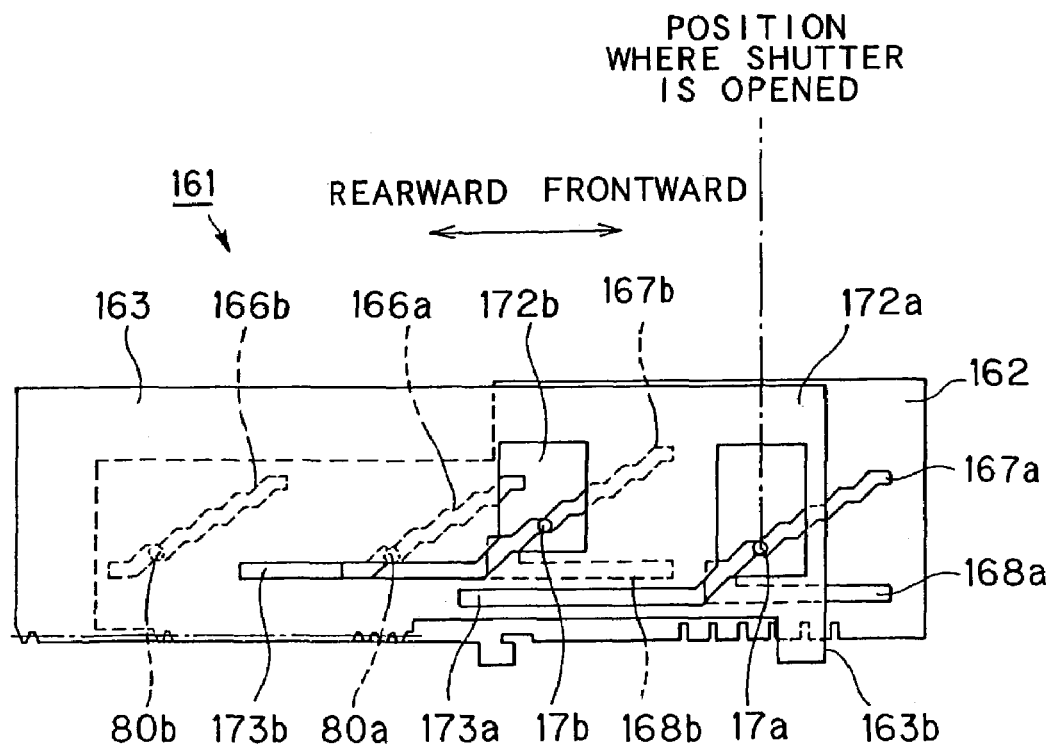
FIG. 26 is a side elevation of the actuator, showing the shutter opening position thereof for insertion or ejection of the second disc.

Next, the outer slider 163 is retreated until the pair of pins 17a and 17b comes to an intermediate position between the first slit sections 172a and 172b as shown ill FIG. 26. Thus, the second bent portion 163b of the outer slider 163 forces rearward the bent portion 78 of the longitudinal-sliding plate 72 shown in FIG. 3 until the shutter 60 will be pushed up by the coupling lever 73. Then, the disc insertion/ejection slot 4 is opened.

Figure 27A:
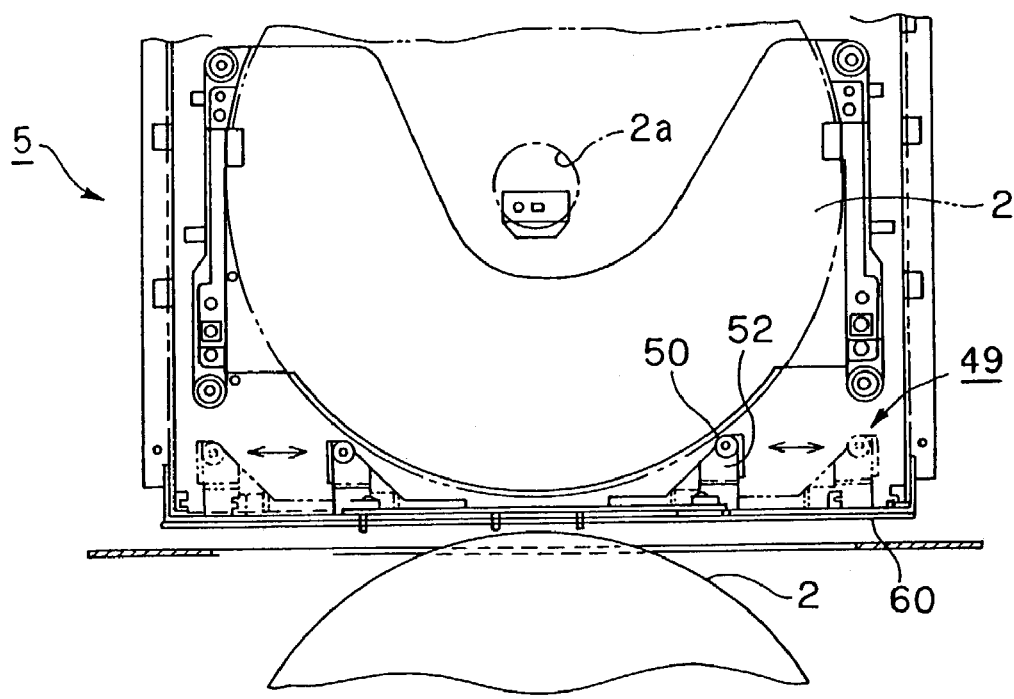
FIG. 27A is a perspective plan view of the apparatus body and FIG. 27B is a perspective side elevation of the apparatus body.
Figure 27B:
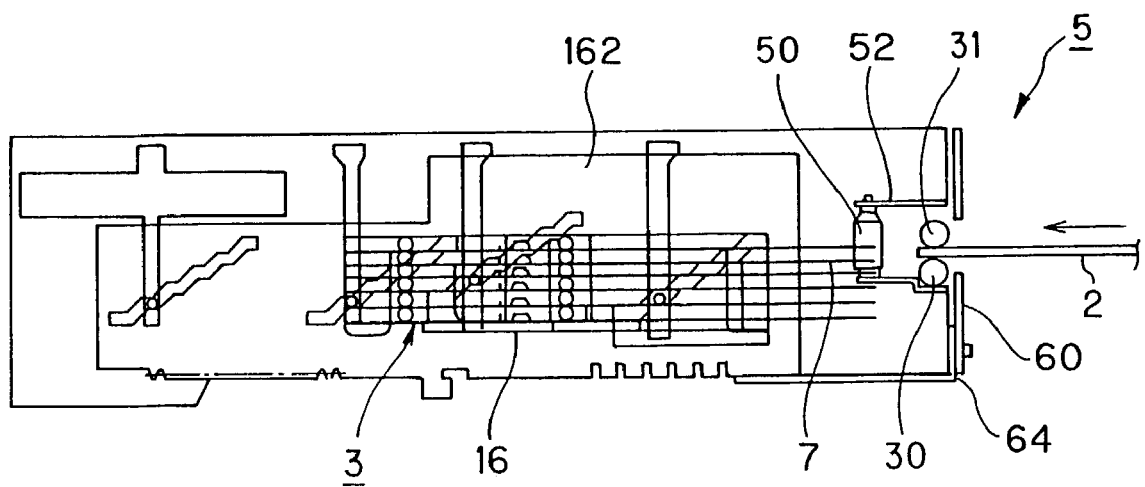

Next, when the disc 2 is inserted from the disc insertion/ejection slot 4 thus opened, a sensor (not shown) provided in the front center of the shutter 60 will detect the approaching disc 2 and the drive motor 40 in the aforementioned disc insertion/ejection unit 5 will drive to rotate the drive roller 30 in the inserting direction, as shown in FIGS. 27A and 27B. Thereby, the disc 2 caught between the pair of driver rollers 30 and driven roller 31 is inserted into the disc compartment 3.

The disc 2 inserted from the disc insertion/ejection slot 4 is further pushed a predetermined distance (a few millimeters) from the position where it can be inserted by the pair of drive rollers 30 and driven roller 31 into the disc compartment 3 by the pair of vertical rollers 50 of the aforementioned disc push-in mechanism 49. Thus, the disc 2 will be placed onto the second tray 7 and retained there by the retainer 11a of the leaf spring 11.

When the disc 2 leaves the pair of drive rollers 30 and driven roller 31, a limit switch (not shown) will be activated to stop the drive roller 30 from running, and as the outer slider 163 slides forward, the pair of pins 17a and 17b is returned to a home position shown in FIG. 25. Thus, the bent portion 78 of the longitudinal-sliding plate 72 is moved frontward along with the second bent portion 163b of the outer slider 163, and the shutter 60 be forced down by means of the coupling lever 73. Thereby, the disc insertion/ejection slot 4 will be closed.

As above, the disc 2 can be placed onto the second tray 7. It should be noted that any desired disc 2 can be placed onto any tray 7 other than the second tray 7 by making similar operations to the above.

On the other hand, for ejection of a disc 2 from the disc compartment 3 when in the disc insertion/ejection mode (for ejecting the disc 2 out of the second tray 7, for example), the user selects and pushes a "2" button for example and then an "Eject" button, these buttons being provided on the control panel (not shown) provided on the front surface of the housing.

In this case, as the inner slider 162 is first retreated from the mode changeover position shown in FIG. 24, the pair of pins 17a and 17b will be pushed up to the second lowest step of the second slits 167a and 167b shown in FIG. 25. Thus, the disc elevator 16 is moved up until the second tray 7 is set generally level with the disc insertion/ejection slot 4. As the outer slider 163 is retreated to the intermediate position between the first slit sections 172a and 172b as shown in FIG. 26, the disc insertion/ejection slot 4 will be opened. It should be noted that the above operations are quite the same as those for the disc insertion.

Figure 28:
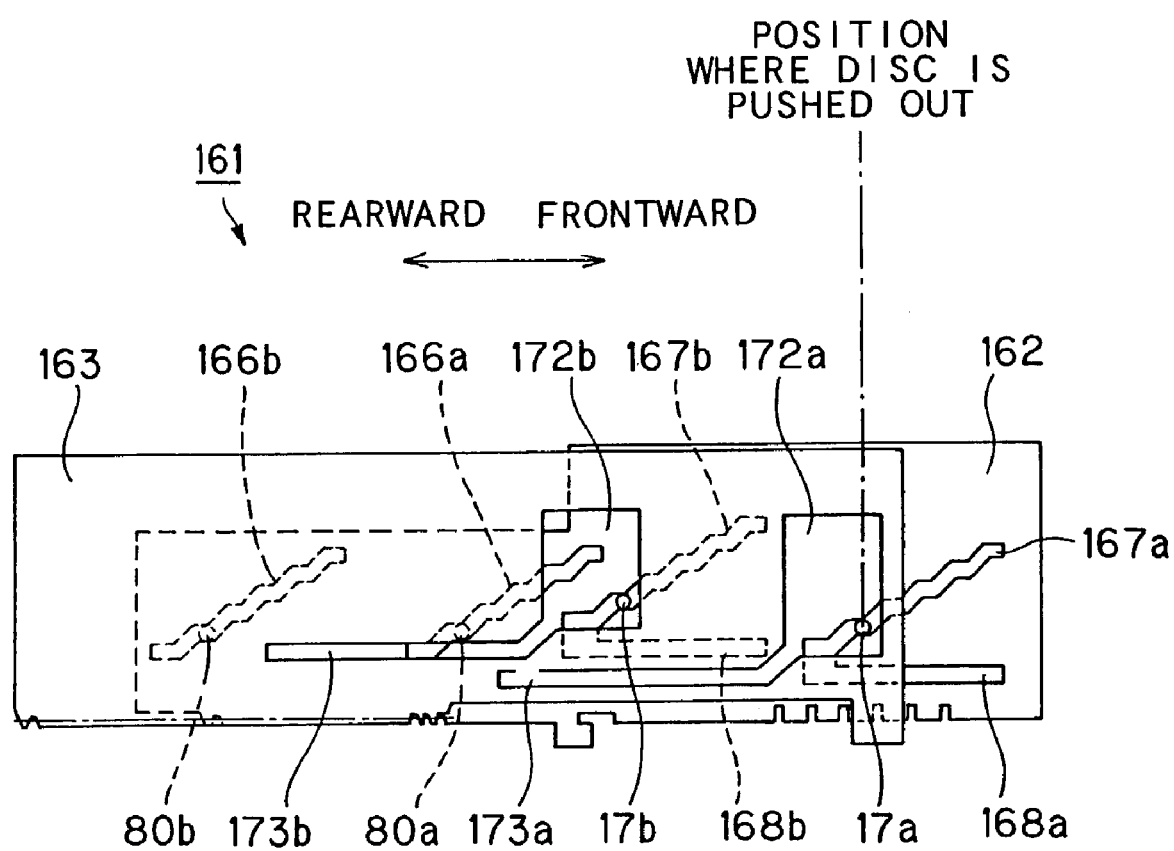
FIG. 28 is a side elevation of the actuator, showing the disc push-out position thereof for ejection of the second disc.

Next, as the outer slider 163 is retreated until the pair of pins 17a and 17b comes to the front of the first slit sections 172a and 172b as shown in FIG. 28, the separation cam 82 coupled with the outer slider 163 as shown in FIG. 22 will be retreated and the aforementioned disc pus-out mechanism 154 will push out the disc 2 a predetermined distance toward the disc insertion/ejection slot 4.

Figure 29:
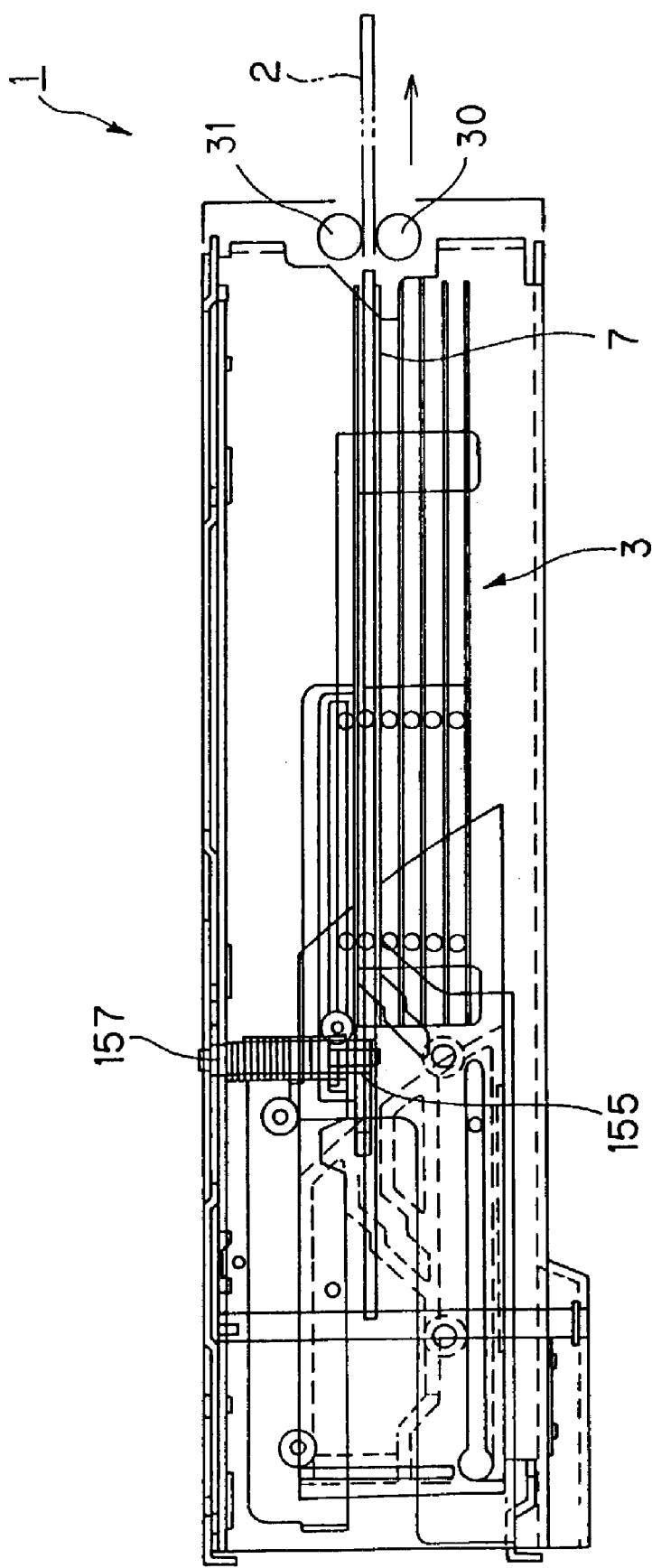
FIG. 29 is a perspective side elevation of the apparatus body, showing the disc being ejected from the disc insertion/ejection slot.

Here, upon pressing the "Eject" button, the drive roller 30 of the disc insertion/ejection unit 5 is rotated in the direction of disc ejection. Thus, the disc 2 caught between the pair of driven roller 30 and driven roller 31 as shown in FIG. 29 is ejected out of the disc compartment 3. When the disc 2 is caught partially at the rear portion thereof between the pair of drive rollers 30 and driven roller 31, a limit switch (not shown) will be activated to stop the drive rollers 30 from running. Thereby, the disc 2 can be prevented from falling during ejection thereof.

Next, when the user removes the disc 2 by hand from the disc insertion/ejection slot 4, a sensor (not shown) detects when the disc 2 has been ejected, and the outer slider 163 will slide forward. Thus, the pair of pins 17a and 17b is returned to the home position shown in FIG. 25 from the position shown in FIG. 28. At this time, the disc insertion/ejection slot 4 is closed.

With the above operations, the disc 2 can be removed from the second tray 7. It should be noted that with similar operations to the above, any desired disc 2 can be removed from any tray other than the second tray 7.

Figure 30A:
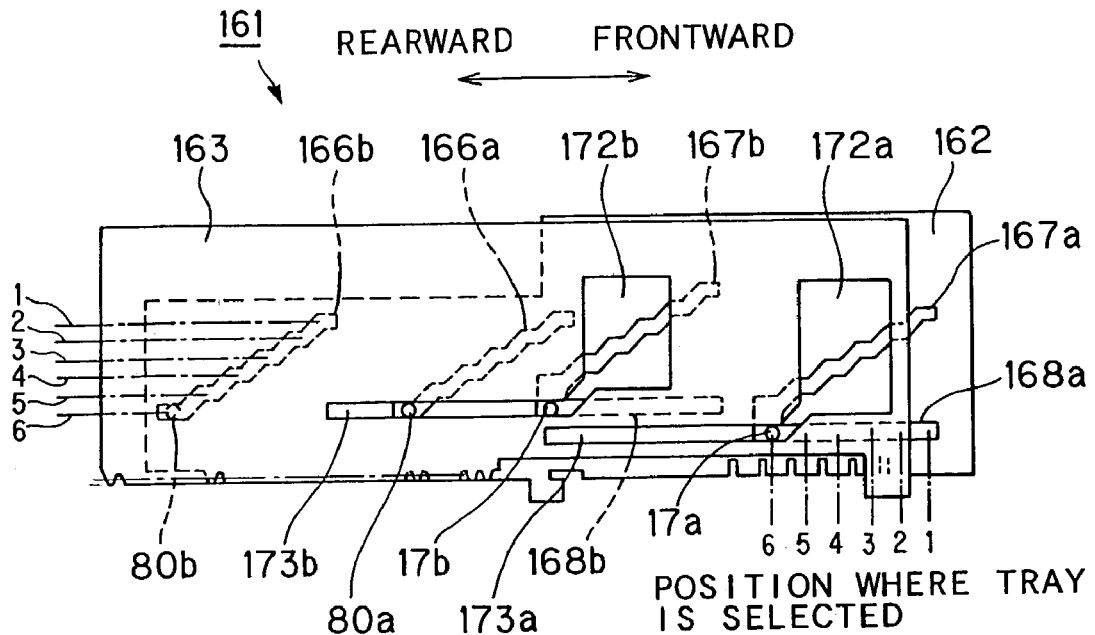
FIG. 30A shows the position for playback of a sixth disc and FIG. 30B shows the position for playback of the first disc.

Note now that the mode can be changed from the disc insertion/ejection mode to the playback mode as the outer slide 163 slides forward from the mode changeover position of the pair of pins 17a and 17b when in the disc insertion/ejection mod shown in FIG. 24 and the pair of pins 17a and 17b passes by the third slit sections 174a and 174b in the outer slider 163 and moves into the third slits 168a and 168b in the inner slider 162 and second slit sections 173a and 173b in the outer slider 163 shown in FIG. 30A.

When in the playback mode, the pair of pins 17a and 17b of the disc elevator 16 will slide in the the third slits 168a and 168b in the inner slider 162 and second slit sections 173a and 173b in the outer slider 163 until the disc elevator 16 is held in the lowermost position. At this time, the aforementioned transmission changeover mechanism 121 switches the transmission and thus the pivoting mechanism 117 can be driven by the drive motor 40.

On the other hand, for change from the playback mode to the disc insertion/ejection mode, the outer slider 163 is retreated from the mode changeover position of the pair of pins 17a and 17b when in the playback mode as shown in FIG. 30A, the pair of pins 17a and 17b passes by the third slit sections 174a and 174b of the outer slider 163 and slides in the second slits 167a and 167b of the inner slider 162 and first slit sections 172a and 172b of the outer slider 163 as shown in FIG. 24.

Note that during the mode changeover, the pair of pins 80a and 80b of the pickup elevator 79 remains at the lowermost step of the first slits 166a and 166b.

Figure 30B:
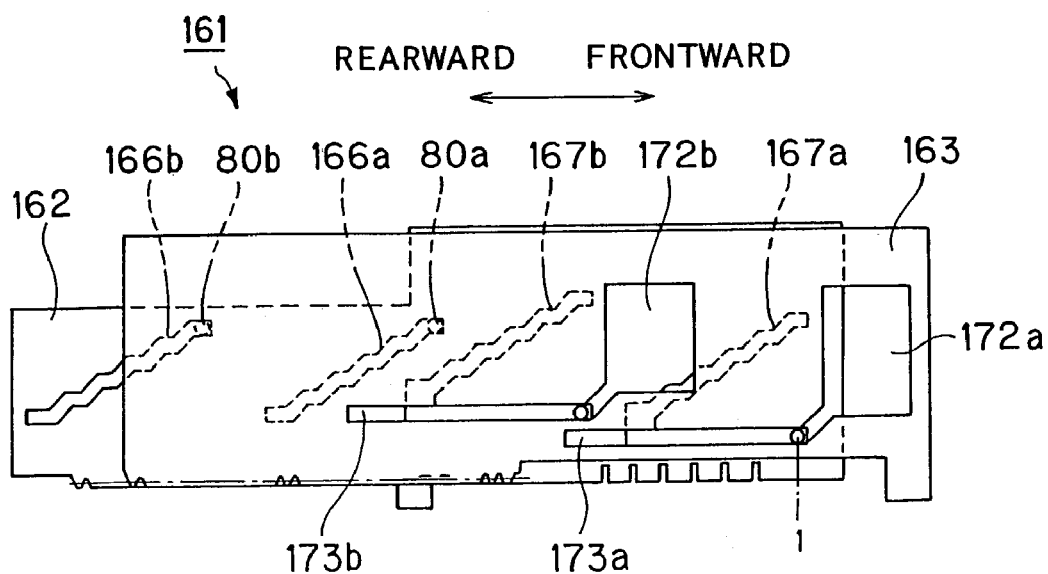

When in the playback mode, as only the inner slider 162 is sled longitudinally with the pair of pins 80a and 80b of the pickup elevator 79 being inserted in the first slits 166a and 166b of the inner slider 162 as shown in FIGS. 30A and 30B, the pickup elevator 79 can be moved vertically to a desired height. It should be noted that FIG. 30A shows a position of the pickup elevator 79 for playing the disc 2 placed on the sixth tray 7 and FIG. 30B shows a position thereof for playing the disc 2 placed on the first tray 7.

For playing the selected disc 2 placed on the selected tray 7 in the playback mode (for playing the disc 2 placed on the second tray 7, for example), the user selects and pushes a "2" button for example and then a "Play" button, the buttons being provided on the control panel (not shown) on the front surface of the housing.

Figure 31:
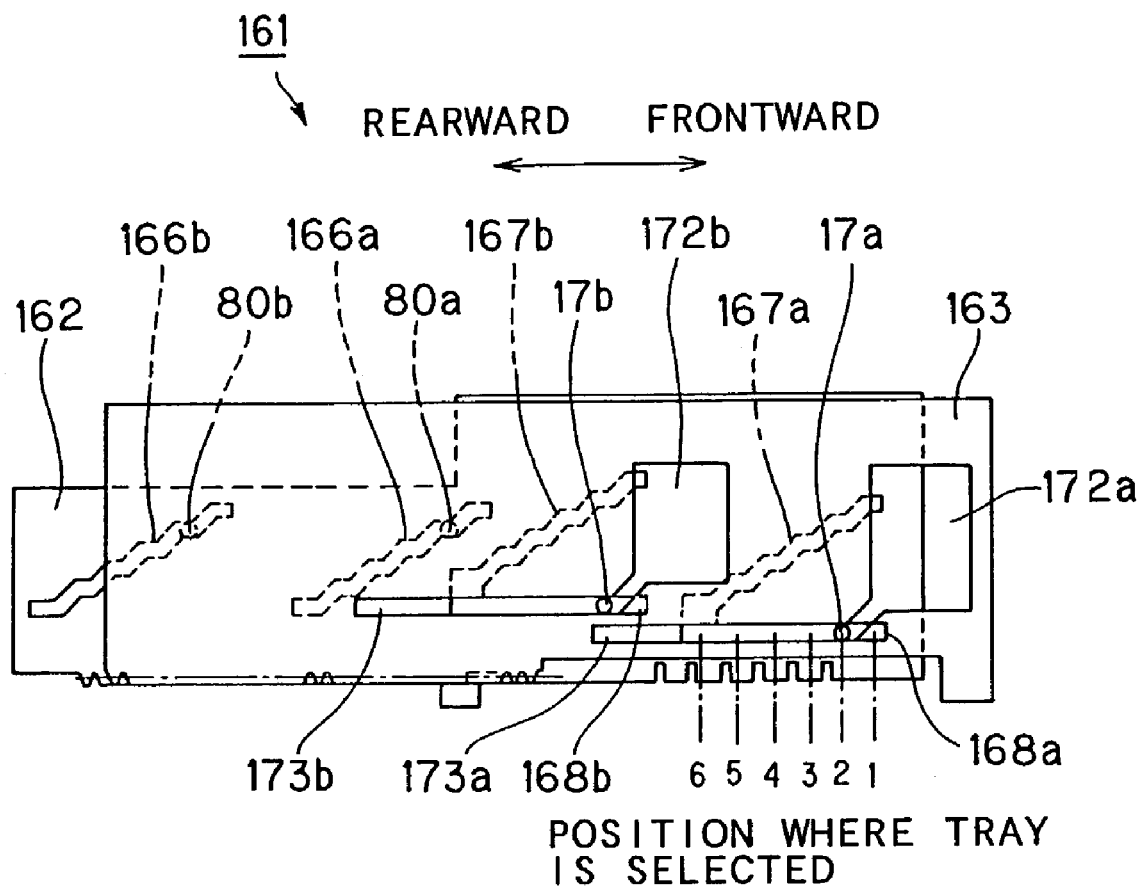
FIG. 31 is a side elevation of the actuator, showing the home position thereof for playback of the second disc.
Figure 32:
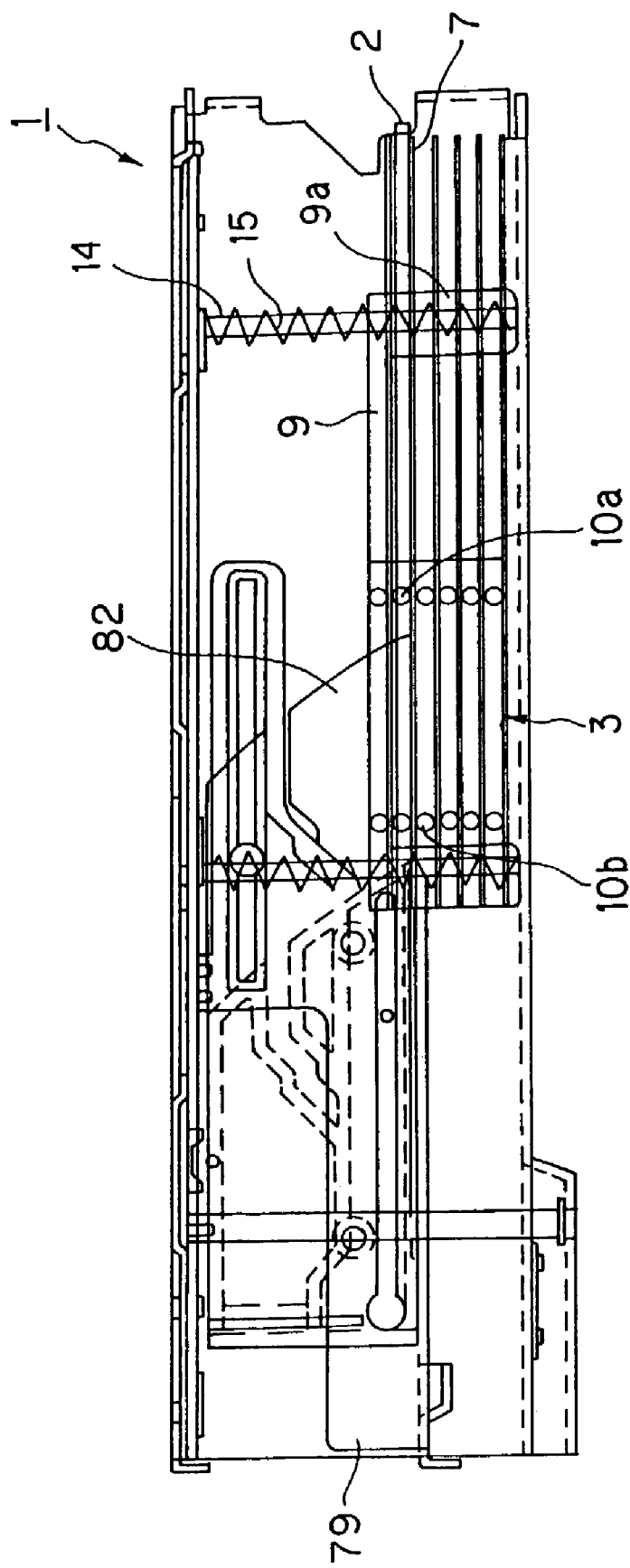
FIG. 32 is a perspective side elevation of the apparatus body, showing the home position of the separation cam for playback of the second disc.

In this case, as the inner slider 162 is retreated from the mode changeover position shown in FIG. 30A, the pair of pins 17a and 17b is pushed up to the second highest step of the first slits 166a and 166b as will be seen from FIG. 31. Thus, the pickup elevator 79 is moved up and set to such a height that the lower end of the slope 82b of the separation cam 82 will come to between the second selected tray 7 and third tray 7, as shown in FIG. 32.

Figure 33:
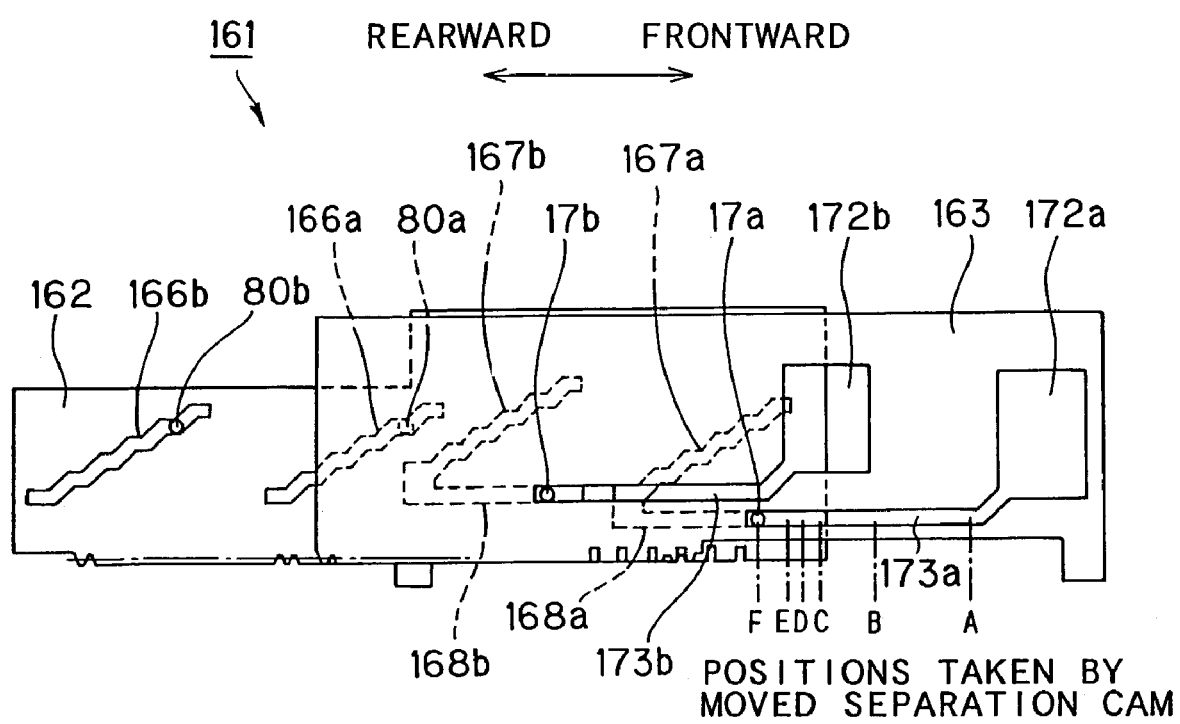
FIG. 33 is a side elevation of the actuator, showing the playback position for playback of the second disc.

Next, as the outer slider 163 slides forward, the separation cam 82 coupled with the outer slider 163 will move forward as shown in FIG. 33. Thus, the separation cam 82 will create a space above and below the selected tray 7 while holding the latter, the pair of chuck levers 89 will be pivoted by the pivoting mechanism 117 radially of the disc 2 placed on the selected tray 7, and the chucking change over mechanism 144 allows the pair of chuck levers 89 will chuck the disc 2 about the central hole 2a of the latter.

Figure 34:
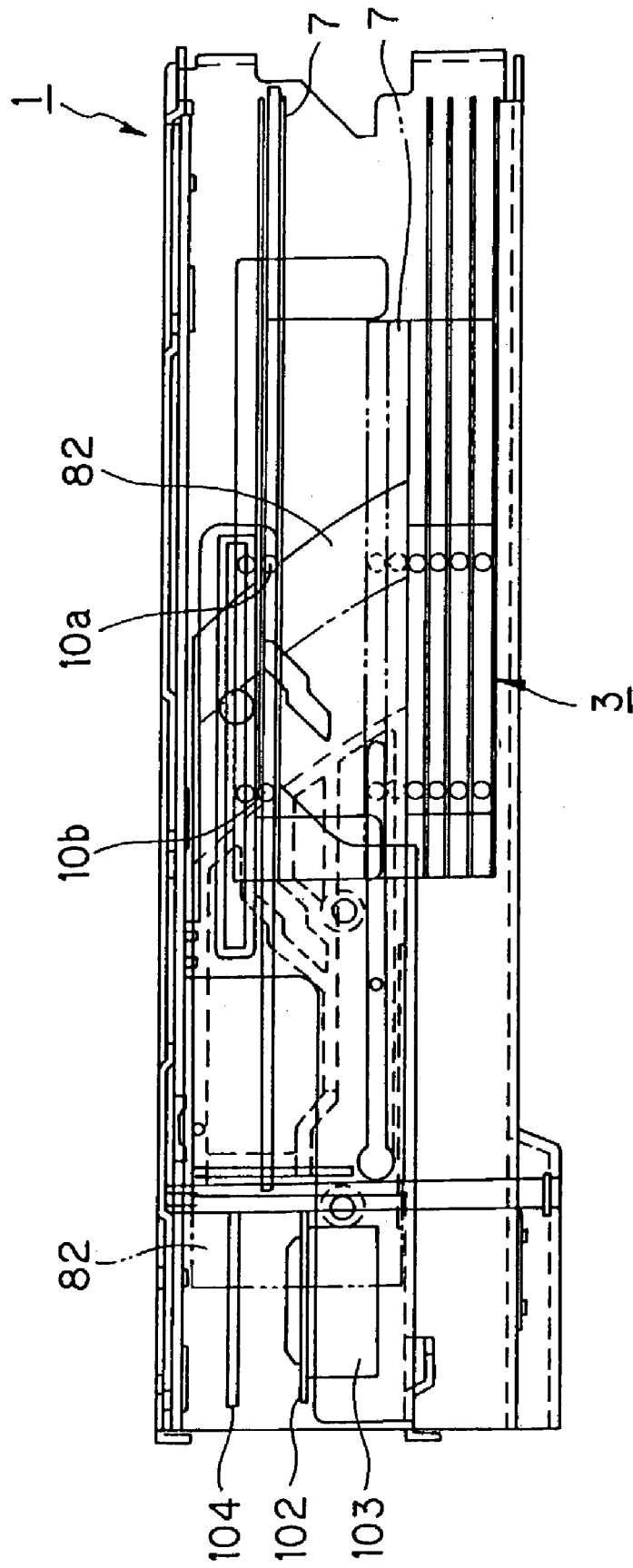
FIG. 34 is a perspective side elevation of the apparatus body, showing the separation cam having been moved to a position "C" for playback of the second disc.

More particularly, as the separation cam 82 first moves forward to any of positions A to C shown in FIG. 12, the pins 10a and 10b of the second selected tray 7 are pushed up along the slopes 82a and 82b to the slits 87 and 88 in the separation cam 82 as shown in FIG. 34. Also, the pins 10*a* and 10*b* of the third tray 7 are sled along the lower surface of the separation cam 82. At this time, the leaf spring 11 provided at either side of the third tray 7 is forced at the bent portion 11*b* thereof downward by the lower surface of the separation cam 82 to retain the disc 2 by the retainer 11*a* thereof. Thus, the first tray 7 and second selected tray 7 will be moved up and a space will be created between the second selected tray 7 and third tray 7.

Figure 35:
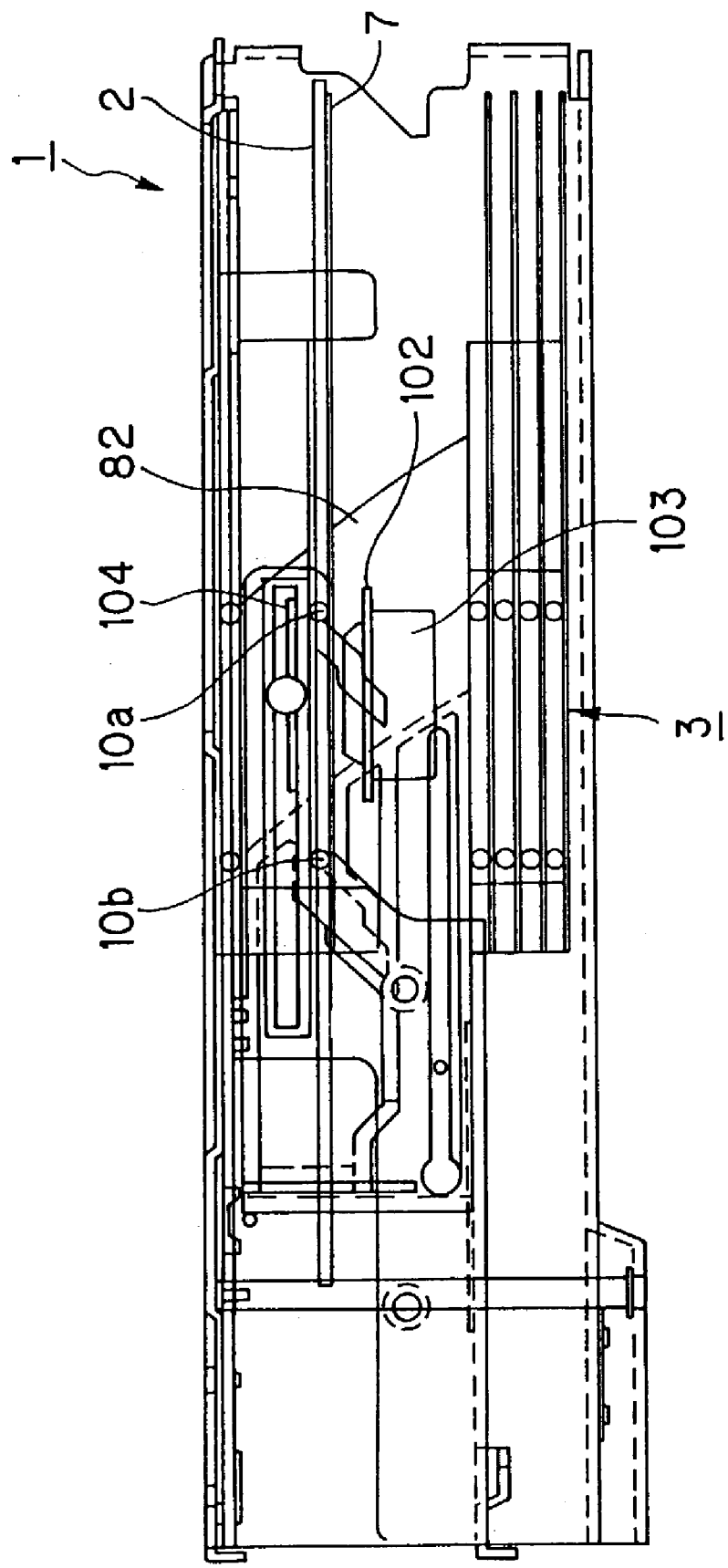
FIG. 35 is a perspective side elevation of the apparatus body, showing the separation cam having been moved to a position "D" for playback of the second disc.

Next, as the separation cam 82 moves forward to a position D in FIG. 12, the pins 10*a* and 10*b* of the second selected tray 7 slide in the first sections 87*a* and 88*a* of the slits 87 and 88, respectively, while the pins 10*a* and 10*b* of the first tray 7 are pushed up along the slopes 82*a* and 82*b* located higher than the slits 87 and 88 to the upper surface 82*d* of the separation cam 82, as shown in FIG. 35. Thus, a space will be created between the first tray 7 and second selected tray 7 and also an ample space for reception of the pair of chuck levers 89 will be created above and below the selected tray 7.

Also, the tray 7 at the lower step of the selected 7 is retained by the lower surface 82*c* of the separation cam 82, and the tray 7 at the upper step of the selected tray 7 is forced by the aforementioned coil spring 15 toward the upper surface 82*d* of the separation cam 82. Thus, the tray 7 can be prevented from being adversely affected by a vibration or the like of the vehicle having the disc changer installed on board.

Once the separation cam 82 moves forward to the position D in FIG. 12, a sensor (not shown) detects it and puts the drive motor 40 into run. Thus, in the pivoting mechanism 117, as the sliding bar 120 shown in FIG. 17 is sled rearward, the pair of chuck levers 89 is pivoted from the position for the disc insertion/ejection mode as shown in FIG. 18 to a position for the playback mode shown in FIG. 19, namely, to the central hole 2*a* of the disc 2. Also, when the pair of chuck levers 89 is pivoted to the playback mode position, a limit switch (not shown) will be activated to stop the drive motor 40 from running.

Figure 36:
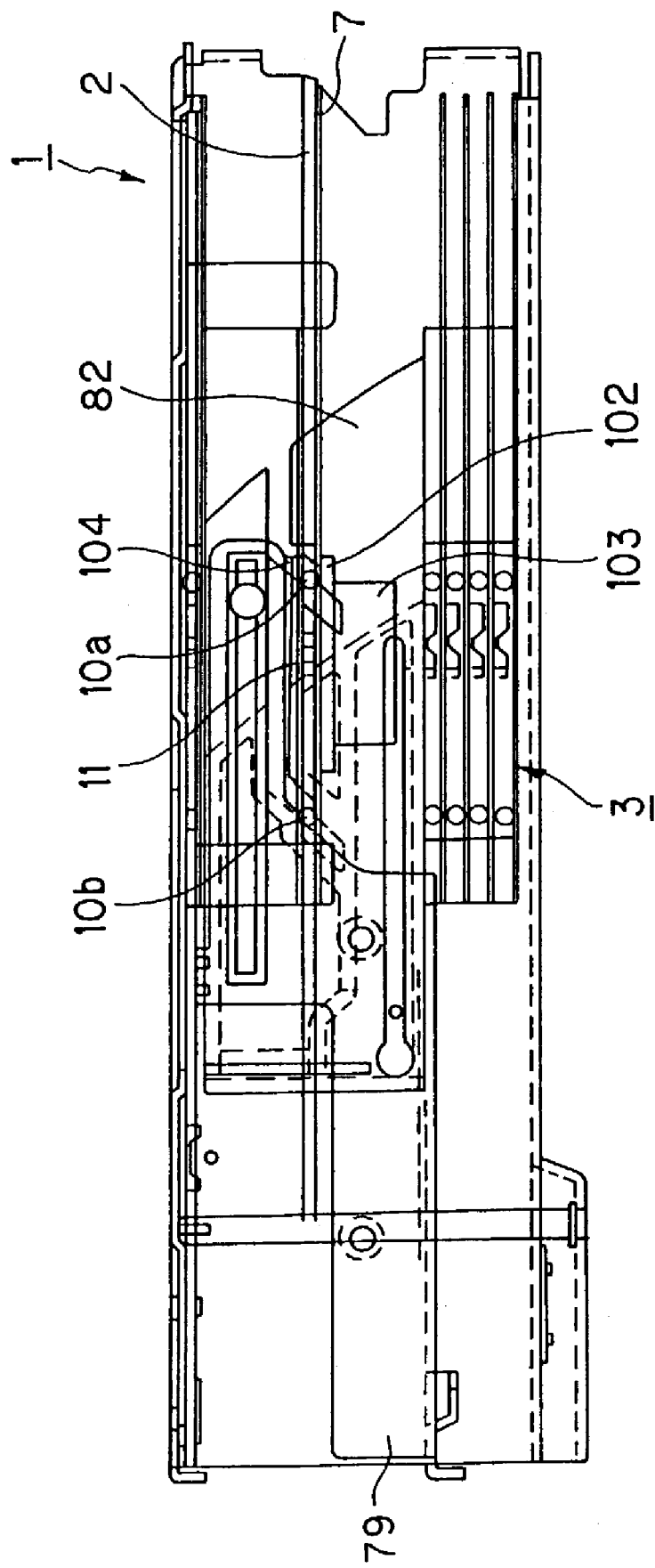
FIG. 36 is a perspective side elevation of the apparatus body, showing the separation cam having been moved to a position "E" for playback of the second disc.

Next, when the separation cam 82 moves forward to a position E in FIG. 12A, the pins 10*a* and 10*b* of the first tray 7 slides along the upper surface 82*d* of the separation cam 82 while the pins 10*a* and 10*b* of the second selected tray 7 is sliding in the second sections 87*a* and 88*b* of the slits 87 and 88, respectively, as shown in FIG. 36. Thus, the second selected tray 7 held by the pair of separation cams 82 is moved downward until the selected disc 2 is placed onto the turntable 102 on the lower arm 90.

Synchronously with the above operations, the chucking changeover mechanism 144 works such that the guide pin 145 of the upper arm 91 slides downward in the vertical section 147*b* of the guide hole 147 formed in the cylindrical plate 146 to force downward the end of the restraint lever 149 at the side of the cylindrical plate 146. At the same time, the guide pin 151 of the restraint lever 149 slides between positions E and F shown in FIG. 12B in the cam groove 153 in the separation cam 82. Thus, the upper arm 91 is moved down in relation to the lower arm 90 until the selected disc 2 will be chucked about the central hole 2*a* between the turntable 102 on the lower arm 90 and chuck plate 104 of the upper arm 91.

Since the hollow shaft 92 as the pivot center for the pair of chuck levers 89 is inserted in the column 99 erected from the bottom plate 1*a*, the pair of chuck levers 89 is positioned with a high accuracy. Also, the turntable 102 on the lower arm 90 and chuck plate 104 of the upper arm 91 are also positioned with a high accuracy since the torsion coil spring 143 of the pivoting mechanism 117 holds the positioning pin 140 pressed by the pickup elevator 79. Further, the tray 7 and pickup elevator 79 are positioned with a high accuracy by the column 99 and guide column 13. Therefore, the central hole 2*a* of the selected disc 2 can be positioned accurately and chucked positively between the turntable 102 on the lower arm 90 and chuck plate 104 of the upper arm 91.

Figure 37:
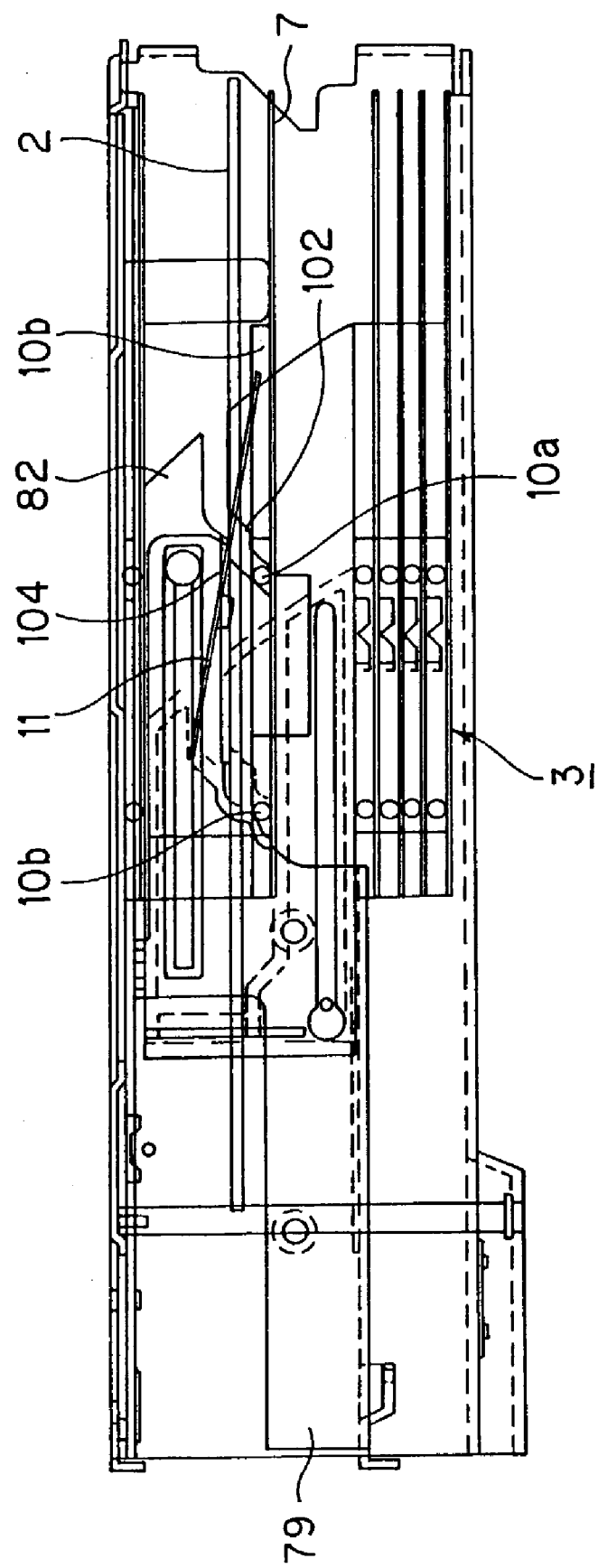
FIG. 37 is a perspective side elevation of the apparatus body, showing the separation cam having been moved to a position "F" for playback of the second disc.
Figure 38:
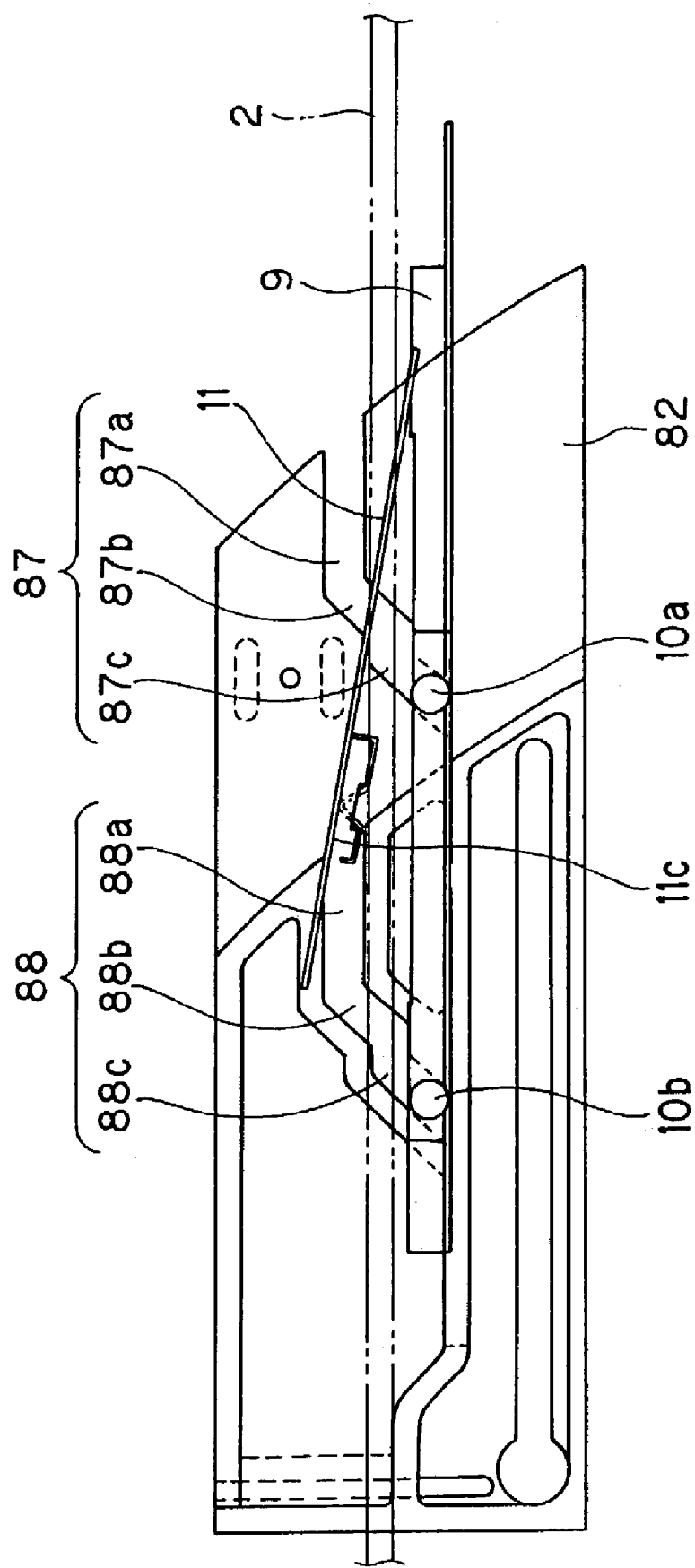
FIG. 38 is a perspective side elevation of the apparatus body, showing the separation cam having been moved to the position "F".

Next, as the separation cam 82 moves forward to the position F in FIG. 12A, the pins 10*a* and 10*b* of the second tray 7 slide in the third sections 87*c* and 88*c* of the slits 87 and 88, respectively, as shown in FIG. 37. At this time, the bent portion 1*b* of the lead spring 11 to retain the selected disc 2 is pushed up by the rear lower surfaces of the third sections 87*c* and 88*c* of the slits 87 and 88, respectively, as shown in FIG. 38. Thus, the second selected tray 7 held on the pair of separation cams 82 is further moved down until the selected tray 7 and selected disc 2 placed on the turntable 102 are separated from each other.

Then, the aforementioned optical pickup unit 108 reads signals from the selected disc 2 held rotatably by the pair of chuck levers 89 while moving radially of the disc 2.

On the other hand, when in the playback mode, the pair of pins 17*a* and 17*b* is returned to the home position shown in FIG. 31 by reversely following the aforementioned procedure, namely, by retreating the outer slider 163, and thus the separation cam 82 coupled with the outer slider 163.

More specifically, as the separation cam 82 is retreated to any of the positions F to D shown in FIG. 12, the selected disc 2 will be placed on the selected tray 7 while the guide pin 151 of the restraint lever 149 is sliding in the cam groove 153 in the separation cam 82 between the positions E and D in FIG. 12B, so that the end of the restraint lever 149 at the side of the cylindrical plate 146 is pushed up and the guide pin 145 of the upper arm 91 slides upward in the vertical section 147*b* of the guide hole 147 formed in the cylindrical plate 146. Thus, the upper arm 91 will move up in relation to the lower arm 90, and the upper and lower arms 91 and 90 and the disc 2 will be separated from each other.

Once the separation cam 82 moves forward to the position D in FIG. 12, a sensor (not shown) detects it and puts the drive motor 40 into run. Thus, in the pivoting mechanism 117, as the sliding bar 120 shown in FIG. 17 is sled forward, the pair of chuck levers 89 is pivoted from the position for the playback mode shown in FIG. 19 to the insertion/ejection mode shown in FIG. 18. Also, when the pair of chuck levers 89 is pivoted to the disc insertion/ejection mode position, a limit switch (not shown) will be activated to stop the drive motor 40 from running.

As the separation cam 82 is retreated to any of the positions D to A shown in FIG. 12, the first to third trays 7 will move down and the pair of ins 17*a* and 17*b* will be returned to the home position as shown in FIG. 31.

Note that with the similar operations to the above-mentioned ones, signals can be read from a desired disc 2 placed on a tray 7 other than the second tray 7.

As shown in FIGS. 18 and 19, in the disc changer according to the present invention, a resin layer 192, softer than the disc 2, is formed by printing on a disc-contacting portion of each of the pair of chuck levers 89 to prevent the disc 2 chucked between the pair of chuck levers 89 from being damaged by a contact with the chuck levers 89, caused due to a vibration or the like of the vehicle.

Figure 39:
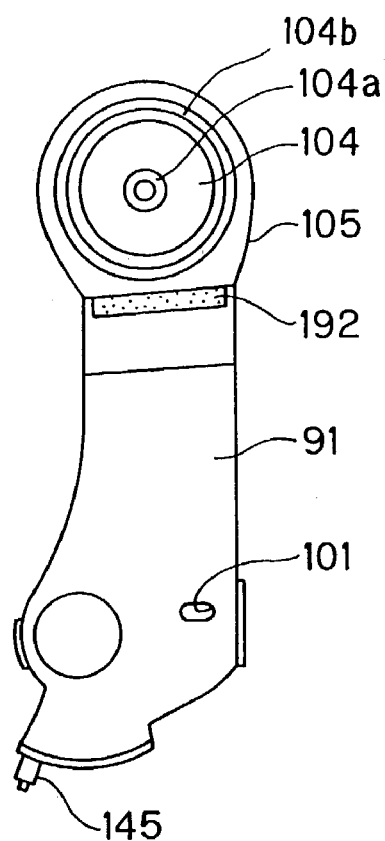
FIG. 39 is a plan view of the upper arm from the side opposite to the disc.

In particular, in this embodiment of the disc changer according to the present invention, a resin layer 192, softer than the disc 2, is formed by printing to a thickness of about 0.1 to 0.2 mm on each of base-end and free-end bent portions of the support plate 105 that will be in contact with the disc 2, as shown in FIGS. 11, 14 and 39.

The above resin layer 192 is formed using the same material and method as those for the resin layer 8 formed on the surface of the tray 7 on which the disc 2 is to be placed. Therefore, these resin layers 8 and 192 will be explained together herebelow concerning their material and method of forming.

In case the disc 2 includes a substrate of polycarbonate (PC) for example, its rubber hardness is 95 IRHD and pencil hardness is B to 2B. It should be noted that the term "rubber hardness" used herein refers to the international rubber hardness degree (IRHD) and the pencil harness is a hardness of an object, tested by actually scratching a test piece with pencils different in hardness from each other and determining whether any scratch remains in the test piece.

In this case, by forming the resin layers 8 and 192 whose pencil harness is 3B or less, namely, which are softer than the disc 2 formed from polycarbonate, it is possible to protect the disc 2 against damage due to contact with the resin layers 8 and 192. More preferably, the resin layers 8 and 192 should be formed from a material having a pencil harness of 6B or less, which will make it possible to positively prevent the disc 2 from being damaged due to such contact.

On the other hand, the resin layers 8 and 192 should have a rubber hardness of less than 95 IRHD. However, in case the resin layers 8 and 192 are softer, their friction with the disc 2 will be larger. Therefore, the rubber hardness of the resin layers 8 and 192 should preferably be 60 IRHD or more which will not disturb the placement of the disc 2 onto the tray 7 and separation of the disc 2 from the tray 7. More preferably, the rubber hardness of the resin layers 8 and 192 should be over 70 IRHD and under 75 IRHD, which will assure a good friction with the disc 2 and thus will never result in any damage to the disc 2 due to contact with the tray 7.

Also, the resin layers 8 and 192 may be formed extremely thin by printing on the support plate 105 and tray 7, and will not be separable from the support plate 105 and tray 7.

The resin layers 8 and 192 can be formed by metal-mask printing, silk-screen printing, pad printing or the like for example. According to the present invention, the resin layers 8 and 192 are formed on the support plate 105 and tray 7 by the silk-screen printing.

Figure 40:
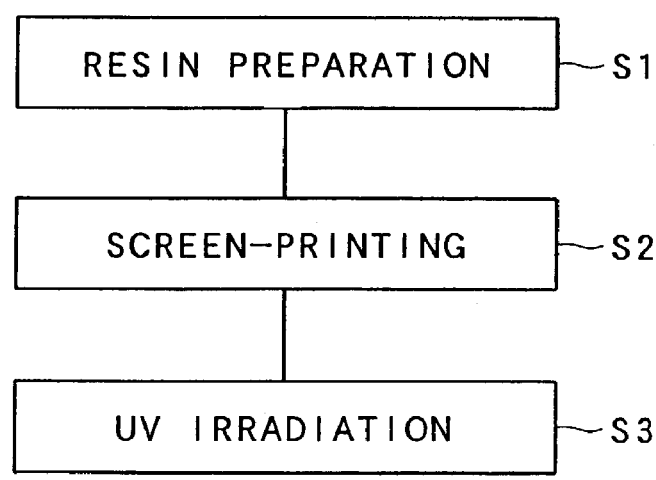
FIG. 40 shows a flow of processes made for forming a pattern of resin layers on the tray.

For forming the resin layers 8 and 192, first a resin to be printed to the support plate 105 and tray 7 is prepared in step S1 shown in FIG. 40.

According to the present invention, a urethane ultraviolet-curable resin (UV-curable resin), softer than polycarbonate and containing rubber particles (organic cross-linked filler) to impart an elasticity to the UV resin, is adopted as a material to form the resin layers 8 and 192. More specifically, the urethane UV-curable resin used herein is TAKELAC UV-9203 by Takeda Chemical Industries, Ltd. (rubber hardness of 70 IRHD) and TREFIL E-600 by Toray Dow Corning Silicone Co., Ltd. (average grain size of 3 μm) is mixed as organic cross-linked elastic filler in the UV-curable resin. It should be noted that the epoxy resin and acrylate resin show a pencil hardness as high as H to 3H and thus they are not suitable for use as the material of the aforementioned resin layer 192.

Next, in step S2 in FIG. 40, the resin thus prepared is screen-printed on the support plate 105 and tray(s) 7 by a screen printer.

As shown in FIG. 39, the resin layer 192 is formed accurately to a uniform thickness over the bent portion between the base and free ends of the support plate 105. On the other hand, the resin layer 8 consisting of the first resin layer 8a, second resin layer 8b and third resin layer 8c is formed accurately to a uniform thickness on the tray 7 as shown in FIGS. 5 and 6.

The resin should preferably have a viscosity over 20 Pa·s and under 100 Pa·s for the reason that a viscosity under 20 Pa·s will cause the resin once printed to flow with the result that a predetermined thickness of the resin layer can hardly be assured while a viscosity over 100 Pa·s will make it difficult to properly transfer the resin to the support plate 105 and tray 7.

More preferably, the viscosity of the resin should be over 30 Pa·s and under 40 Pa·s. With such a viscosity, a texture pattern (silk gauze pattern) of the silk screen is transferred by the screen printing to the surface of each of the resin layers 8 and 192. Therefore, there will be formed on the surfaces of the finally cured resin layers 8 and 192 multiple irregularity patterns which assure a good sliding of the resin layers 8 and 192 being in contact with the disc 2.

Next, in step S3, an ultraviolet irradiator is used to irradiate ultraviolet rays to the resin layers 8 and 192 formed on the support plate 105 and tray 7 to cure the resin layers 8 and 192. As above, the resin layers 8 and 192 can be formed accurately on the support plate 105 and tray 7.

As above, according to the present invention, the extremely thin resin layer 192 can be formed accurately in comparison with the conventional attachment of a cushion member to a portion of the chuck levers that will be in contact with the disc, and will not be peeled.

Thus, the space between the pair of chuck levers 89 and the disc 2 can be set smaller, which will keep the pickup assembly 6 from being increased in height.

Therefore, the disc changer provided with such a compact pickup assembly 6 will assure a sufficient space for mounting inside the housing even when the apparatus body 1 is designed compact to comply with the aforementioned standard dimensional requirements.

FIGS. 41 to 44 show variants of the resin layer 8 in FIG. 5. According to the present invention, the resin layers 8 of the shapes shown in FIGS. 41 to 44 can easily be formed by printing.

Figure 41:
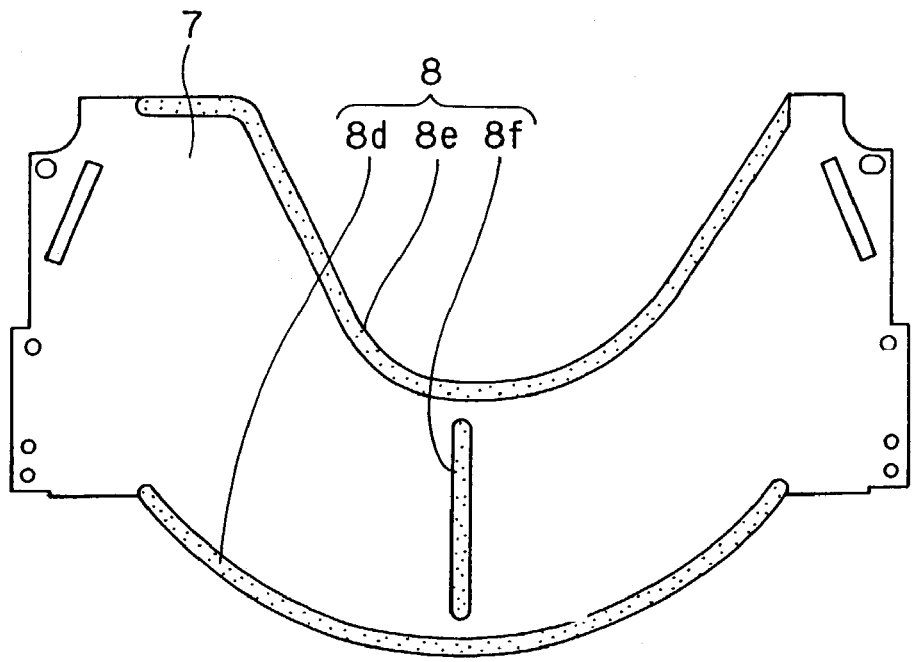
FIG. 41 is a plan view of the tray having a variant of the resin layer pattern formed thereon.

More specifically, there is formed on either side of the tray 7 shown in FIG. 41 the resin layer 8 consisting of a first resin layer 8d formed along the front edge, second resin layer 8e formed along the rear edge, and a third resin layer 8f formed at the intermediate area between the first and second resin layers 8d and 8e not to be connected with these first and second resin layers 8d and 8e.

Figure 42:
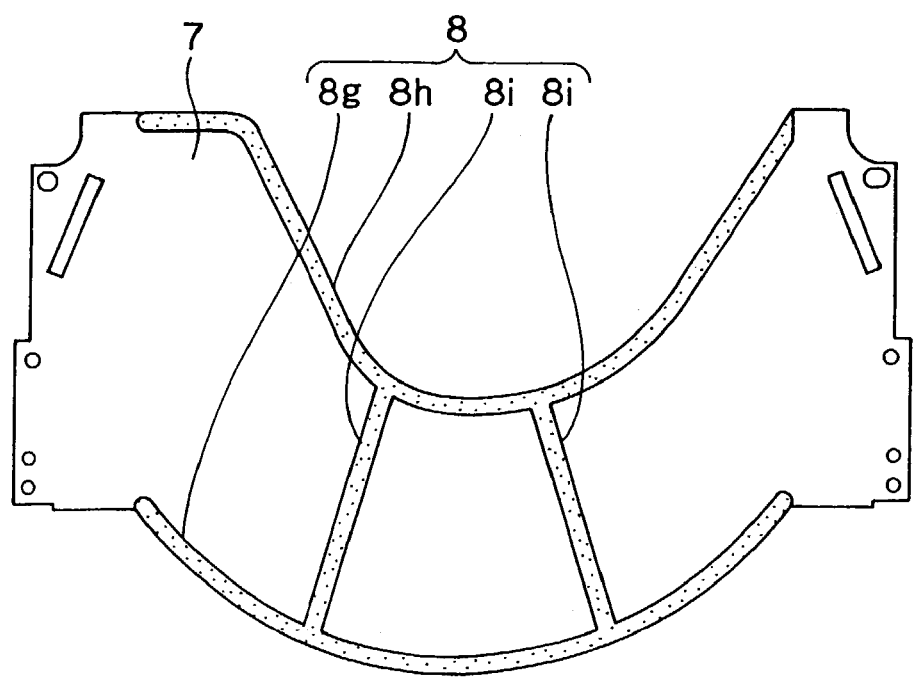
FIG. 42 is a plan view of the tray having a second variant of the resin layer pattern formed thereon.

Also, there is formed on either side of the tray 7 shown in FIG. 42 the resin layer 8 consisting of a first resin layer 8g formed along the front edge, second resin layer 8h formed along the rear edge, and a plurality of third resin layers 8i formed to connect the first and second resin layers 8g and 8h.

Figure 43:
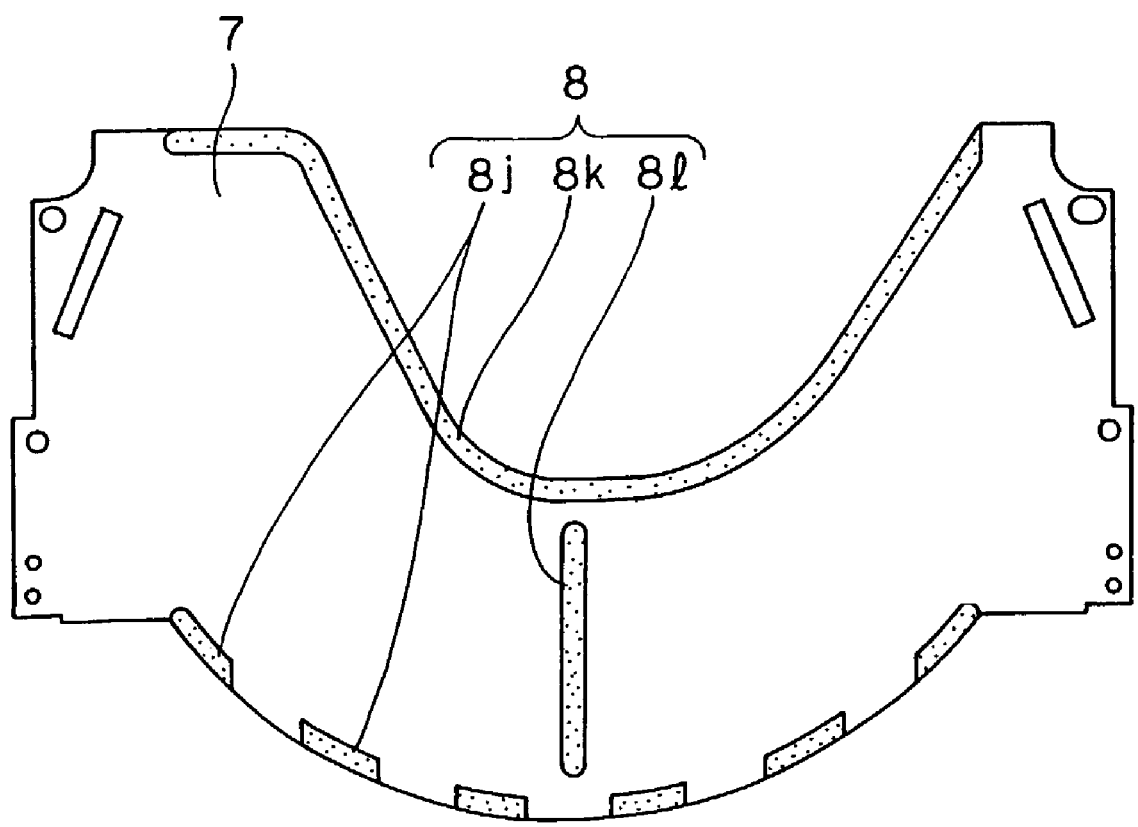
FIG. 43 is a plan view of the tray having a third variant of the resin layer pattern formed thereon.

Also, there is formed on either side of the tray 7 shown in FIG. 43 the resin layer 8 consisting of a series of first resin layers 8j formed at predetermined intervals along the front edge, second resin layer 8k formed along the rear edge, and a third resin layer 8l formed at the intermediate area between the first and second resin layers 8j and 8k not to be connected with these first and second resin layers 8j and 8k.

Figure 44:
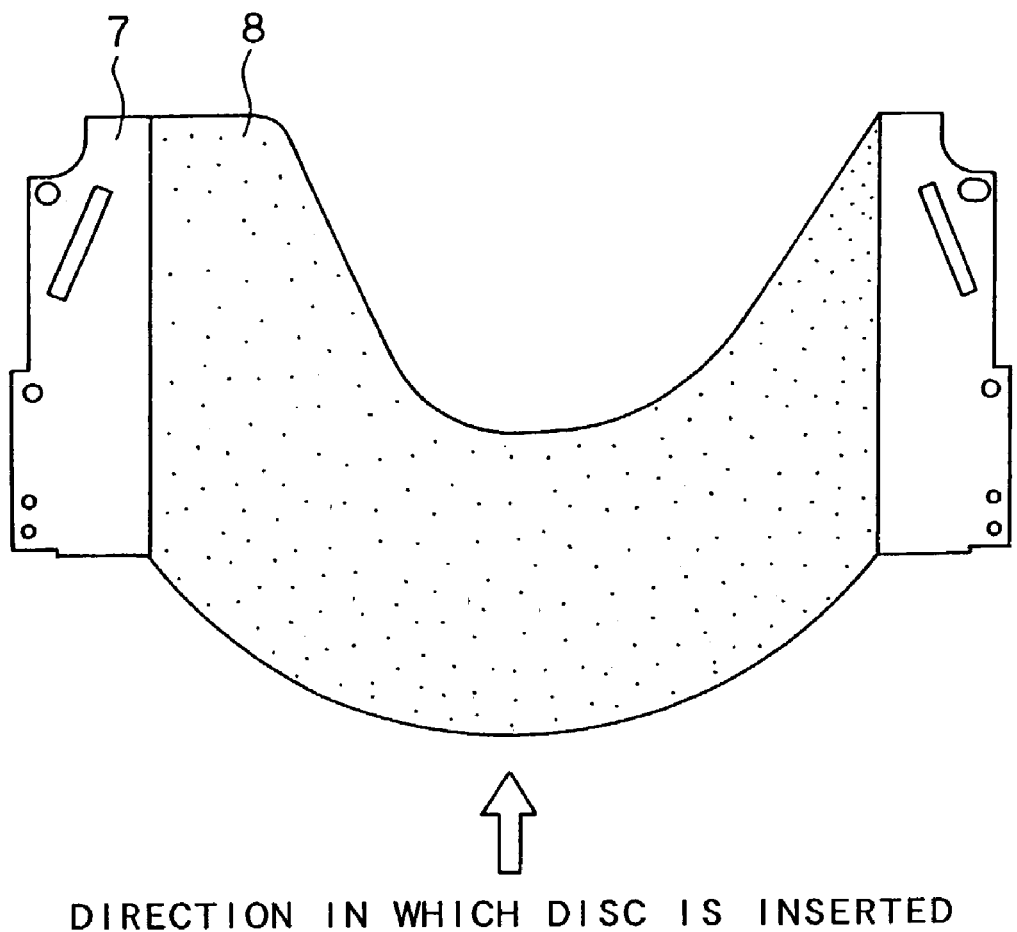
FIG. 44 is a plan view of the tray having a fourth variant of the resin layer pattern formed thereon.

Also, over either side of the tray 7 shown in FIG. 44, there is formed the resin layer 8 corresponding to a portion of the tray 7 that will be in contact with the disc 2.

Figure 45:
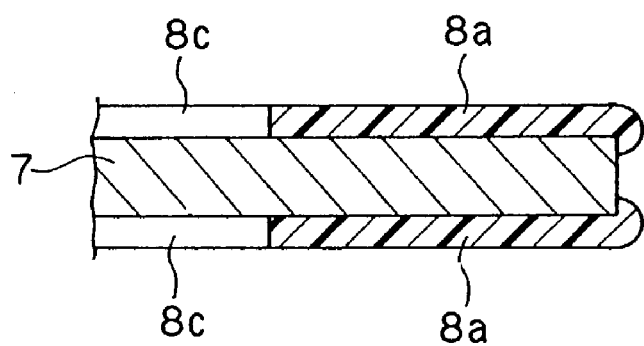
FIG. 45 is a sectional view of the tray having the variant of resin layer pattern formed thereon, taken along the line $X_1$-$X_1'$ in FIG. 5.

In variants of the tray 7 and resin layer 8 shown in FIG. 5, the first resin layer 8a is formed along the front edge of the tray 7 to cover the edge of the tray 7 as shown in FIG. 45.

Figure 46:
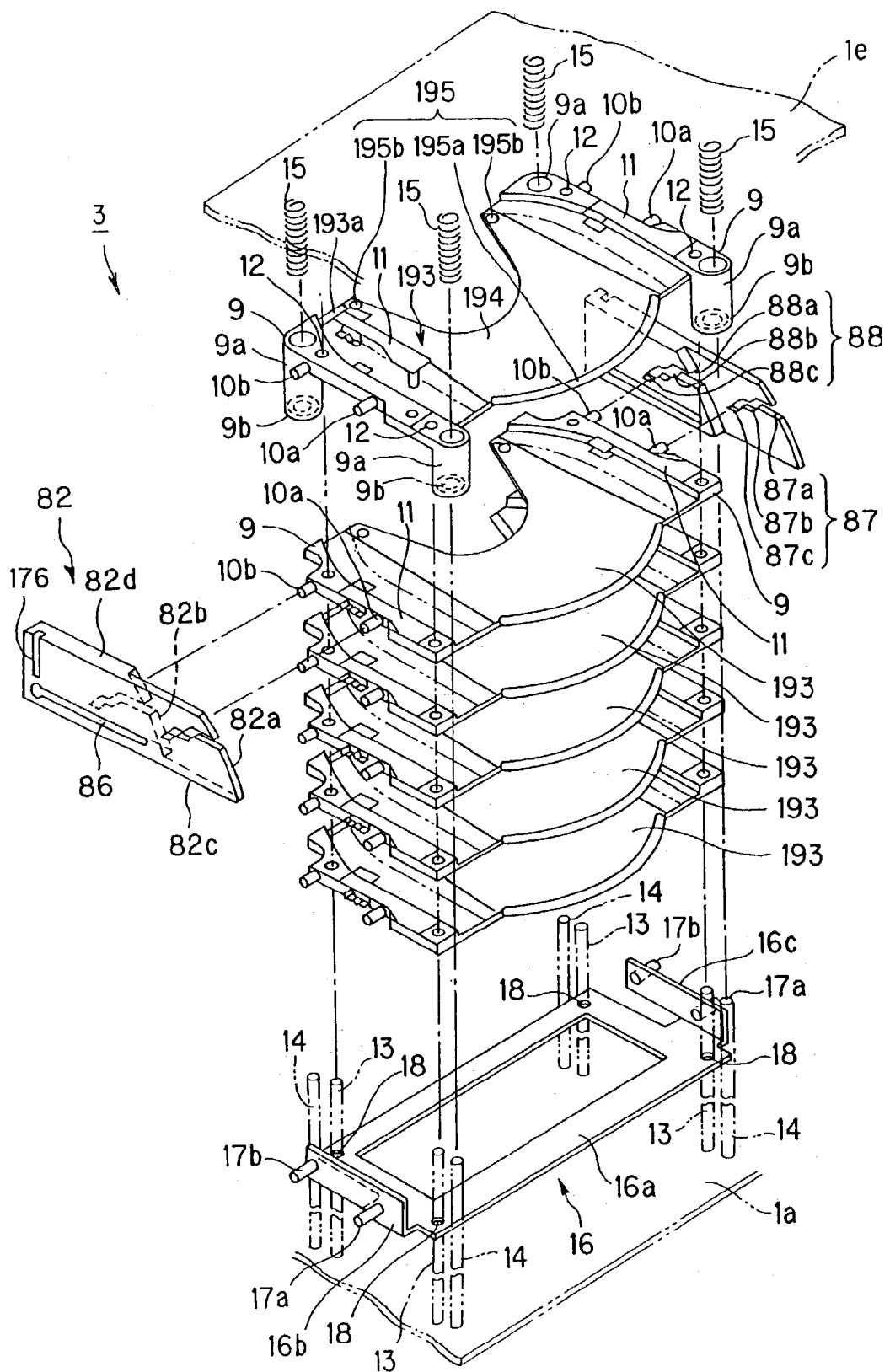
FIG. 46 is an exploded perspective view of the disc compartment of the disc changer according to the present invention, showing the structure thereof.

In the disc changer according to the present invention, the aforementioned trays 7 may be replaced with six disc trays (will be referred to as "tray" hereunder) 193 stacked in the front portion of the housing, opposite to the disc insertion/ejection slot 4 in the disc compartment 3 as shown in FIG. 46.

Figure 47:
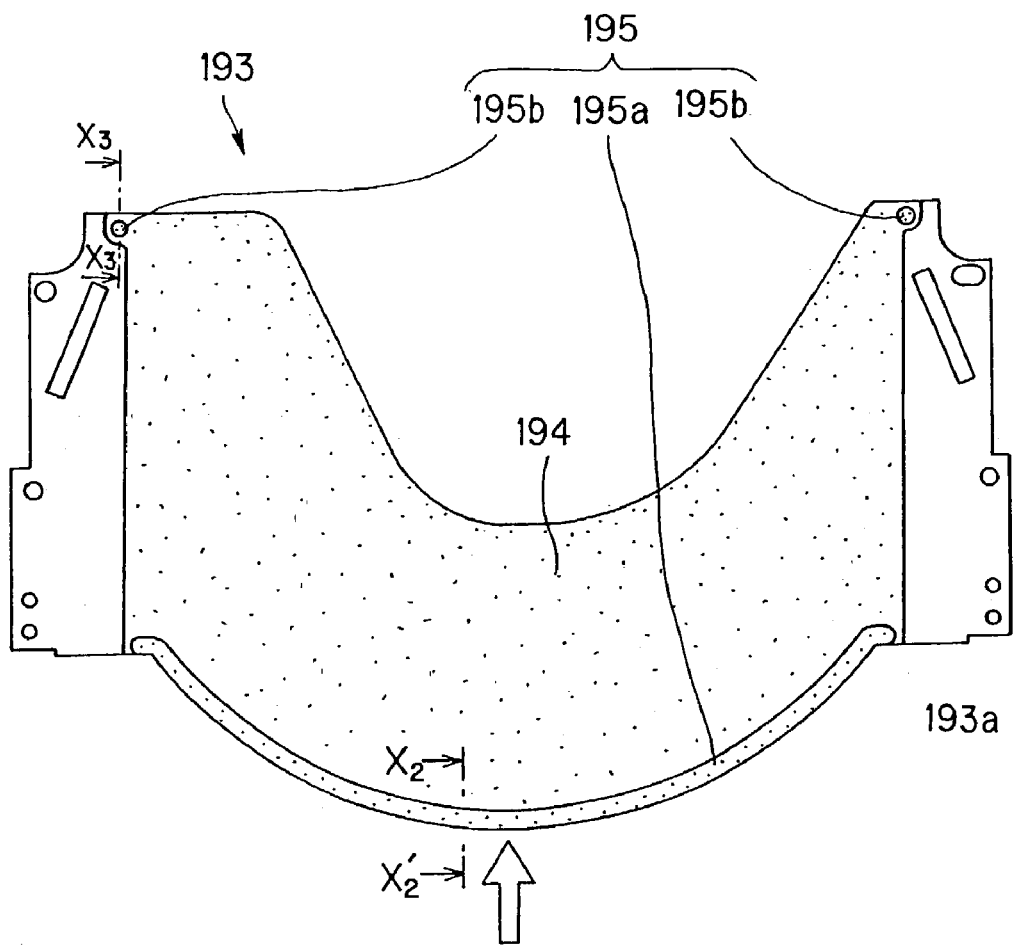
FIG. 47 is a plan view of the tray according to the present invention.
Figure 48:
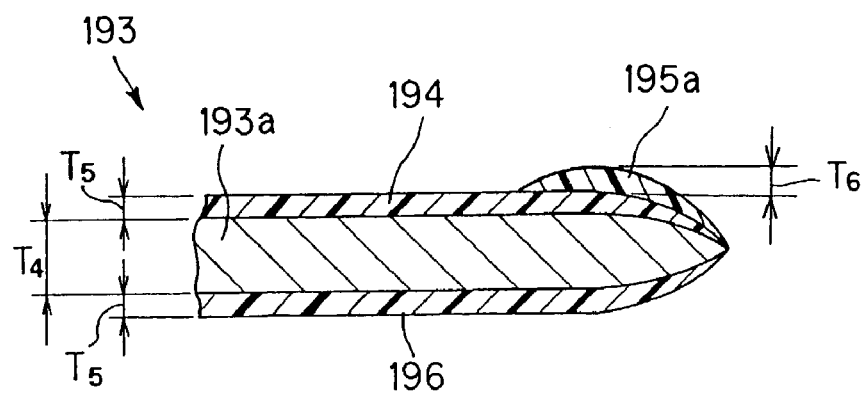
FIG. 48 is a sectional view taken along the line $X_2$-$X_2'$ in FIG. 47.
Figure 49:
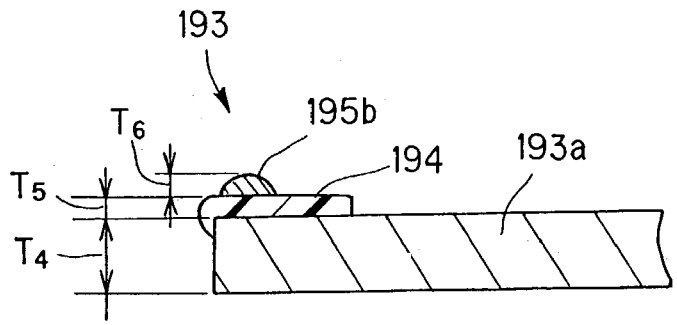
FIG. 49 is a sectional view taken along the line $X_3$-$X_3'$ in FIG. 47.

As shown in FIGS. 47, 48 and 49, the tray 193 is formed from a tray substrate 193a having first and second resin layers 194 and 195, softer than the disc 2, formed stacked by printing on the main surface thereof on which the disc 2 is to be placed.

The tray substrate 193a is formed from a material which can be thin while maintaining a sufficient mechanism strength, such as a substrate of a metal like aluminum or stainless steel or a resin having metal powder mixed therein. The tray substrate 193a made of a metal is shaped as a generally flat plate having a thickness $T_4$ of about 0.3 mm. Also, the tray substrate 193a is cut at the rear portion thereof to create a space where a central hole 2a of the disc 2 is exposed, and decreased in thickness at the front edge thereof as it goes toward the disc insertion/ejection slot 4.

To prevent the disc 2 from being damaged due to contact with the tray 193, the first resin layer 194 is formed nearly over an area of the tray 193 where the disc 2 going to be inserted or ejected through the disc insertion/ejection slot 4 will be in contact with the tray substrate 193a. The first resin layer 194 is formed to a thickness $T_5$ of about 0.1 to 0.2 mm for example.

The second resin layer 195 is formed on the first resin layer 194 and consists of a first resin layer portion 195a formed along the front edge of the tray substrate 193a, and a pair of second resin layer portions 195b formed at opposite rear ends of the tray substrate 193a. That is, the first and second resin layer portions 195a and 195b forming together the second resin layer 195 are formed on the first resin layer 194 correspondingly to positions where the lateral edges of the tray 193, corresponding to the directions of inserting and ejecting the disc 2, will be in contact with the outer circumference of the disc 2 placed on the tray 193. Also the second resin layer 195 is formed to a thickness $T_6$ of about 0.1 to 0.15 mm for example. Therefore, when the disc 2 is placed on the tray 193, a space corresponding to the thickness $T_6$ of the second resin layer 195 will be created between the first resin layer 194 and signal recording layer of the disc 2.

Also, a third resin layer 196, softer than the disc 2, is formed by printing on the main surface, opposite to the other main surface on which the disc 2 is placed, of the tray substrate 193a of those, opposite to each other, of the stacked trays 193. To prevent the disc 2 from being damaged due to contact with the tray 193, the third resin layer 196 is formed nearly over an area of the tray 193 where the disc 2 going to be inserted or ejected through the disc insertion/ejection slot 4 will be in contact with the tray substrate 193a, namely, over the tray substrate 193a opposite to the first resin layer 194. The third resin layer 196 is formed to a thickness $T_5$ of about 0.1 to 0.2 mm for example, as in the aforementioned first resin layer 194.

The first to third resin layers 194, 195 and 195 are formed using the same material and same method as those for the resin layer 8 formed on the surface of the tray 7 on which the disc 2 is placed and resin layer 192 formed on portions of the pair of chuck levers 89 that will be in contact with the disc 2.

Therefore, the first to third resin layers 194, 195 and 196 formed from the same material as for the aforementioned resin layers 8 and 192 to have a pencil hardness of 3B or less can prevent the disc 2 from being damaged due contact with the tray and chuck levers. More preferably, they should be formed to attain a pencil hardness of 6B or less, whereby it is possible to positively prevent the disc 2 from being scratched or damaged due to such contact.

The first to third resin layers 194, 195 and 196 formed from the same material as for the aforementioned resin layers 8 and 192 to have a rubber hardness of 60 IRHD or more will not disturb the placement of the disc 2 onto the tray 193 and separation of the disc 2 from the tray 193. More preferably, the rubber hardness of the resin layers 194, 195 and 196 should be over 70 IRHD and under 75 IRHD, which will assure a good friction with the disc 2 and thus will never result in any damage to the disc 2 due to contact with the tray.

Also, the first to third resin layers 194, 195 and 196 may be formed extremely thin on the tray substrate 193a by the similar printing to that for the aforementioned resin layers 8 and 192, and will not be separable from the tray substrate 193a.

More specifically, the resin to be applied by screen printing to the tray substrate 193a is first prepared to make the tray 193. It should be noted that the resin preparation is similar to that for the aforementioned resin layers 8 and 192 and will not be described any more.

Next, a screen printer is used to make screen printing of the prepared resin on one of the main surfaces of the tray substrate 193a to form a pattern of the third resin layer 196 thereon. Then, using an ultraviolet irradiator, ultraviolet rays are radiated to the third resin layer 196 formed on the tray substrate 193a to cure the third resin layer 196.

Further, the screen printer is used to make screen printing of the prepared resin on the other main surface of the tray substrate 193a to form a pattern of the first resin layer 194 thereon. Then, using the ultraviolet irradiator, ultraviolet rays are radiated to the first resin layer 194 formed on the tray substrate 193a to cure the first resin layer 194.

Next, the screen printer is used to make screen printing of the prepared resin on the other main surface of the tray substrate 193a, on which the first resin layer 194 has already been formed, to form a pattern of the second resin layer 195 thereon. Then, using the ultraviolet irradiator, ultraviolet rays are radiated to the second resin layer 195 formed on the first resin layer 194 to cure the second resin layer 195.

As above, the first to third resin layers 194, 195 and 196 can be formed extremely thin and accurately on the tray substrate 193a of the tray 193, and will not be separable from the tray substrate 193a. Also, the above method according to the present invention permits to produce the tray 193 easily at less costs.

The resin used to form the above resin layers should preferably have a viscosity over 20 Pa·s and under 100 Pa·s for the reason that a viscosity under 20 Pa·s will cause the resin once printed to flow with the result that a predetermined thickness of the resin layer can hardly be assured while a viscosity over 100 Pa·s will make it difficult to properly transfer the resin to the tray substrate 193a.

More preferably, the viscosity of the resin should be over 30 Pa·s and under 40 Pa·s. With such a viscosity, a texture pattern (silk gauze pattern) of the silk screen is transferred by the screen printing to the surface of each of the first to third resin layers 194, 195 and 196. Therefore, there will be formed on the surfaces of the finally cured first to third resin layers 194, 195 and 196 multiple irregularity patterns which assure a good sliding of the resin layers being in contact with the disc 2.

Note that it does not matter which of the first and third resin layers 194 and 196 should first be formed on the tray substrate 193a. By way of example, the first resin layer 194, and next the third resin layer 196, may be formed on the tray substrate 193a, and then the second resin layer 195 be formed on the first resin layer 194. Alternatively, the first and second resin layers 194 and 196 may simultaneously be formed on the tray substrate 193a and then the second resin layer 195 be formed on the first resin layer 194.

By adjusting the composition of the aforementioned resin, it is possible to form the first to third resin layers 194, 195 and 196 having a variety of hardness and height. A pattern of the first resin layer 194 on which the second resin layer 195 is laminated can easily be formed by printing.

Figure 50:
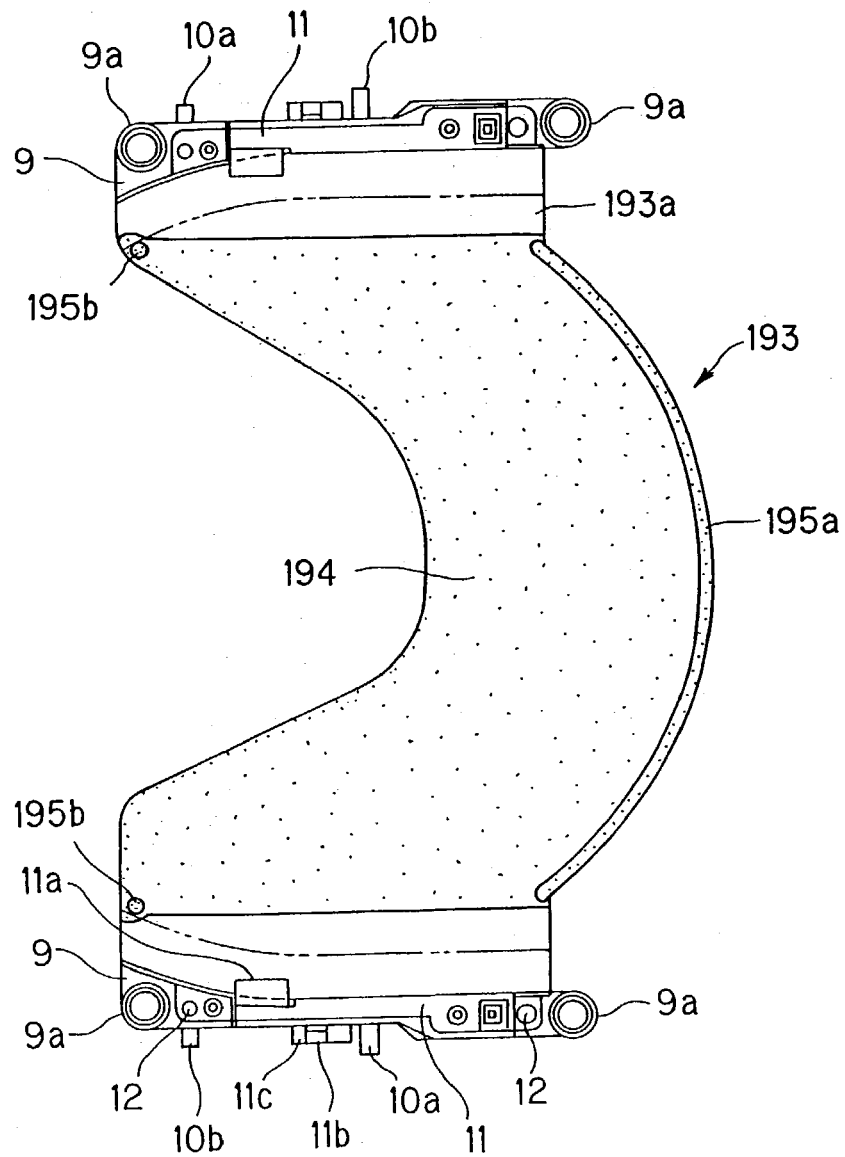
FIG. 50 is a plan view of the tray according to the present invention, having a pair of resin members attached thereon.

Also, the aforementioned pair of resin members 9 is fixed each on either end of the tray 193 structured as above and along the profile of the disc 2 placed on the tray 193 as shown in FIG. 50. The six trays 193 are stacked with the four guide columns 13 penetrated through the through-holes 12 as shown in FIG. 46. Thus, the six trays 193 are supported movably along the guide columns 13.

Figure 51:
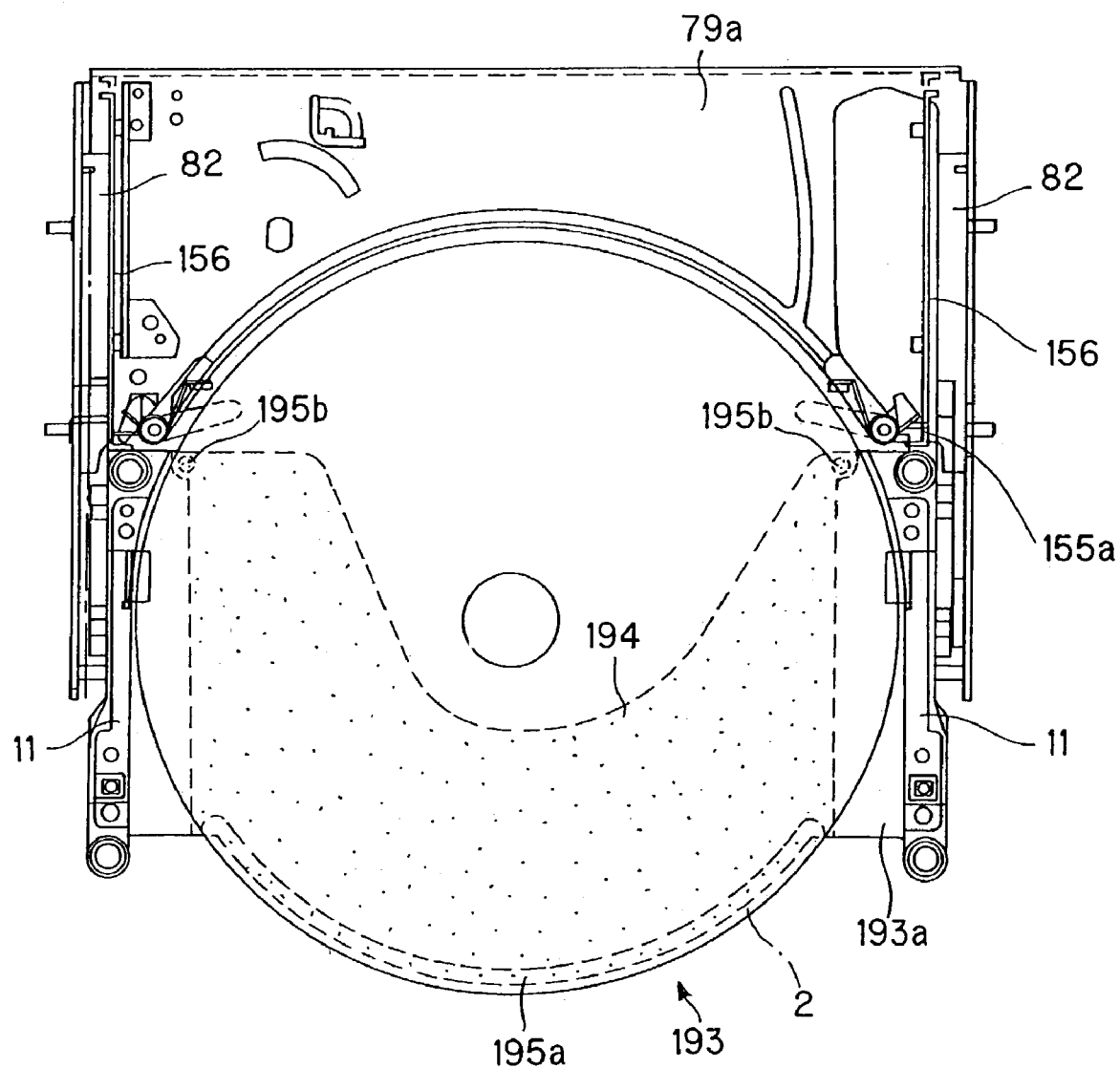
FIG. 51 is a plan view of the tray according to the present invention, having a disc placed thereon.

In the disc changer incorporating the above-mentioned trays 193, the first to third resin layers 194, 195 and 196, softer than the disc 2, printed on the tray substrate 193a as shown in FIG. 51 permit to prevent the disc 2 from being damaged due to contact of the tray 193 with the disc 2 going to be inserted or ejected through the disc insertion/ejection slot 4.

Further, in the disc changer, since the second resin layer 195 creates a space between the first resin layer 194 and the signal recording layer of the disc 2, it is possible to prevent the signal recording layer of the disc 2 and edges of the tray 193 from being put into contact with each other even when a vibration of the vehicle is transmitted to the apparatus body and the tray 193 is thus oscillated. Namely, the disc 2 can be protected against any damage to the signal recording layer thereof.

The first resin layer 195a and pair of second resin layers 195b, forming together the second resin layer 195, are formed on the first resin layer 194 correspondingly to positions where the lateral edges of the tray 193, corresponding to the directions of inserting and ejecting the disc 2, will be in contact with the outer circumference of the disc 2 placed on the tray 193. The outer circumference of the disc 2, put in contact with the second resin layer 195, is a non-signal recording area outer than a recording area where data is recorded. Therefore, the second resin layer 195 supports solely the non-signal recording area of the disc 2 while preventing the signal recording area of the disc 2 from being put into direct contact with the tray 193.

Thus, even when the tray 193 is warped due to a vibration, the signal recording area of the disc 2 can be prevented from being put into contact with the edges of the tray 193. The resin layers assure to maintain a sufficient mechanical strength of the tray 193 and not to add to the thickness of the tray 193 as far as possible.

Therefore, in the disc changer according to the present invention, the thin tray 193 will not add to the height of the disc compartment 3 and will thus contribute to a more compact design of the apparatus as a whole.

Note that the disc tray according to the present invention may be designed so that the second resin layer 195 supports the non-signal recording area located along the inner circumference of the disc 2 to prevent the signal recording area of the disc 2 from being in direct contact with the tray. However, since the tray 193 is cut at the rear portion thereof to such an extent that the central hole 2a of the disc 2 is exposed, the rear edge of the tray 193 will not be in contact anywhere with the non-signal recording area located along the inner circumference of the disc 2 placed on the tray 193, and only the non-signal recording area of the disc 2 is supported by the first resin layer 195a and pair of second resin layers 195b forming the second resin layer 195.

Figure 52:
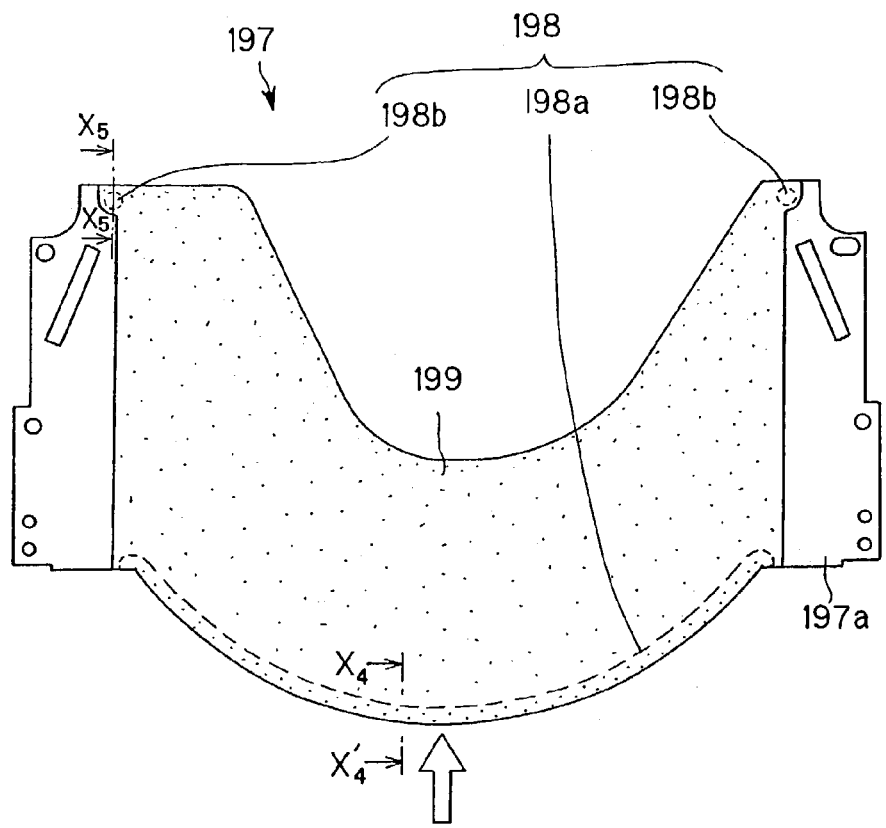
FIG. 52 is a plan view of a variant of the tray according to the present invention.
Figure 53:
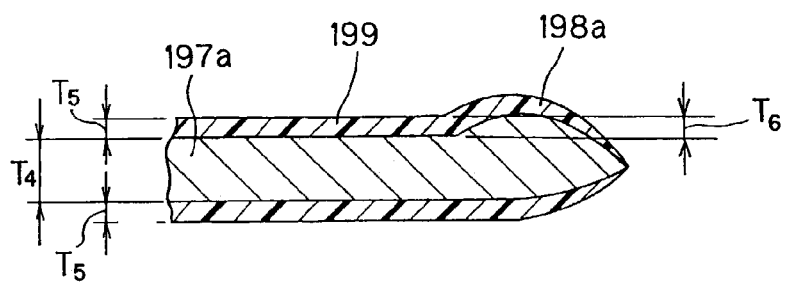
FIG. 53 is a sectional view taken along the line $X_4$-$X_4'$ in FIG. 52.
Figure 54:
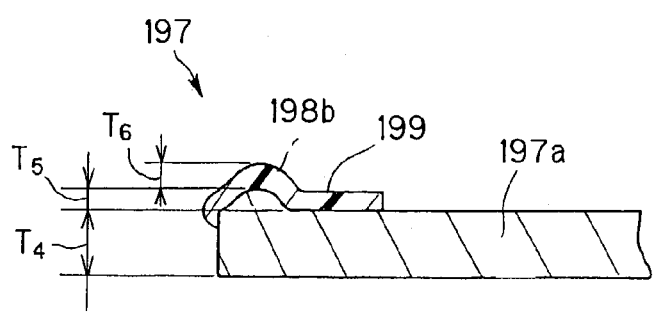
FIG. 54 is a sectional view taken along the line $X_5$-$X_5'$ in FIG. 52.

FIGS. 52, 53 and 54 show a variant of the disc tray according to the present invention. The tray according to this variant is indicated with a reference 197.

As shown, the tray 197 consists of a tray substrate 197a on which a first projection 198a formed along the front end of the tray substrate 197a and a pair of second projections 198b formed on either rear edge of the tray substrate 197a, in stead of the second resin layer 195 formed on the first resin layer 194. A resin layer 199, softer than the disc 2, is formed by printing over the first and second projections 198a and 198b and the rest of the tray substrate 197a.

In this variant, the first and second projections 198a and 198b covered with the resin layer 199 support solely the non-signal recording area of the disc 2 for no direct contact of the signal recording area of the disc 2 with the tray 193, similarly to the second resin layer 195.

Thus, even when the tray 197 is warped due to a vibration, the signal recording area of the disc 2 can be prevented from being put into contact with the edges of the tray 197. The combination of the projections 198a and 198b and resin layer 199 assures to maintain a sufficient mechanical strength of the tray 197 and not to add to the thickness of the tray 197 as far as possible.

Note that the present invention is not limited to an apparatus for audio playing such as the aforementioned disc changer but may be applied to an apparatus for video playing and an apparatus for video recording and/or recording.

Also, the present invention is not limited to the trays 7 stacked vertically as in the aforementioned disc changer but the trays 7 juxtaposed horizontally.

Also, according to the present invention, the aforementioned resin layers 8 and 192 can be formed on the tray 7 and support plate 105 as well as on any member to hold the disc 2 until the latter is placed on the tray 7.

INDUSTRIAL APPLICABILITY

As having been described in the foregoing, according to the present invention, a resin layer, softer than a disc-shaped recording medium, is formed accurately by printing in a position where a disc holding member will be in contact with the disc-shaped recording medium to prevent the disc-shaped recording medium from being damaged due to contact of the disc holding member with the disc-shaped recording medium. The resin layer can be formed extremely thin by printing and will not be separable from the disc holding member. Thus, it is possible to minimize the space between the pair of disc holding members and the disc-shaped recording medium and limit the increase in height of the recording and/or playback apparatus. Therefore, incorporating such a compact recording and/or playback apparatus, the disc changer according to the present invention can have a larger mounting space inside it and can thus be designed more compact.

Also, according to the present invention, first and second resin layers, softer than a disc-shaped recording medium, are formed laminated on each other by printing on the main surface of the substrate of a disc holding member (disc tray)

on which the disc-shaped recording medium is to be placed, to prevent the disc-shaped recording medium from being damaged due to contact of the disc holding member with the disc-shaped recording medium. Further, since the second resin layer creates a space between the first resin layer and the signal recording layer of the disc-shaped recording medium, it is possible to prevent contact between the signal recording layer of the disc-shaped recording medium and the edges of the substrate of the disc holding member even when the disc holding member (disc tray) is oscillated or otherwise moved, and thus prevent the signal recording layer of the disc-shaped recording medium from being damaged due to such contact. Also, the first and second resin layers can be formed extremely thin and accurately by printing, and will not be separable from the disc holding member. Thus, the resin layers does not add to the thickness of the disc tray while maintaining a sufficient mechanical strength. Therefore, the thin disc trays used in the disc changer according to the present invention does not add to the height of the disc compartment and allow the apparatus body to be designed more compact.

The invention claimed is:

1. A recording and/or playback apparatus in which any one is selected from a set of disc-shaped recording media stored in a disc compartment of a disc changer and signals are written and or read to and/or from the selected disc-shaped recording medium, comprising:
a pair of disc holding members configured to hold the selected disc-shaped recording medium rotatably while chucking it, each of the disc holding members having provided thereon a resin layer, softer than the disc-shaped recording medium, formed by printing in a position where it will be in contact with the disc-shaped recording medium,
wherein the resin layer contains rubber particles bridged by a urethane resin.

2. The recording and/or playback apparatus as set forth in claim 1, wherein the resin layer has a rubber hardness of over 60 IRHD and under 95 IRHD.

3. The recording and/or playback apparatus as set forth in claim 2, wherein the resin layer has a rubber hardness of over 70 IRHD and under 75 IRHD.

4. The recording and/or playback apparatus as set forth in claim 1, wherein the resin layer has a pencil hardness of under 3B.

5. The recording and/or playback apparatus as set forth in claim 4, wherein the resin layer has a pencil hardness of under 6B.

6. The recording and/or playback apparatus as set forth in claim 1, wherein the resin layer is formed by printing a resin whose viscosity is over 20 Pa·s and under 100 Pa·s.

7. The recording and/or playback apparatus as set forth in claim 6, wherein the resin layer is formed by printing a resin whose viscosity is over 30 Pa·s and under 40 Pa·s.

8. The recording and/or playback apparatus as set forth in claim 1, wherein the resin layer is formed by screen printing.

9. The recording and/or playback apparatus as set forth in claim 1, wherein the resin layer has a concavity-convexity pattern formed on the surface thereof.

10. The recording and/or playback apparatus as set forth in claim 1, wherein the disc-shaped recording medium has a substrate formed from polycarbonate.

11. A disc tray on which each of a set of disc-shaped recording media stored in a disc compartment of a disc changer is placed, the disc tray including:
a substrate; and
a first resin layer and a second resin layer, softer than the disc-shaped recording medium, formed by printing on the main surface of at least the substrate on which the disc-shaped recording medium is placed;
the second resin layer being formed on the first resin layer and to be in contact with the outer circumference of the disc-shaped recording medium,
wherein a third resin layer, softer than the disc-shaped recording medium, is formed on the main surface of the substrate opposite to that on which the disc-shaped recording medium is placed.

12. The disc tray as set forth in claim 11, wherein the substrate is formed from a metal.

13. The disc tray as set forth in claim 11, wherein the first resin layer is formed generally over the main surface of the substrate on which the disc-shaped recording medium is placed.

14. The disc tray as set forth in claim 11, wherein the second resin layer is formed in a position where the edge of the substrate at which the disc-shaped recording medium is inserted and the edge of the substrate at which the disc-shaped recording medium is ejected will be in contact with the outer circumference of the disc-shaped recording medium placed on the first resin layer.

15. The disc tray as set forth in claim 11, wherein the first and second resin layers have a rubber hardness of over 60 IRI-ID and under 95 IRHD.

16. The disc tray as set forth in claim 15, wherein the first and second resin layers have a rubber hardness of over 70 IRHD and under 75 IRHD.

17. The disc tray as set forth in claim 11, wherein the first and second resin layers have a pencil hardness of under 3B.

18. The disc tray as set forth in claim 17, wherein the first and second resin layers have a pencil hardness of under 6B.

19. The disc tray as set forth in claim 11, wherein the first and second resin layers are formed by printing a resin whose viscosity is over 20 Pa·s and under 100 Pa·s.

20. The disc tray as set forth in claim 19, wherein the first and second resin layers are formed by printing a resin whose viscosity is over 30 Pa·s and under 40 Pa·s.

21. The disc tray as set forth in claim 11, wherein the first and second resin layers are formed by screen printing.

22. The disc tray as set forth in claim 11, wherein the first and second resin layers have a concavity-convexity pattern formed on the surface thereof.

23. The disc tray as set forth in claim 11, wherein the disc-shaped recording medium has a substrate formed from polycarbonate.

24. A disc tray on which each of a set of disc-shaped recording media stored in a disc compartment of a disc changer is placed, the disc tray including:
a substrate; and
a first resin layer and a second resin layer, softer than the disc-shaped recording medium, formed by printing on the main surface of at least the substrate on which the disc-shaped recording medium is placed;
the second resin layer being formed on the first resin layer and to be in contact with the outer circumference of the disc-shaped recording medium,
wherein the first and second resin layers contain rubber particles bridged by a urethane resin.

25. A disc changer comprising:
a disc compartment in which a set of disc-shaped recording medium is stored; and
a recording and/or playback apparatus in which any one is selected from a set of disc-shaped recording media stored in a disc compartment of a disc changer and signals are written and or read to and/or from the selected disc-shaped recording medium, the apparatus comprising:

a pair of disc holding members configured to hold the selected disc-shaped recording medium while chucking it, each of the disc holding members having provided thereon a resin layer, softer than the disc-shaped recording medium, formed by printing in a position where it will be in contact with the disc-shaped recording medium, wherein the resin layer contains rubber particles bridged by a urethane resin.

26. The disc changer as set forth in claim 25, wherein the resin layer has a rubber hardness of over 60 IRHD and under 95 IRHD.

27. The disc changer as set forth in claim 26, wherein the resin layer has a rubber hardness of over 70 IRHD and under 75 IRHD.

28. The disc changer as set forth in claim 25, wherein the resin layer has a pencil hardness of under 3B.

29. The disc changer as set forth in claim 28, wherein the resin layer has a pencil hardness of under 6B.

30. The disc changer as set forth in claim 25, wherein the resin layer is formed by printing a resin whose viscosity is over 20 Pa·s and under 100 Pa·s.

31. The disc changer as set forth in claim 30, wherein the resin layer is formed by printing a resin whose viscosity is over 30 Pa·s and under 40 Pa·s.

32. The disc changer as set forth in claim 25, wherein the resin layer is formed by screen printing.

33. The disc changer as set forth in claim 25, wherein the resin layer has a concavity-convexity pattern formed on the surface thereof.

34. The disc changer as set forth in claim 25, wherein the disc-shaped recording medium has a substrate formed form polycarbonate.

35. A disc changer comprising:
a disc compartment in which a set of disc-shaped recording medium is stored;
a disc tray on which there is placed each of the set of disc-shaped recording medium stored in the disc compartment; and
a recording and/or playback apparatus in which any one is selected from a set of disc-shaped recording media stored in a disc compartment of a disc changer and signals are written and or read to and/or from the selected disc-shaped recording medium;
the disc tray including a substrate and having a first resin layer and a second resin layer, softer than the disc-shaped recording medium, formed by printing on the main surface of at least the substrate on which the disc-shaped recording medium is placed, the second resin layer being formed on the first resin layer and to be in contact with the outer circumference of the disc-shaped recording medium,
wherein a third resin layer softer than the disc-shaped recording medium is formed on the main surface of the substrate opposite to that on which the disc-shaped recording medium is placed.

36. The disc changer as set forth in claim 35, wherein the substrate is formed from a metal.

37. The disc changer as set forth in claim 35, wherein the first resin layer is formed generally over the main surface of the substrate on which the disc-shaped recording medium is placed.

38. The disc changer as set forth in claim 35, wherein the second resin layer is formed in a position where the edge of the substrate at which the disc-shaped recording medium is inserted and the edge of the substrate at which the disc-shaped recording medium is ejected will be in contact with the outer circumference of the disc-shaped recording medium placed on the first resin layer.

39. The disc changer as set forth in claim 35, wherein the first and second resin layers have a rubber hardness of over 60 IRHD and under 95 IRHD.

40. The disc changer as set forth in claim 39, wherein the first and second resin layers have a rubber hardness of over 70 IRHD and under 75 IRHD.

41. The disc changer as set forth in claim 35, wherein the first and second resin layers have a pencil hardness of under 3B.

42. The disc changer as set forth in claim 41, wherein the first and second resin layers have a pencil hardness of under 6B.

43. The disc changer as set forth in claim 35, wherein the first and second resin layers are formed by printing a resin whose viscosity is over 20 Pas and under 100 Pas.

44. The disc changer as set forth in claim 43, wherein the first and second resin layers are formed by printing a resin whose viscosity is over 30 Pas and under 40 Pas.

45. The disc changer as set forth in claim 35, wherein the first and second resin layers are formed by screen printing.

46. The disc changer as set forth in claim 35, wherein the first and second resin layers have a concavity-convexity pattern formed on the surface thereof.

47. The disc changer as set forth in claim 35, wherein the disc-shaped recording medium has a substrate formed from polycarbonate.

48. A disc changer comprising:
a disc compartment in which a set of disc-shaped recording medium is stored;
a disc tray on which there is placed each of the set of disc-shaped recording medium stored in the disc compartment; and
a recording and/or playback apparatus in which any one is selected from a set of disc-shaped recording media stored in a disc compartment of a disc changer and signals are written and or read to and/or from the selected disc-shaped recording medium;
the disc tray including a substrate and having a first resin layer and a second resin layer, softer than the disc-shaped recording medium, formed by printing on the main surface of at least the substrate on which the disc-shaped recording medium is placed, the second resin layer being formed on the first resin layer and to be in contact with the outer circumference of the disc-shaped recording medium,
wherein the first and second resin layers contain rubber particles bridged by a urethane resin.

* * * * *